(12) United States Patent
Hoboy et al.

(10) Patent No.: US 6,863,873 B1
(45) Date of Patent: Mar. 8, 2005

(54) PROCESS TO PRODUCE SIMONKOLLEITE, ZINC OXIDE AND ZINC HYDROXIDE

(75) Inventors: Loren P. Hoboy, Anacortes, WA (US); Nick A. Wolf, Covington, WA (US); Tonya F. Yoder, Vashon Island, WA (US)

(73) Assignee: Chester W. Whitman, Vashon Island, WA (US)

( * ) Notice: Subject to any disclaimer, the term of this patent is extended or adjusted under 35 U.S.C. 154(b) by 0 days.

(21) Appl. No.: 10/669,146

(22) Filed: Sep. 23, 2003

Related U.S. Application Data

(63) Continuation of application No. 09/478,625, filed on Jan. 5, 2000, now Pat. No. 6,770,249.
(60) Provisional application No. 60/156,163, filed on Sep. 27, 1999.

(51) Int. Cl.$^7$ ............................................. C22B 19/00
(52) U.S. Cl. .......................... 423/103; 423/104; 423/622
(58) Field of Search ................................. 423/103, 104, 423/622

(56) References Cited

U.S. PATENT DOCUMENTS

| | | | |
|---|---|---|---|
| 863,411 A | * | 8/1907 | MacIvor ...................... 423/103 |
| 999,420 A | * | 8/1911 | Wannschaff et al. ......... 423/103 |
| 1,863,700 A | | 6/1932 | Seguine, Jr. |
| 3,849,121 A | | 11/1974 | Burrows |
| 4,039,406 A | | 8/1977 | Stanley et al. |
| 4,724,132 A | | 2/1988 | Fabry |
| 4,888,053 A | | 12/1989 | Grayson et al. |
| 5,078,786 A | | 1/1992 | Peters et al. |
| 5,431,713 A | | 7/1995 | Myerson et al. |
| 5,538,532 A | | 7/1996 | Keegel, Jr. |
| 5,582,631 A | | 12/1996 | Myerson et al. |
| 5,667,553 A | | 9/1997 | Keegel, Jr. |
| 5,683,488 A | | 11/1997 | Myerson et al. |
| 5,709,730 A | | 1/1998 | Cashman |
| 5,759,503 A | | 6/1998 | Myerson et al. |
| 5,942,198 A | | 8/1999 | Myerson et al. |

* cited by examiner

*Primary Examiner*—Steven Bos
(74) *Attorney, Agent, or Firm*—Christensen O'Connor Johnson Kindness PLLC

(57) ABSTRACT

A hydrometallurgical process utilizing an atmospheric calcium chloride leach to selectively recover from various metal feed stocks (consisting of elemental metals, metal oxides, metal ferrite, metal hydroxide, metal carbonates, metal sulfate/sulfur compounds, and their hydrates, specifically including but not limited to EAF Dust K061) zinc, lead, cadmium, silver, copper and other valuable metals to the exclusion of iron, magnesium, halogen salts and other unwanted elements. The process solves the problem of iron and magnesium leach solution contamination because iron is unexpectedly converted to magnetite. The heavy metals are cemented out of solution using zinc or other selected dust at a pH of 6 or greater under unique and unexpected conditions, which do not require acid. Simonkolleite/zinc-oxychloride/zinc-hydroxide is produced from the purified zinc chloride complex pregnant leach solution and is converted directly to high purity active rubber grade 99+% zinc oxide having small particle size and high surface area. The products are metal concentrates suitable for: metal refiner/processors, production of elemental metal, or other conversion processes. The process removes Arsenic and Fluorides in the feed material. The process also solves the problem of chloride contamination in the zinc oxide and prevents heavy metal contaminants in the hydrometallurgically produced zinc oxide derived from feed stocks containing chlorides or when chlorides are used to leach the metal bearing feed stocks. In one embodiment, calcium and/or magnesium compounds are added to the iron bearing waste to increase the recovery of zinc and other non-ferrous metals and to produce an iron bearing flux. The process is environmentally friendly and fully recycles all streams.

27 Claims, 7 Drawing Sheets

PROCESS TO PRODUCE SIMONKOLLEITE, ZINC OXIDE AND ZINC HYDROXIDE

CROSS-REFERENCE TO RELATED APPLICATION

This application is a continuation of U.S. application Ser. No. 09/478,625, filed Jan. 5, 2000, now U.S. Pat. No. 6,770,249, which in turn claims the benefit of U.S. Provisional Application No. 60/156,163, filed Sep. 27, 1999.

FIELD OF THE INVENTION

The present invention relates to a method and apparatus for the economical processing of metallurgical dust, such as electric arc furnace (hereinafter EAF) dust, also known as Environmental Protection Agency (hereinafter EPA) hazardous waste No. K061, into marketable chemicals and products. EAF dust, which is often treated as hazardous waste, can now be a potential raw material for the recovery of the metal values contained therein as metals, inorganic chemicals, and as a potential raw material source.

BACKGROUND OF THE INVENTION

The manufacture of steel using an electric arc furnace is a highly advantageous process in the modern steel industry. A drawback in the EAF manufacturing of steel is the production of EAF dust waste by-product, which is an EPA listed hazardous waste (K061). During melting and refining of steel in electric arc furnaces, large amounts of galvanized scrap material can be fed into the EAF process. Inherent in the process for making steel by the use of electric steel furnaces with submerged arcs is the liberation of zinc, iron, and other metal values as EAF dust in the off-gas leaving the furnace. To protect the atmosphere, these particles are removed in baghouses, cyclones, scrubbers, and other similar devices. Due to the high proportion of zinc in the dust, it is especially desirable as a source of zinc values for sale. The dust consists of fine particles of iron oxides, ferrites, calcium oxide, and silica, metal chloride and oxide particles of nonferrous metals such as zinc, lead, cadmium, and silver, which vaporize at the high temperatures of the molten steel bath, and which are recovered in the dust.

The feeding of fine particles, containing unwanted metals, back to the arc furnace is not economically viable. As the amount of recycled dust increases, the energy requirement for reducing and melting the iron and other metals from the dust increases, causing melt chemistry problems and decreasing furnace refractory life. Traditionally, this dust has been considered a waste material and has been disposed of in landfills. Recovery techniques used previously generate waste by-products or products not suitable for their intended claimed use and do not offer sufficiently high recovery yield of the metals and products in the EAF dust.

The rapid growth of the EAF steel process has made EAF dust one of the fastest growing and largest environmental problems worldwide. The landfill disposal method is becoming more expensive because of increasingly stringent Environmental Protection Agency (EPA) regulations. The chemical nature of these dust particles are such that they classify as listed hazardous waste, based on the toxicity test prescribed by the United States Environmental Protection Agency. The toxicity concern is related to the presence of lead, cadmium, and chromium.

At present, there are approximately 925,000 tons of this hazardous waste generated annually in the United States and an additional 3,000,000 tons generated annually in the rest of the world. EAF produced steel comprises forty-five percent (45%) of the total U.S. steel production. It is expected to become the major source of steel produced in the U.S. within the next few decades. At present, approximately one-half of the U.S. production of EAF dust is being land filled.

It is a primary purpose of this invention to recover metal values from this steel-making flue dust, and particularly to recover zinc oxide suitable for rubber compounding, and additionally to provide a means for the separation and recovery of other materials in the dust, with minimal environmental impact.

There is also a similar but lower concentration zinc contaminated dust which is derived from the other major process for steel manufacturing, the basic oxygen furnace or basic oxygen process (hereinafter BOF). Because the levels of toxic metals such as cadmium, lead and zinc are lower than current toxicity cutoff levels, BOF dust is not currently classified by the EPA as hazardous. However, BOF dust may be classified as hazardous in the future and its non-iron contaminants, like zinc, make it difficult to utilize in current steel manufacturing, resulting in substantial worldwide stock piles of BOF dust.

With the resource of EAF and BOF dust readily available, and based on environmental need, this process was developed to economically recover nonferrous metals such as zinc, lead, and cadmium from these steel plant dusts. The iron oxide, depleted of these metals, can be recycled back to the steel furnace. Since the tonnage of this raw material is substantial, it represents an important source of zinc, lead and iron metals.

There are also waste dusts and metal sludges available from zinc and copper recovery and extractions processes and other metal processes which also represent valuable sources of non-ferrous metals.

Accordingly, there is a need to develop a hydrometallurgical chloride based process to economically recover valuable metals from metal bearing waste and ores which will solve the problem of unwanted ion contamination of the pregnant leach solution, thus insuring that finished products have extremely low levels of contamination of unwanted ions. Chloride leach processes offer apparent advantages over sulfur based chemistry, such as avoiding roasting, sulfuric acid regeneration, and unwanted waste by-products. Even though these processes offer the opportunity to be environmentally friendly, they have not had much economic success. The need to find a chloride based chemistry process is especially crucial for metal bearing feed stocks that contain chloride. Previously developed hydrometallurgical chloride based leaching processes have required the addition of costly metal chloride salt additives (components like ferric chloride or cupric chloride) or hydrochloric acid, which cause unwanted ions in the pregnant leach solution that have to be removed prior to subsequent metal extraction recovery steps. Other previously developed chloride processes contain ammonium, with resulting safety concerns and the potential for unwanted ammonium compounds. These currently available processes utilize high temperatures, high pressures, and/or highly acidic conditions.

The prior art, as described in U.S. Pat. No. 1,863,700, teaches that zinc oxide/oxychlorides produced from simple precipitation with calcium hydroxide contain as little as 1% chlorides and 3–5% calcium. The patent further teaches a process where a zinc product can be produced with 1–2% calcium and 0.8% chlorides. Such a product thus contains 7% Simonkolleite or other oxychlorides based on the chloride stoichiometry and thus contains less than 92% pure zinc oxide, which is unacceptable for rubber grade zinc oxide and other high purity zinc oxides as well as chloride intolerant zinc refining processes. In contrast, the process of the present invention converts Simonkolleite and other zinc oxychlorides to zinc oxide, meeting specifications and suitability for use as rubber grade zinc oxide with more than 99% pure zinc oxide. The zinc oxide has less than 1,800 ppm chlorides and usually less than 1000 ppm and has a particle size of 0.05 micron to 0.5 micron. The process produces an active zinc oxide with a surface area of 10–70 m$^2$/gram, providing better reactivity and economy compared to French processed zinc oxide. (See "Active Zinc Oxide—the Advantage" by Dr. Harry Rothmann and L. Bruggemann-Sprit und Chemische Fabrik, Germany Tire Technol. Int., p. 118 (1997)). This large amount of surface area offers a more reactive product allowing its use at lower levels than is currently practiced, with improved economics and in processes where French Process zinc oxide has not been acceptable and/or viable.

In the present invention, a pyrolysis process is described where in an iron bearing material containing non-ferrous metals (specifically including but not limited to EAF Dust-KO61) is reduced of its oxides and efficiently stripped of its non-ferrous metals in the presence of carbon and calcium; and a hydrometallurgical process is described utilizing an atmospheric calcium chloride leach to selectively recover from various metal feed stocks (consisting of elemental metals, metal oxides, metal ferrites, metal hydroxides, metal carbonates, metal sulfate/sulfur compounds, and their hydrates, specifically including but not limited to EAF Dust-KO61) the following components: zinc, lead, cadmium, silver, copper and other valuable metals to the exclusion of iron, magnesium, halogen salts and other unwanted elements. The pyrolysis process solves the problem of high levels of non-ferrous metals left in the iron rich material produced from KO-61 when not using calcium.

SUMMARY OF THE INVENTION

The process utilizes a chloride leach solution for leaching selective metals from metal bearing feed stocks, producing a pregnant chloride leach solution suitable for selective metal recovery or other metal extraction which removes, separates, and recovers such metals in a cost effective manner with minimal amounts of unprocessed solids and sludge remaining in the environment. The process is based on the addition of water, rather than the use of an acid, to control the chloride concentration. In addition, the process produces an intermediary product, Simonkolleite, which is then processed to produce 99% plus grade zinc oxide. The hydrometallurgical process utilizes an atmospheric calcium chloride leach to selectively recover from metal bearing feed stock zinc, lead, cadmium, silver, copper and other valuable metals to the exclusion of iron, magnesium, halogen salts and other unwanted elements. The pregnant leach solution is ideally suited to make high-grade zinc oxide and recover other heavy metals with minimal contaminants utilizing cementation processes or selective ion extraction utilizing liquid-liquid extraction processes. It has the unexpected benefit of converting iron oxide and ferrites to magnetite.

The process has been specifically designed to fully recycle all process liquids while producing marketable solid products.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
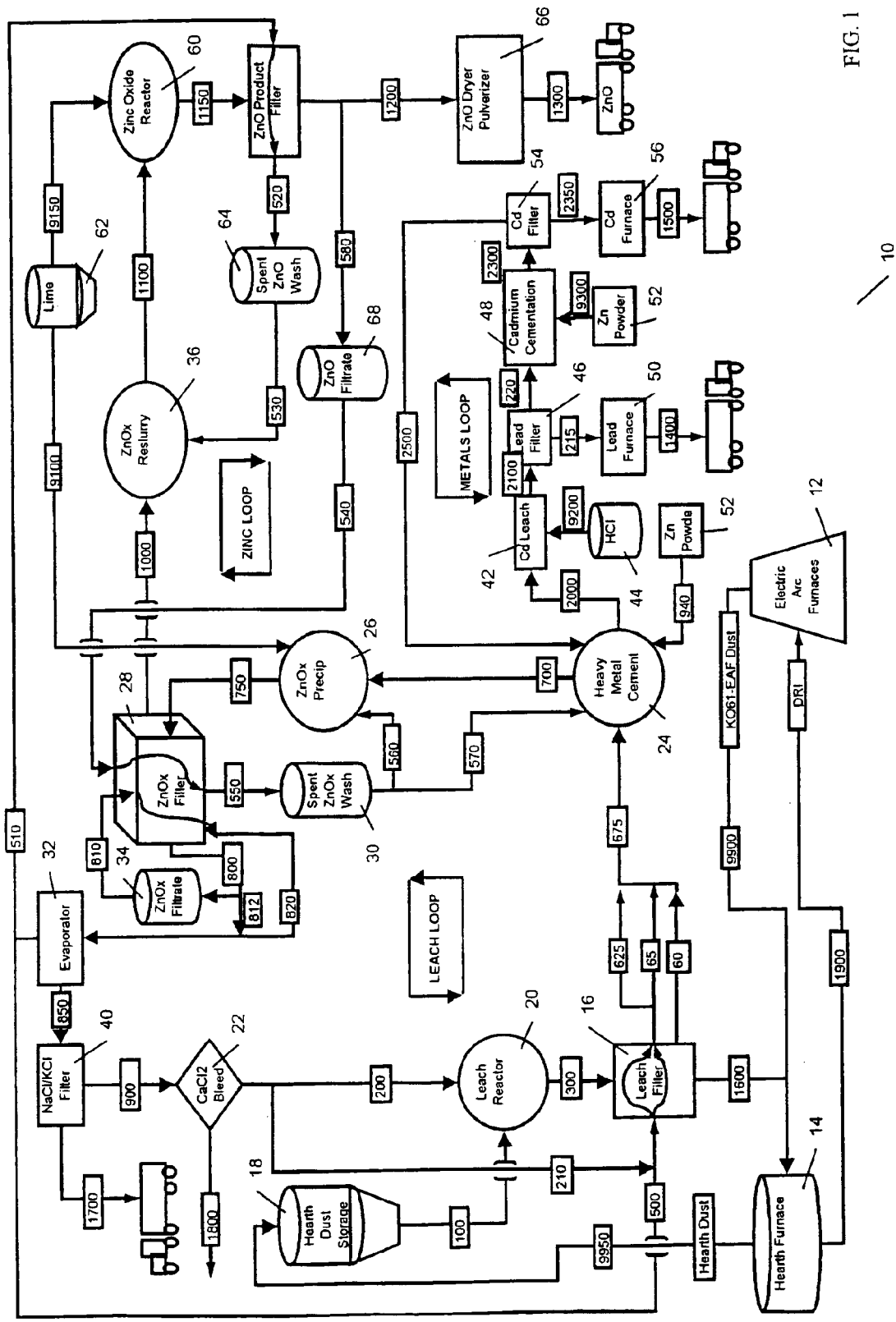
FIG. 1 is a schematic flow diagram of the zinc oxide recovery process utilizing lime for zinc precipitation and hearth dust as the feed stock.

Tables 1–18 show data related to the present invention.

DETAILED DESCRIPTION OF THE PREFERRED EMBODIMENT

A general overview of the process will first be described.

Electric Arc Furnace: Scrap iron, iron ore, carbon, calcium oxide, magnesium and oxygen along with other feed stock, is fed to a furnace. Two electrodes (probes) are used to melt the metal. Dust is emitted with metal vapor which turns to oxides, known as EAF Dust (KO-61). The Electric Arc Furnace could also be a blast furnace producing any type of steel. The process may comprise any metal furnace or metal process which makes dust or sludges with recoverable metals.

Rotary Hearth Furnace: The K061 may contain iron lead, copper, cadmium, silver and zinc and is mixed with carbon, and may further be mixed with calcium and magnesium rich stocks. This mixture is fed to the furnace and its metals are reduced (stripped of their oxides) in an oxygen reducing atmosphere. The non-volatile metal makes direct reduced iron and calcium/magnesium briquettes and a Hearth Dust rich in non-ferrous metals. Hearth dust includes zinc oxide, lead, copper, silver, chlorides and cadmium. The inventive process can be used with an input of KO-61, metal rich Dust or sludges or Hearth Dust. In other words, the hearth furnace can be positioned at the beginning or at the end of the process. In addition, the process may use lime and/or caustic in the chemistry. In the process using caustic, the caustic is regenerated or can be sold as sodium/potassium chloride.

Leach Reactor: zinc, lead, copper and cadmium are fed in to the reactor, along with other heavy metals and mixed with a leach solution. The leach solution is typically 53% calcium chloride and 47% water, but may contain sodium and potassium chloride up to their respective saturation levels (generally 1–7%). This is a straight salt leach with no acid added. In this leach step, iron, magnesium, calcium and other related elements do not get absorbed into the leach.

Filter Leach Slurry: The dregs/filter cake from the leach filter include calcium hydroxide, which has been separated from the valuable metals, and is shipped for sale or further processing back to the furnace. The filtrate liquid includes the valuable metals including specifically zinc, lead, copper, silver and cadmium. There are very few contaminants in this pregnant filtrate stream.

Cementation: This step separates the lead, copper, cadmium and silver from the zinc pregnant leach solution with zinc powder in the cementation step. This step uses zinc to displace the lead, copper, cadmium and other similar metals from a metal chloride complex. In prior art industry processes, this step is conducted in the range of pH 2–6. The inventive process, however, uses a water dilution instead of direct pH adjustment. In other words, water is added to the solution to change the chloride concentration which allows the reaction to occur at an unadjusted pH, typically at a pH of 6–8. This step produces elemental metals (cement), which generally comprises lead, cadmium, silver and copper. The cement is fed to a lead smelter or further refined and separated by other known processes.

Zinc Precipitation Step: Water is added to the zinc pregnant solution which produces a white precipitation called Simonkolleite. Approximately 35% of the Simonkolleite precipitates by the addition of water. Lime is simultaneously or subsequently added to precipitate out the remaining 65% of the Simonkolleite.

Chemistry: The unique chemistry of the inventive process is:

$$2MO+3CaCl_2+2H_2O \Leftrightarrow Ca^{++}+[MCl_3^-]_2+Ca(OH)_2, \quad \text{Equation 1}$$

wherein M=Zn, Pb, Cu and/or Cd, and wherein M in the chloride complex is displaced with Zn prior to the reaction of Equation 2.

$$Ca^{++}[ZnCl_3^-]_2+Ca(OH)_2 \Leftrightarrow ZnCl_2.4(Zn(OH)_2).H_2O+ZnO, \quad \text{Equation 2}$$

wherein the $ZnCl_2.4(ZnOH_2).H_2O$ is Simonkolleite, containing equilibrium amounts of ZnO and $Zn(OH)_2$ In cold temperatures, the production of Simonkolleite is increased whereas at hotter temperatures, more ZnO is produced. Accordingly, the above reaction preferably takes place at ambient temperatures to increase the production of Simonkolleite and to reduce the production of ZnO. (Note: There is no temperature at which only zinc oxide can be produced given the elevated levels of chlorides in solution.) The desirability of using cold temperatures to produce Simonkolleite is counter intuitive because the production of Simonkolleite decreases the amount of zinc oxide produced in this step. Production of the intermediary Simonkolleite, however, is then used to produce zinc oxide of high purity and with less environmental waste than prior art processes, compared to a process wherein zinc oxide is produced directly without the intermediary.

Simonkolleite is filtered from the solution. The filtrate is evaporated so that NaCl and KCl crystallize out and the solution is suitable to be recycled for use as leach solution.

The Simonkolleite is then reslurried with fresh water or recycled water and reacted with lime or caustic at elevated temperatures and pressures to produce the zinc oxide.

We now refer to the figures for a more detailed description.

FIG. 1 shows schematically a process 10 of a preferred embodiment of the present invention. Beginning at the front end of the process in the Furnace section, an electric arc furnace (EAF) 12 outputs EAF dust in a stream 9900. This dust is classified by the EPA as K061, a listed hazardous waste. The metal bearing feed stock typically is chosen from the group of materials including: metal furnace dusts, smelting dusts, metal refining dust, metal bearing waste sludges, mill tailings, ores which contain metal oxides, metal hydroxides, metal ferrites, metal oxide and their compounds, metal sulfates/sulfites/sulfur compounds, carbonates, and metal bearing materials containing chlorides or fluorides. The metal bearing feed stock may also comprise Electric Arc Furnace Flue dust K061 derived from the off gasses of the Electric Arc Furnace processing of scrap steel where said dust contains approximately 10–40% zinc or the Electric Arc Furnace dust can contain zinc ferrite. The feed stock can also comprise, but is not limited to, zinc and metal oxide dust (zinc concentrate) recovered from pyrolysis/furnace/kiln/roaster operations to roast or reduce (metallize) metal bearing ore or waste metal bearing materials such as EAF Dust when making direct reduced iron, sludges from metal plating baths, sludges from electrowinning tank operations, smelter furnace dust from zinc, copper or other heavy metal, recover/processing, iron and steel production including blast furnace or BOP or BOF flue dust containing 3–20% zinc and heavy metal content, Jarosite from mining extraction operations, waste water treatment metal bearing sludges or cakes, zinc ferrite tailings, EAF dust containing 10–60% or more zinc, zinc/copper smelter dust, iron ore containing greater than 5% zinc and heavy metals, blast furnace/BOP dust containing 5–35% or more zinc, zinc smelter dust, copper smelter dust, metal bearing ores containing iron or sulfates, metal concentrates containing sulfur compounds, computer and electronic component recycling dusts and sludges, waste by-product streams containing oxides or hydroxides, metal bearing materials containing chlorides, copperhead dross, cyanide bearing plating waste, plating waste, arsenic bearing ores and wastes, gold ores and their by-products with sulfur, copper electrolysis anode sludge, ores of all metals, incinerator fly ash, boiler fly ash, spent metal catalyst, metallic slags/dross, uranium ores, gold bearing ore, silver bearing ore and sludges, feed stocks or solutions containing fluoride, feed stocks or solution containing arsenic, galvanized scrap metal, zinc bearing scrap, copper bearing scrap, scrap electronic components, circuit board recycling, and/or KO-88 aluminum pot liner. The feed stock of stream 9900, typically comprises EAF Dust having a composition of approximately 20% zinc, 6% lead, 40% iron, and various other miscellaneous components. The feed stock may be shipped to the processing plant from the steel mill by truck or rail.

Stream 9900 is fed to a hearth furnace 14, along with stream 1600 from a leach filter 16. The hearth furnace turns the oxides into metals by the addition of coke (carbon). Specifically, K061 plus coke or other carbon content, in reducing conditions, causes the oxides to depart from the metals leaving metallic iron. The zinc, lead, copper and cadmium vaporize off as a metal. In the preferred embodiment of the process calcium hydroxide or oxide and magnesium oxide or hydroxide is added to the iron bearing material prior to metallization/reduction to enhance the non-ferrous metal recovery yields and provide a more pure iron calcium rich material for iron and steel production.

Stream 1900 comprises 80–99% metallized iron briquettes fed back to the EAF. The stream also includes calcium oxide (reduced from calcium hydroxide) and magnesium oxides. Stream 1900 is called "fluxed sinter", also referred to as direct reduced iron (DRI).

Hearth dust is fed from hearth furnace 14 in stream 9950 to hearth dust storage bin 18. The hearth dust is a gray/white dust that is produced when the zinc metal vapor and other metals are re-oxidized in the top of hearth furnace 14. The dust comprises 30 to 80% zinc, and typically 50 to 60% zinc. The other components comprise lead, copper, cadmium, silver, other recoverable metals, chlorides and trace contaminants such as iron and manganese. Stream 9950 is fed to storage bin 18. Stream 100 is fed from storage bin 18 as needed such that stream 100 has the same chemical make-up as stream 9950.

Hearth dust is fed from storage bin 18 in stream 100 to a leach reactor 20. A stream 200 is also fed to reactor 20 and comprises a calcium chloride leach solution with a specific gravity of approximately 1.49. The solution of stream 200 may also comprise sodium chlorides and potassium chlorides in amounts from a trace amount up to their saturating level of approximately 1–8% of the solution. The calcium chloride typically is recycled from another portion of the process. In reactor 20, the zinc oxide in the hearth dust combines with the calcium chloride to produce a zinc chloride complex and a calcium hydroxide precipitate. Other metal oxides in the dust will also combine with the calcium chloride to produce a corresponding metal chloride complex. The process simultaneously follows three separate equations:

$$3CaCl_2 + 2MO + 2(H_2O) \Leftrightarrow [Ca^{++} + 2MCl_3^-] + 2Ca(OH)_2 \qquad \text{Equation 3}$$

$$CaCl_2 MCl_2 \Leftrightarrow [Ca^{+++} MCl_4^-] \qquad \text{Equation 4}$$

$$CaCl_2 + MO + H_2O \Leftrightarrow MCl_2 + Ca(OH)_2, \qquad \text{Equation 5}$$

wherein M=Zn, Cd, Cu, Ag, Sn, Ni and/or Pb, and wherein the metal chloride complex is $MCl_3^-$.

Approximately 95%+ of the feed solution undergoes the reaction of Equation 3 so that approximately 5% undergoes the reactions of Equations 4 and 5 combined. Accordingly, stream 300 comprises 95% of the metal as chloride complex and calcium hydroxide solids and dregs (the unleached materials) including magnesium, manganese and iron. The specific gravity of the materials fed to filter 16 in stream 300 preferably is approximately 1.49.

Stream 300 is fed to a leach filter 16, which typically comprises a press or other liquid-solid separation device. During the batch process disclosed herein, this filter processing step comprises three distinct steps. In a continuous process, three separate filters may be used.

In the first filtering step, filter 16 presses the solution to remove the liquid from the solids of stream 300. This liquid is removed as stream 600. In the second filtering step, the solids remaining in the filter are washed with stream 210, comprising calcium chloride solution from tank 22 or its dilute form, and pressed to recover additional metals from the filter cake. The liquid is removed as stream 650. This step increases the recovery of metals from the filter. In the third filtering step, the solids remaining in the filter are washed with stream 500, comprising hot water, to further improve the recovery of metals into the liquid solution from the filter cake. These three liquid streams are mixed together as stream 675 and comprise the metal chloride complexes, $MCl_3^-$. These liquid streams should be held above the crystallization temperature of lead chloride, and typically are held at a temperature of approximately 90° C. The solids, i.e., the filter cake, are sent via stream 1600 to hearth furnace 14. The solids comprise approximately 80% calcium hydroxide and approximately 20% magnesium and other dregs. The solids may be dried before being returned to the furnace to be calcined. Stream 1600 may be sold to outside vendors rather than being recycled back to the hearth furnace as a calcium hydroxide or calcium oxide rich stream.

Leach filter 16 feeds streams 625, 650 and 600 to stream 675, which in turn is fed to a heavy metal cementation tank 24. Stream 675 may be passed through an iron removal process 21 (FIG. 3) before being passed to cementation tank 24 to remove any trace amounts of iron in the stream. Stream 675 typically comprises a green liquid containing zinc, lead, copper, cadmium and silver in the chloride complex form.

In the preferred embodiment, the chloride leach solution of stream 200 is calcium chloride, and may also contain sodium chloride and potassium chloride or other chloride salts from groups 1 or 2 on the periodic table, below or at their solubility level in calcium chloride at the chosen concentration. The leach solution chloride ion concentration typically is greater than 10 molar and less than the saturation point at the chosen operating temperature for calcium chloride. The calcium concentration preferably is at least 16% and less than the saturation point for calcium chloride. The leach solution typically is fully liquid at the selected temperature and below the saturation point. The leach of reactor 20 preferably occurs at atmospheric pressure, but may be conducted at higher pressure conditions. The feed stock particles should be sufficiently small to allow good reaction rates. The reaction may be well agitated to decrease reaction times. During the reaction, the pulp density typically is 1% or greater. The temperature preferably is above 70° C. and below the boiling point of the solution at the selected operating pressure and at a temperature at which all metal chlorides present are soluble. The calcium concentration in the leach solution of reactor 20 may be, but is not required to be, maintained/reestablished by the addition of HCl to the leach cake containing calcium hydroxides or other calcium complexes precipitated during the reaction. When so elected, the pH should be maintained above 3.5 and below 9.0. The calcium content may be reduced by a reaction with sulfuric acid on the leach solution and/or on the recycled leach solution feed to produce gypsum. The reaction typically occurs in the pH range of between 3.5 to 9.5 without the addition of acid. The primary metals targeted for recovery are zinc, lead, cadmium, silver, copper, nickel, tin, and other metals in the electrochemical series above zinc, including Group Classifications 9, 10, 11, 12, 13, 14, 15. The process produces a pregnant leach solution from which one can produce elemental metals, metal oxides or metal hydroxides directly, extract selective ions utilizing liquid-liquid or resin exchange, or produce metal chlorides for electrowinning elemental metal. The leach can be carried out as a single stage or a multi-stage process, a continuous process, and may be co-current or countercurrent.

The hydrometallurgical process rejects substantially all the iron, Mg, Cr, calcium hydroxide, fluoride, Ca/Mg/Ba, carbonates and hydroxides, sulfates, (and other group 1–8 elements), carbon, Si, As and P can be rejected (not leached) based on the concentration of chloride ions, the temperature, and other operating conditions. The process solublizes approximately only 2–100 ppm iron in the leach solution. Unexpectedly, the process converts $Fe_2O_3$ and other iron compounds to magnetite $Fe_3O_4$. The magnetite can be used as an iron ore substitute, feed for direct reduced iron production, or may be used for coal ore floatation and a cementation additive. The undissolved solids of the leach process are separated (i.e. filtered, centrifuged, etc.) out of the pregnant leach solution and washed first with leach solution and then with water to obtain an enhanced metal yield recovery and purified cake. The solids typically are washed with hot chloride leach solution to remove entrained metal chloride complexes. The wash temperature typically is greater than the crystal formation point for the chloride salts present. The leach filter cake is washed with a series of hot leach solutions of reduced (or increased) chloride concentrations to recover metals that did not dissolve at the chosen operating concentration conditions. The solids are then washed with hot water above 80° C. and at a temperature greater than the crystal formation point for the chloride salts present, to remove the remaining entrained leach wash solution. The solids are washed with fresh/recycled hot water to remove soluble chloride salts. The leach typically recovers 70–97% of all heavy metals from the feed material. The leach process does not use acid unless it is required as part of a recycle loop to maintain the chloride balance. The process does not require oxygen unless the rejected metals in the leach cake are preferred in the fully oxidized form. The resultant pregnant leach solution of the process contains low levels of Mg and Mn, which minimizes contamination of products to be produced from the pregnant leach solution. Leach conditions of the process make magnetite $Fe_3O_4$ when the feed material contains or produces iron oxide $Fe_2O_3$, ferrites or iron hydroxides. The inventive process removes Fluorides in the form of $CaF_2$. Fluorides arc made insoluble during the process and therefore are removed from solution. Fluorides are converted to insoluble calcium fluoride which is environmentally stable. The salt leach will precipitate NaCl and KCl to maintain a system balance. Arsenic reports to the leach cake as an iron complex making the process environmentally safe. During the process if cyanide is present it is complexed with iron to produce Prussian blue or decomposes to form carbon dioxide, making the process environmentally safe. By adding $O_2$ in a subsequent stage to the leach process, the process selectively precipitates $MnO_2$ so that $O_2$ is not added in an earlier step. Based on the belief, during the process, a platinum group metal, if present, selected from the group consisting of platinum, palladium, rhodium and ruthenium in an ore or other metal bearing feed, can also be recovered.

Still referring to FIG. 1, zinc powder in stream 9400, water including some chlorides such as zinc chlorides in stream 2500, water in stream 570 and the metal chloride complexes in stream 675 are all fed to a heavy metal cementation tank 24. The water added to cementation tank 24 in streams 2500 and 570 is added in precise amounts in order to control the chloride concentration in the tank. The water preferably is added to maintain the specific gravity of the contents of the tank within a range of 1.41 to 1.49. By maintaining the specific gravity of the solution within the range of 1.41 to 1.49, the zinc powder added to the solution will result in the zinc displacing each of the metals in the metal chloride complexes. A two stage counter current flow is preferred to reduce zinc dust addition. The reaction is as follows:

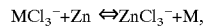+Zn ⇔$ZnCl_3^-$+M, Equation 6 wherein M=Cd, Cu, Pb, Sn, Ni, Ag, or any other metals in chloride complex form, and wherein the metals precipitate out after being displaced by the zinc.

The sequence of displacement by the zinc of particular metals can be controlled by controlling the specific gravity of the solution. In particular, at a specific gravity of 1.49, the zinc selectively displaces silver but does not displace any other metals. Correspondingly, other metals are believed to be displaced at other particular specific gravities. Accordingly, the addition of precise amounts of water to the solution in sequential steps is believed to result in the selective and sequential displacement by zinc of particular metals as desired.

Heavy metal cementation tank 24 feeds the displaced metals in stream 2000 to outside sales or to a metals recovery loop. The displaced metals are separated within tank 24 from the zinc chloride complex by filtration and/or other liquid-solid separation methods. In a continuous process, the filtration and/or separation may take place in a series of separation filtration or gravity separation tanks. Typically the metal solids are washed with water to remove the chloride salt solution. After washing and drying, if being sold to outside sales, the solids are briquetted in a press under high pressure and sold. If the displaced metals are further processed instead of being sold directly, stream 2000 is fed to cadmium leach tank 42, as will be further described below.

Referring to the zinc cementation process, the process comprises extracting and recovering metals from a high chloride salt solution containing metal ions by reducing the chloride content to specific levels by the addition of water and then adding elemental metal to cause metals above said metal on the electrochemical replacement series to cement out of solution. Elemental zinc powder/dust and other selective metal dust is added to the pregnant leach solution, which is high in chloride content including but not limited to lead, copper, cadmium, silver, etc., and ions/complexes containing high chloride concentration, to unexpectedly and selectively, at a pH of 5 or greater, cement out metals by a substitution reaction. The reaction form is: metallic dust (such as zinc)+metal chloride salt or metal chloride-complex=metal+zinc (or other metal) chloride or zinc chloride-complex ions. By varying the chloride concentration, instead of varying the pH, through the addition or removal of water, the expected and unwanted formation of metal oxides and hydroxides are avoided and no acid or base addition is necessary to control the pH to prevent precipitation of such metal oxides or hydroxides. The high chloride salt solution typically is calcium chloride. The temperature typically is above the crystallization point of the solution and below the boiling point. The high chloride salt solution may also contain sodium and/or potassium chloride up to their respective solubility limits in the calcium chloride solution at the chosen operating temperature and pressure. The solution typically contains more than 30% chlorides. The elemental metal used for cementation should be chosen from those metals below the metal to be cemented on the electrochemical replacement series. Elemental zinc dust or zinc powder is used to cement lead, copper, cadmium, iron (only trace amounts are present, such as 6 ppm), mercury, silver and gold. Alternative cementation steps may include elemental copper dust or copper powder to cement mercury, silver and gold prior to using zinc in a final cementation step. The metals being cemented out include, but are not limited to lead, cadmium, copper, silver, tin, nickel, mercury, platinum and gold. The unexpected result of the process is that a controlled lowering of the specific gravity or the chloride concentration allows the cementation of metals with elemental metal dust to occur at a pH above 4 without the co-precipitation of metal oxide, metal oxychloride and metal hydroxides, as one would normally expect under these conditions. The temperature typically is held above the crystallization point for all chloride salts present. The specific gravity is controlled between 1.40 and 1.49 to control chloride concentration by the addition of water. The elimination of oxygen further prevents the formation of zinc oxide, zinc oxychloride or zinc hydroxide at temperatures below 80° C. The process results in less than 1 ppm of each metal that is cemented out, being contained in the solution after processing. The chloride concentration can alternatively be controlled by selective chloride ion reduction, reaction chemistry or liquid-liquid extraction using prior art processes, instead of the addition of water as discussed above. The process may be conducted in one stage, multiple stages, or continuously in a counter flow or co-current flow process. The metal dust used in the process preferably is zinc. The amount of zinc dust added is between 1.1 and 2.0 stoichiometric for the metal to be removed. The reaction is performed at atmospheric pressures and below the natural boiling point of the solution. The metal sponge cemented out is separated from the solution to leave a pure zinc chloride complex ion solution suitable for producing high purity zinc oxide or zinc metal. Methods available include direct precipitation of zinc oxychloride/zinc oxide/zinc hydroxide. The alternative method of liquid-liquid extraction for chloride complex extraction may also be used.

After displacement by zinc of the other metals in the metal chloride complex, heavy metal cementation tank 24 feeds the zinc chloride complex $ZnCl_3^-$, preferably with a specific gravity of 1.43, in stream 700 to Simonkolleite precipitation tank 26. The zinc chloride complex in stream 700 may have a purity of 99%+. Tank 26 also receives recycled water in stream 560 in a first precipitation step and lime in stream 9100 during a second precipitation step. As water in stream 560 is added to precipitation tank 26, Simonkolleite is formed and precipitates out of solution. Approximately 35% of the zinc will precipitate out as Simonkolleite by the addition of water. Lime (calcium hydroxide) is then added to the solution in stream 9100 which results in approximately 60% of the zinc precipitating out as Simonkolleite. These two precipitation steps can be performed separately or simultaneously. The remaining approximate 5% of the zinc will remain as a zinc chloride complex and will be recycled through streams 750, 820, 850, 900 and 200 back into the process. Accordingly, there is an approximate 95% recovery rate of the zinc during the precipitation step in tank 26 during each pass. Specifically, at a temperature of 25 degrees Celsius, stream 750 comprises a slurry of solids and solution. The solids portion comprises approximately 95% Simonkolleite, and approximately 5% zinc oxide/hydroxide. The aqueous solution portion comprises approximately 500 ppm of zinc in a zinc chloride complex form, as well as approximately 42% calcium chloride leach solution and potassium and sodium chloride at their solubility limits (usually less than 5%).

The production of Simonkolleite, a zinc oxychloride, (and depending on conditions, small amounts of zinc oxide and zinc hydroxide) is predominately produced by the following reactions, which occur simultaneously in tank 26:

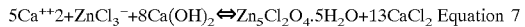

$$5Ca^{++}2+ZnCl_3^-+8Ca(OH)_2 \Leftrightarrow Zn_5Cl_2O_4 \cdot 5H_2O+13CaCl_2 \quad \text{Equation 7}$$

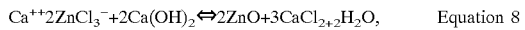

$$Ca^{++}2ZnCl_3^-+2Ca(OH)_2 \Leftrightarrow 2ZnO+3CaCl_2+2H_2O, \quad \text{Equation 8}$$

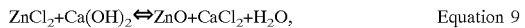

$$ZnCl_2+Ca(OH)_2 \Leftrightarrow ZnO+CaCl_2+H_2O, \quad \text{Equation 9}$$

wherein the Simonkolleite is $Zn_5Cl_2O_4 \cdot 5H_2O$.

Prior to the zinc chloride complex being fed to tank 26, stream 700 is cooled to a temperature of approximately 25° C., down from a temperature of approximately 90° C., because at these lower temperatures, more Simonkolleite is formed from the zinc chloride complex. For example, at 90° C. only approximately 40% of the zinc chloride complex is precipitated as Simonkolleite. The reaction of the zinc chloride complex to Simonkolleite is exothermic so tank 26 must also be cooled to maintain the tank at 25° C. during the reaction. As stated above, precipitating the zinc chloride complex at lower temperatures unexpectedly yields high purity rates of the final product zinc oxide because the intermediary (Simonkolleite) is formed at high purity rates at the cooler reaction temperatures, because the precipitation of magnesium (from the commercial calcium hydroxide) does not co-precipitate at such high rates compared to precipitation rates at higher temperatures.

Precipitation tank 26 feeds approximately 95% pure Simonkolleite combined with small amounts of zinc oxide and zinc hydroxide solids, along with approximately 5% zinc chloride complex, in stream 750 to a Simonkolleite filter 28. Filter 28 also uses recycled water wash in stream 540. There are two techniques for removing the sodium, or potassium chloride as the case may be, which may crystallize out with the Simonkolleite precipitate. A first preferred technique comprises passing a hot filtrate, stream 800, through the oxychloride cake to directly dissolve the chloride salts. The second, is to use hot water in stream 540 in a counter current flow washing circuit to wash the Simonkolleite to cause the sodium or potassium chloride to solublize out of the Simonkolleite cake so that it does not flow with the Simonkolleite in stream 1000. In the second case, the countercurrent wash solution is chilled to 20° C. and the potassium chloride is crystallized and filtered out, while the solution is then returned to tank 26.

In particular, during the preferred technique, the Simonkolleite is pressed in filter 28 so that the liquid is pressed from the Simonkolleite precipitate and leaves the filter in stream 800. The liquid in stream 800 comprises the unprecipitated 5% zinc chloride complex, and the calcium, potassium and sodium chlorides. A small portion of stream 800 is passed to filtrate tank 34, is heated from 25° C. to approximately 80 to 90° C., and is then fed via stream 810 to wash the Simonkolleite filtrate cake. This wash removes any potassium or sodium chloride that may have precipitated earlier due to the colder temperatures of the filtrate in filter 28. The Simonkolleite cake is then pressed again in the filter. The liquid solution of this press leaves the filter as stream 820. The remainder of stream 800 which was not fed to filtrate tank 34, and is designated as stream 812, is combined with stream 820 and is fed to evaporator 32. Accordingly, stream 820 comprises the calcium chloride solution, a small amount of unreacted zinc chloride complex, the potassium and/or sodium chlorides and dilution and wash water, and typically is at a temperature of between 80 to 90° C.

The Simonkolleite cake, which is now free of potassium and sodium chlorides, is then washed with water in stream 540 to remove soluble chlorides, such as calcium chloride. Stream 540 typically comprises fresh water or recycled water that already includes small amounts of calcium chloride, and is at a temperature of approximately 80° C. The Simonkolleite is pressed so that stream 550 exiting filter 28 comprises water at approximately 80° C. and some calcium chlorides. Stream 550 is sent to a spent Simonkolleite wash tank 30 which feeds the dilution water in stream 560 to the Simonkolleite precipitation tank 26 and in stream 570 to heavy metal cementation tank 24.

Still referring to filter 28 of FIG. 1, filter 28 feeds stream 820, which comprises the unprecipitated zinc chloride complex and the potassium and/or sodium chlorides, to an evaporator 32. Stream 820 may also comprise small amounts of metal and calcium chlorides. Evaporator 32 preferably comprises a crystallizer. Accordingly, salt crystals of the sodium chloride and potassium chloride crystallize out in the evaporator as water is evaporated. The concentration of calcium chloride after evaporation is sufficiently high to cause excess sodium and potassium chloride entering the process to be crystallized when their saturation level has been met. The evaporated water is fed in stream 510 for reuse in zinc oxide washing at filter 38 and in stream 500 for washing at filter 16. A filter 40 or a centrifuge or other liquid-solid separation method may be used to remove the crystals, which are then dried. The crystals may be blended in proper ratio with Cryolite to make a commercial grade aluminum salt flux, or the crystals may be fed via stream 1700 to a manufacturer of aluminum salt flux for further blending and processing. A solution leaves filter 40 as stream 900 and typically comprises a high concentration leach solution of calcium chloride suitable for recycle. The solution generally has a composition of 34% chloride typically comprising 53% calcium chloride or over 50% calcium chloride, and less than 3% potassium chloride, and less than 1% sodium chloride. The solution also includes small amounts of zinc, magnesium and other metals as chloride complexes which did not get removed in prior steps.

Stream 900 is fed to calcium chloride storage tank 22. A portion of the calcium chloride may be sold to an outside source via stream 1800 to maintain system chloride balance. A majority of the calcium chloride may be recycled via stream 200 to leach reactor 20.

Referring to the salt separation and recycle portion of the process, the diluted and barren leach solution is recycled by the evaporation of water from the filtrate of the zinc oxychloride precipitation step. The NaCl, KCl, and $CaCl_2$ can be crystallized out when the correct concentration of $CaCl_2$ to water is reached for the next leach. By dropping the temperature below 90° C. for a portion of the $CaCl_2$ concentrate, the concentration can be controlled by crystallizing out excess $CaCl_2$ which builds up in the system due to the entry of chlorides in the feed. These crystals can be dried for sale or sold as a solution. The barren leach solution is regenerated by the evaporating of water until the desired calcium chloride concentration for the next leach solution is reached. The temperature typically is held between 70° C. and 130° C. and may be removed by heat or vacuum or a combination thereof. The water is removed such that the specific gravity is between 1.49 and 1.55. The sodium, potassium and other salts which precipitate during evaporation are filtered out. The salts are dried and are suitable for use in the Aluminum Smelting Process as a flux. The NaCl and KCl can also be recycled as feed stock. The NaCl and KCl may also be used as the feed stock to a chlor-alkali plant producing sodium and potassium hydroxide and hydrochloric acid which can be used in the process and the excess sold commercially.

In one embodiment, caustic, also referred to as sodium hydroxide, is introduced into tank 26 via stream 9100 (as will be described with respect to FIG. 2) to allow a sufficient amount of sodium chloride production that will produce more aluminum flux. This option will maintain the system chloride balance and avoid the production of calcium chloride at stream 1800. Accordingly, by adding a sufficient amount of caustic to reactor 26 the system can be regulated so that no calcium chlorides are produced thereby eliminating the need to dispose of excess calcium chlorides in stream 1800 which does not have a market.

Referring again to the Simonkolleite portion of the process, the process comprises the production of high purity Simonkolleite in equilibrium with zinc oxide and other minor zinc oxychlorides from a concentrated chloride pregnant solution containing zinc chloride complex ions which is of sufficient purity for subsequent conversion as a feed stock to produce high purity zinc or zinc oxide. An unexpected method for the production of Simonkolleite (an intermediate oxychloride to be used in the production of zinc oxide) or zinc metal, from a high concentration chloride solution, first includes its partial precipitation through the addition of water to a pregnant solution to reduce the chloride concentration and second, further precipitation through the addition of a base. Using this process, 5% to 100% purity Simonkolleite can be produced in equilibrium with zinc oxide. The solution may comprise one or a combination of the following: calcium chloride, sodium chloride, potassium chloride or any other Group I and Group 2 chlorides. The solution typically contains zinc at a concentration greater than 500 ppm and preferably 10,000 ppm or greater. In a first stage of the process, dilution water is added to the solution such that up to 35% of the zinc unexpectantly precipitates as Simonkolleite. This unexpected precipitation conserves the amount of base to be added and thus reduces the base required by 35%. The specific gravity is reduced to below 1.43 (1.39 preferred) or the chloride concentration is reduced by other methods to an equivalent level. A base is added in a second step to the solution to precipitate the majority of the remaining zinc chloride complex present in the original solution as Simonkolleite. The base may comprise calcium hydroxide or calcium oxide. The base may also comprise one or a combination of sodium hydroxide or potassium hydroxide. The first and second steps may be combined into a single step. The process is conducted at atmospheric pressure and the temperature preferably is between the solution crystallization point and the solution boiling point. The addition of water during the first stage is exothermic. The addition of a base to the solution is also exothermic. The solution is mixed to facilitate the reaction. The solids are separated from the solution after precipitation. The solids are then washed and contain less than an expected amount of lead and cadmium which remained in trace or very small quantities after the metal removal. The solution pH is typically below 9.0. The solution pH may be held at or below 7.2 to minimize the co-precipitation of magnesium present in commercially available calcium oxide and hydroxides. Washing with a hot solution of calcium chloride in stream 810 removes excess potassium chloride. The solution of calcium chloride in water typically is held at a temperature between 70–130° C. and has a specific gravity of between 1.41 to 1.45 at 90° C. The wash solution may be recycled by separating the solids from solution. Washing the solids with water removes excess soluble chloride. The wash water temperature typically is between 20–100° C. The filtrate typically is suitable for regeneration and reuse. The resultant product is an ideal feed stock for producing small particle and high surface area zinc oxide, known as active or reactive zinc oxide.

Referring now to the Metals Loop of the process, heavy metal cement tank 24 feeds the displaced metals in stream 2000 to a cadmium leach tank 42. Leach tank 42 also receives hydrochloric acid in stream 9200 from a hydrochloric acid storage tank 44. Leach tank 42 feeds the resulting solution in stream 2100 to a lead filter 46. Lead filter 46 feeds the separated lead in stream 2150 to a lead furnace 50 and the displaced metals solution, without lead, in stream 2200 to a cadmium cementation tank 48. Lead furnace 50 feeds lead in stream 1400 for transport to outside sales. Cadmium cementation tank 48 receives zinc powder in stream 9300 from a zinc powder storage bin 52 and feeds the resulting solution in stream 2300 to a cadmium filter 54. Cadmium filter 54 feeds the separated cadmium solution in stream 2350 to a cadmium furnace 56 and water, including some zinc chlorides, in stream 2500 to heavy metal cement tank 24. Cadmium furnace 56 feeds the cadmium in stream 1500 for transportation to outside sales. This completes the Metals Loop, which should be understood by those skilled in the art.

Referring now to the Zinc Oxide Loop of the process, the clean Simonkolleite cake, with a very low chloride concentration, is fed in stream 1000 to reslurry tank 36, along with water in stream 530. Re-slurry tank 36 feeds the watery Simonkolleite slurry in stream 1100 to a zinc oxide reactor 60. The contents of reactor 60 are heated to a temperature of approximately 160 to 190° C., and preferably to a temperature of approximately 170° C. (The reactor generally is heated to a temperature of approximately 140–150° C. when caustic is added to reactor 60, as discussed with respect to FIG. 2). Reactor 60 also receives lime (calcium oxide) in stream 9150 from a lime storage stank 62. The temperature of the solution, and the addition of lime to the solution, results in the conversion of the Simonkolleite to high purity grade zinc oxide by the following reaction:

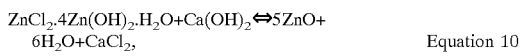
$$ZnCl_2 \cdot 4Zn(OH)_2 \cdot H_2O + Ca(OH)_2 \Leftrightarrow 5ZnO + 6H_2O + CaCl_2, \qquad \text{Equation 10}$$

wherein the Simonkolleite can be written as $ZnCl_2 \cdot 4Zn(OH)_2 \cdot H_2O$ or as $Zn_5Cl_2O_4 \cdot 5H_2O$.

The resulting zinc oxide, calcium chlorides and water are fed in stream 1150 to a zinc oxide product filter 38, which also receives recycled water in stream 510 from evaporator 32. Filter 38 typically is a two-stage filtration process. First, the filter presses the solution so that the solid zinc oxide precipitate remains in the filter and the calcium chlorides and water leave the filter in stream 580 to filtrate tank 68. Water in stream 510 is then used to wash the zinc oxide solids so that the small amount remaining of the calcium chloride and the water is removed in stream 520 to spent zinc oxide wash tank 64. The zinc oxide solids are then removed from the filter in stream 1200 to a zinc oxide dryer and pulverizer 66. Stream 530, comprising a very dilute solution of calcium chloride and water, is recycled back to reslurry tank 530 and stream 580, comprising dilute calcium chloride and water, is recycled back to filter 28 via stream 540.

Dryer 66 typically is operated at 125 to 500° C., and at a preferred temperature of 200° C., to remove moisture and hydrates, which comprise approximately 3% of the stream, from the zinc oxide. The dryer feeds the dried product in stream 1300 to outside sales. Stream 1300 typically comprises 98% zinc oxide, but, under preferred reaction conditions, comprises approximately 99% zinc oxide. As stated above, the zinc oxide produced is active and has a large surface area, rendering the zinc oxide suitable for use in rubber and plastic compounding. This completes the Zinc Oxide Loop. This process could also be used for other oxychlorides such as the recovery of copper oxides. For example, once copper oxychloride is made, this process can be used to make copper oxide.

The process of the present invention converts Simonkolleite and other zinc oxychlorides to zinc oxide, meeting specifications and suitability for use as rubber grade zinc oxide with more than 99% pure zinc oxide. The zinc oxide has less than 2,000 ppm chlorides and under preferred conditions less than 1000 ppm and has a particle size of 0.05 micron to 0.5 micron. The process produces an active zinc oxide with a surface area of 10–70 m/gram, providing better reactivity and economy compared to French processed zinc oxide. This large amount of surface area offers a more reactive product allowing its use at lower levels than is currently practiced.

The precipitate, Simonkolleite in equilibrium with zinc oxide, zinc hydroxide, and/or other zinc oxychlorides and their hydrates, produced from zinc chloride complex solutions high in chlorides or from the addition of a base to concentrated zinc chloride solution of sufficient purity, or from other sources, is used as the feed stock to make high purity zinc oxide. The solids of the equilibrium solution are separated from the high chloride solution from which they were produced by filtration or other methods. The solids may be washed to further reduce residual soluble chlorides (not oxychlorides). The solids are then reslurried/repulped in fresh water or recycled water containing less than 5% chlorides. Calcium hydroxide or oxide is added to the reslurried solution of the Simonkolleite/zinc oxychloride/zinc oxide in stoichiometric quantities or greater to be available to react with the chloride ions in the Simonkolleite and zinc oxychloride. Maintaining the pH between 6.9 and 7.4 keeps the Mg in the lime from precipitating with the zinc oxide. Alternatively, sodium or potassium hydroxide is added to the solution in stoichiometric quantities or greater to react with the chloride ions in the Simonkolleite and zinc oxychloride. The sodium or potassium hydroxide can be added in significant excess to reduce the chloride content below 500 ppm. The re-pulped slurry is processed in an autoclave or a reactor with a mixing capability. The temperature for the reaction typically is 140 to 200° C., and preferably 150° C. when using caustic or 170° C., when using calcium hydroxide for one hour at the natural pressure of the boiling solution. The crystal structure of the zinc oxide is tiny needle like crystals compared to prism and/or pancake shapes. The zinc oxide surface area typically is in excess of 20 m/g and less than 70 m/g. The particle size typically is between 0.1 and 0.5 microns. The lead, copper and magnesium contaminants are low. In particular, the lead level of the zinc oxide is below 60 ppm. The cadmium level of the zinc oxide is below 30 ppm. The magnesium content of the zinc oxide level is below 300 ppm. The zinc oxide cake is washed until free of soluble chloride salts produced from the reaction. The final chloride content typically is below 1000 ppm. The filter cake is dried to a temperature between 125° C.–600° C. The product can be produced as a dust free pellet or a briquette without binder. The sequence of process steps set forth above can be reconfigured to optimize recovery selection and to reflect changing economics. Additional cementation steps utilizing more than one dust for cementation may be added in sequence as required for additional or selective metal removals.

As described above, the process is a batch process. However, the process of the present invention may also be carried out as a steady state continuous process.

In particular, the process works based on the relative insolubility of iron, magnesium, calcium and others under conditions of pH 6 and above in a high calcium chloride concentration, while the desirable metals will exchange with the calcium, becoming metal chlorides and precipitating calcium hydroxide driving the reaction in reverse. The overall efficiency of the process depends on the chloride and calcium concentration, the temperature, pulp density, reaction residence time, and mixing rate.

The process provides conditions to remove halogen salts. Fluorides in the feed are converted to insoluble calcium fluoride removing them from further reaction.

The process is environmentally sound with the opportunity of no liquid waste discharge and no air/odor emissions. The leach process, while operating at atmospheric pressures, does not emit off gases and thus poses no odor emission issues. The process is especially attractive as a replacement for sulfur leach chemistry and roasting used extensively in the mining industry. It is especially attractive as a means to avoid waste disposal landfilling. A typical feed stock would be Electric Arc Furnace Flue dust and its subsequent pyrolysis derivatives dusts which generally contain chloride salts formed in the thermal decomposition of PVC from scrap cars, in the presence metal vapor and metal oxides.

Still referring to FIG. 1, now that a preferred embodiment of the basic hydrometallurgical portion of the process has been described, a detailed description of the hydrometallurgical pilot plant process will be described. The scale of the pilot plant process is merely increased for commercial production.

I. Material Preparation

A. Feed material: may be chosen from the following list:
1. Zinc Hearth Dust: the zinc/metals concentrated dust derived from the off gasses of processing K061 Electric Arc Furnace Dust in combination with coal or coke in a reduction furnace to remove volatile metals and salts and reduce iron oxide and other metals to their metallized form (stream 9950).
2. K061 EAF Dust: the dust derived from the off gasses of the Electric Arc Furnace processing of scrap steel containing approximately 20–24% zinc (stream 9900)
3. Other metal feed stocks including one or more of the following: zinc, lead, cadmium, silver, copper, iron, magnesium, halogen salts and other heavy metals; metal furnace dusts, smelting dusts, waste sludges, mill tailings, ores which containing metal oxides, metal hydroxides, metal ferrites, metal sulfates/sulfites/sulfur compounds, carbonates, metal bearing materials containing chlorides or fluorides; zinc oxide dust (zinc concentrate) recovered from pyrolysis/furnace operations to roast or reduce (metallize) metal ore or waste metal bearing materials such as Electric Arc Furnace Dust when making direct reduced iron; Electric Arc Furnace Flue dust K061 derived from the off gasses of the Electric Arc Furnace processing of scrap steel where said dust contains approximately 10–40% zinc; and Electric Arc Furnace dust containing zinc ferrite.

B. Leach Solution Preparation
1. Prepare the initial or make-up "Leach Salt Solution" solution.
   a) Add 69.76 kg (153.79 lb.) water into the $CaCl_2$ tank (tank 22). Record the weight and the time of addition.
   b) Add 77.44 kg (170.73 lb.) $CaCl_2$ to the water in tank 22. Record the weight, time and temperature of addition.
2. Mix the solution vigorously for 10 minutes or until all $CaCl_2$ is dissolved.
3. Determine the specific gravity using a hydrometer at 90° C. The target specific gravity is 1.49.

Figure 2:
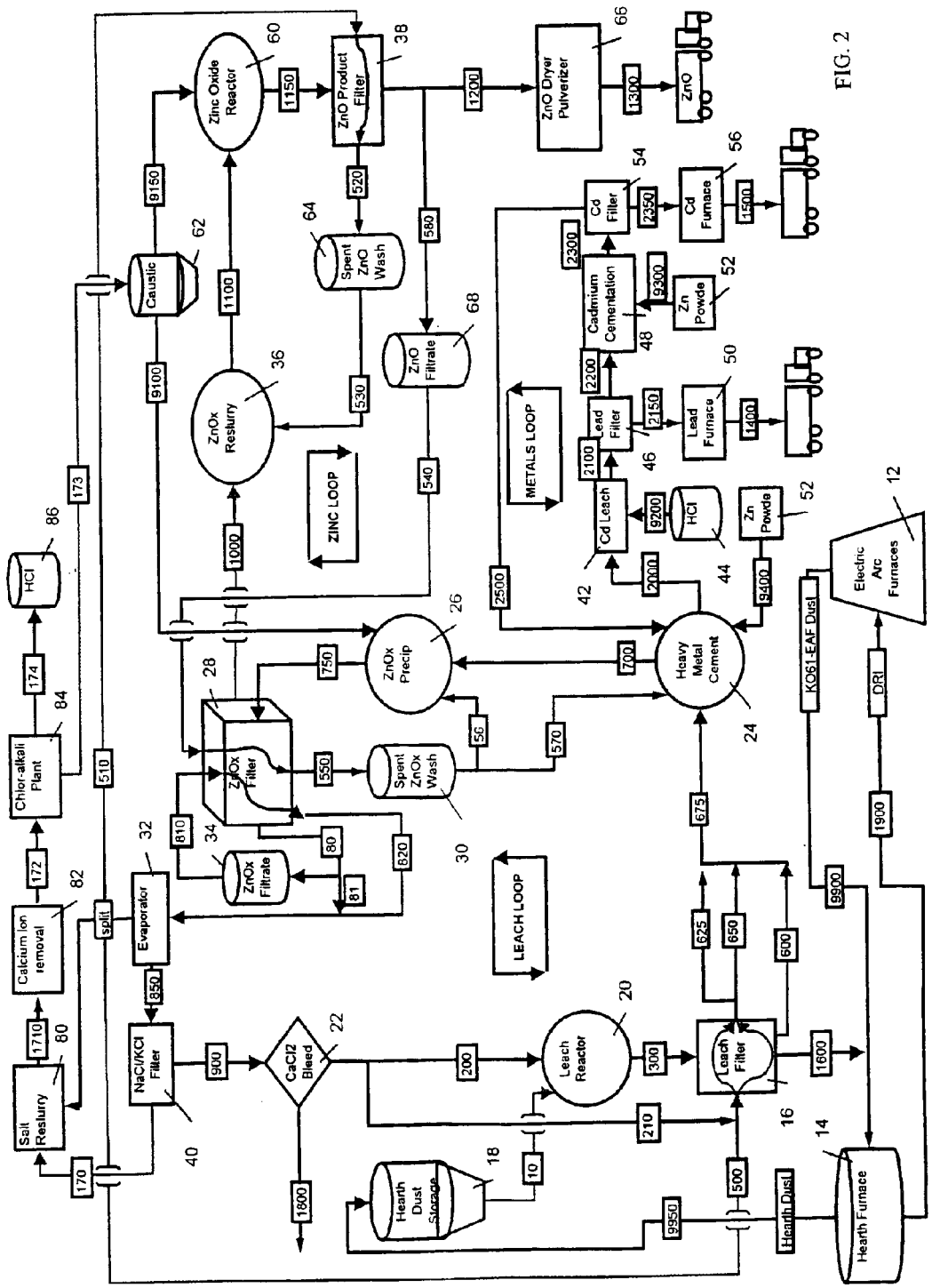
FIG. 2 is a schematic flow diagram of the zinc oxide recovery process utilizing caustic for zinc precipitation and hearth dust as the feed stock.
Figure 3:
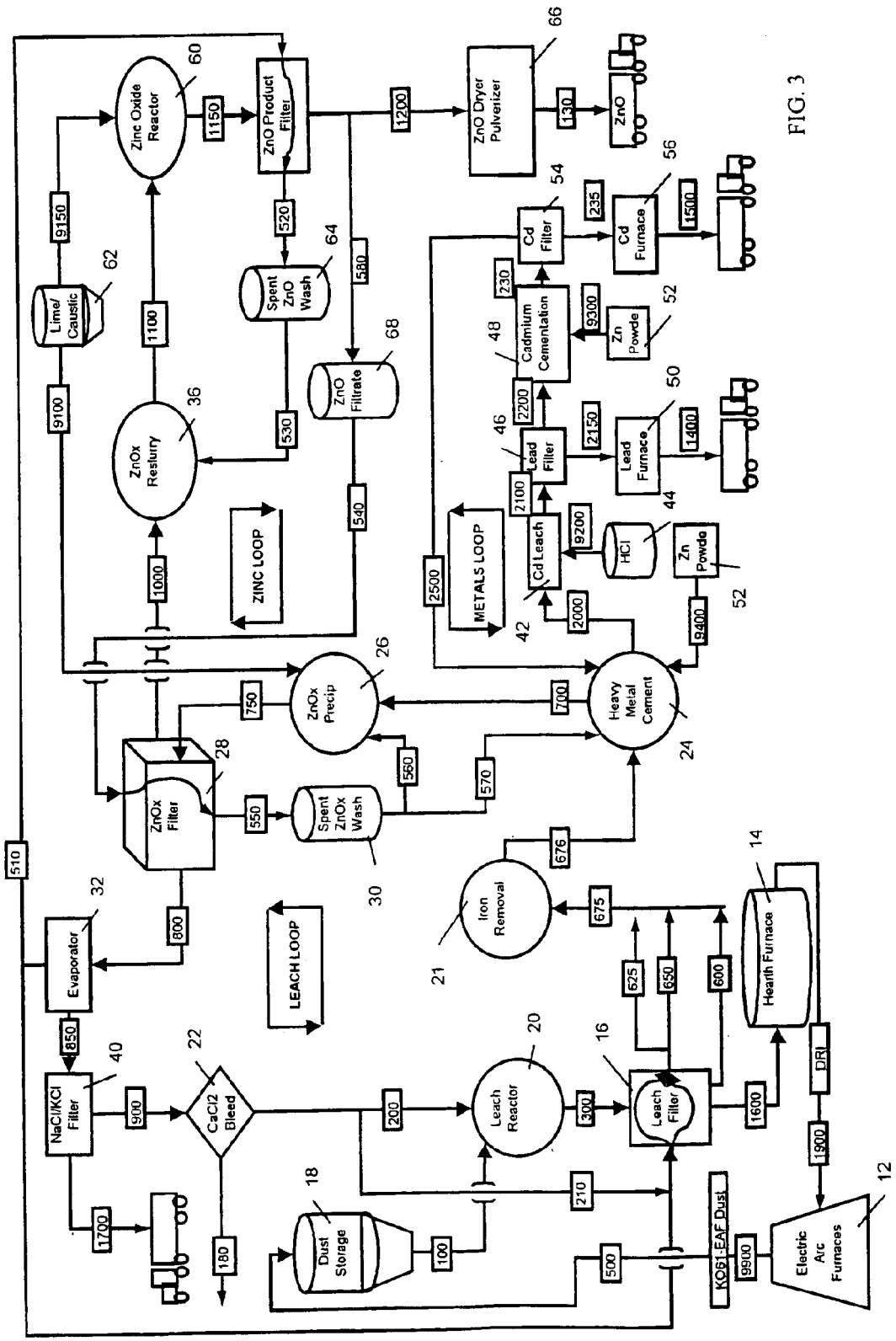
FIG. 3 is a schematic flow diagram of the zinc oxide recovery process utilizing lime for zinc precipitation and EAF dust as the feed stock.
Figure 4:
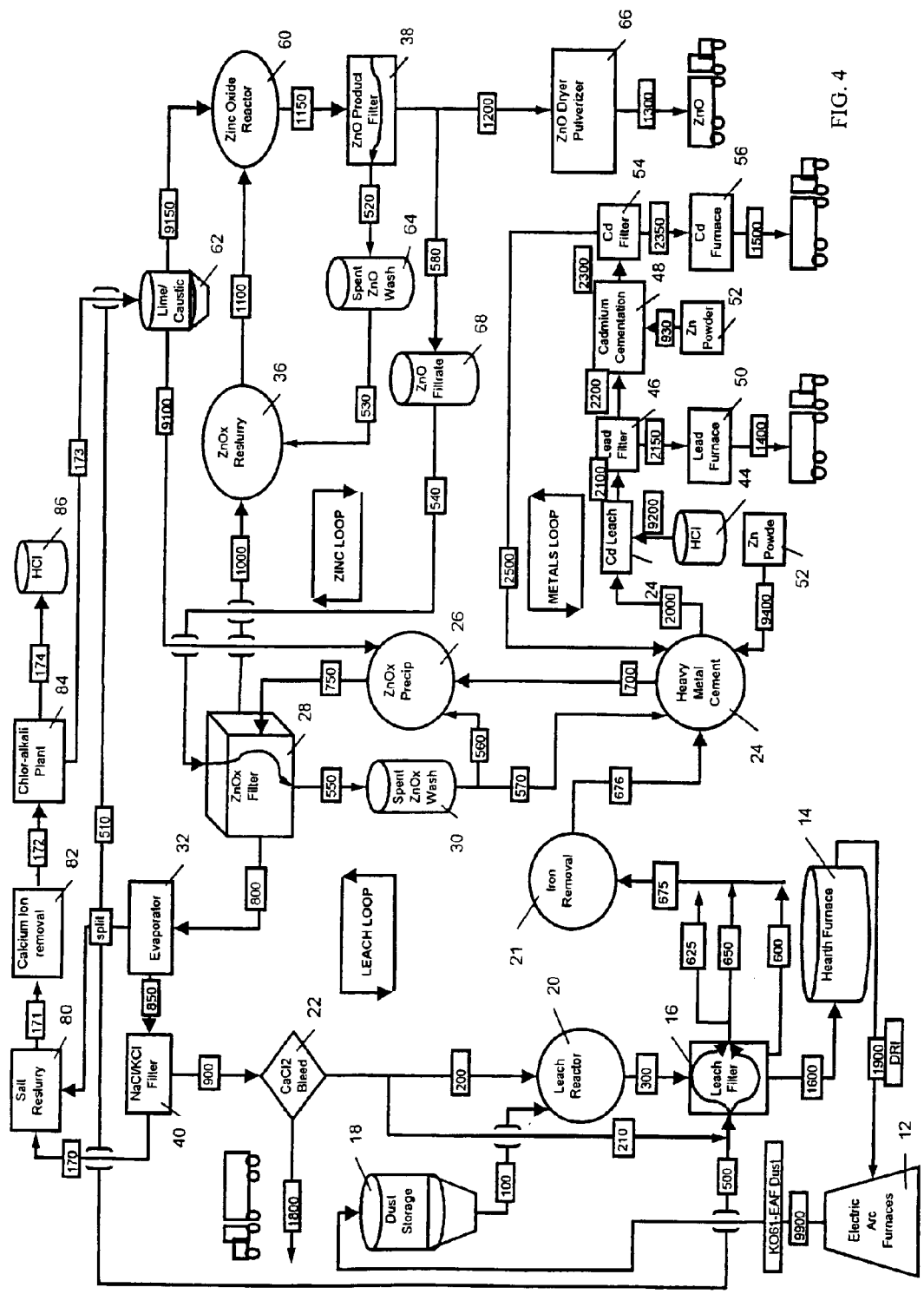
FIG. 4 is a schematic flow diagram of the zinc oxide recovery process utilizing lime for zinc precipitation and EAF dust as the feed stock.

C. $Ca(OH)_2$ Solution Preparation
1. Prepare a solution containing 18.9% CaO (should be prepared 24 hours before intended use).
   a) Place 50 kg of water inside the CaO tank (tank 62).
   b) Add 11.65 kg of CaO to the CaO tank.
   c) Allow the solution to mix for at least 30 minutes
   d) Wait at least 2 hours before using the solution D. Process Configuration
1. FIG. 1 shows a schematic flow diagram of the zinc oxide (and other products) recovery process utilizing a pyrolysis furnace to make an iron/calcium briquette, and crude hearth dust leached with calcium chloride; and utilizing lime for zinc precipitation (the preferred embodiment described below);
2. FIG. 2 shows a schematic flow diagram of the zinc oxide (and other products) recovery process showing a pyrolysis furnace to make an iron/calcium briquette, and crude hearth dust; and utilizing caustic for zinc precipitation and then its recycle utilizing a chlor-alkali-plant.
3. FIG. 3 shows a schematic flow diagram of the zinc oxide recovery process directly from K061 utilizing lime for zinc precipitation; and using a reduction furnace produce to metallized iron briquettes
4. FIG. 4 shows a schematic flow diagram of the zinc oxide recovery process from K061 utilizing sodium hydroxide for zinc precipitation; and using a reduction furnace to produce metallized iron briquettes.

II. Standard Pilot Plant Operating Procedure-Pyrometallurgical

Prior Art: Reduction processes for metallizing (converting iron oxide to iron metal) iron bearing wastes and specifically KO-61 have used only carbon (coke, coal, etc.) to reduce the metals and allow the vaporization of non-ferrous metals like zinc. Commercial recovery of KO-61 is general inefficient, removing only 80–90% of the zinc and metallizing only 90% of the iron.

Reduction/Metallization/Non-Ferrous metals removal:

Calcium hydroxide, calcium carbonate, calcium oxide, magnesium hydroxide, magnesium carbonate, or magnesium oxide along with metallurgical coke is mixed with KO61 (or other iron and non-ferrous bearing streams) and a small amount of water. The blend is often made into a "green ball" being charged to a metallizing reduction furnace/rotary hearth furnace, rotary or stationary kiln or other similar furnace process which significantly increases the recovery (removal) of such non-ferrous metals, including, but not limited to, zinc, lead, silver and cadmium. The furnace is further fired with natural gas or other gas, liquid or solid fuel to achieve the necessary temperatures. The addition of the calcium/magnesium improves the amount of iron metallization occurring in the product and besides providing an improved source of iron it can provide a balanced source of calcium and magnesium flux which is required in the iron and steel making process to provide for slag and steel chemistry requirements. Normally this type of metallization process produces DRI or sinter which has about 90% of these wanted non-ferrous metals removed. A typical product produced from KO-61 contains approximately 5% (50,000 mg/kg) zinc, while a briquette made from the inventive process contains between 600–900 mg/kg (see pilot plant results in Table 17). The addition of the calcium hydroxide to the KO-61 unexpectedly improves the removal to over 99% for zinc and lead removal, and over 95% for cadmium (see pilot plant results Table 18). This results in a preferred product being sold to the steel mill since the final fluxed sinter briquette product contains very low levels of non-ferrous metals when compared to other iron materials produced from KO-61 that do not use the addition of calcium and magnesium hydroxide/oxide. The process has the added advantage of providing a needed source of calcium and magnesium oxide which is required in the processing of iron ore and scrap to iron and steel. The fluxed sinter is briquetted or pelletized under elevated pressure in a standard briquetting machine so that it is not friable and will withstand the rigors of being delivered into the Electric Arc Furnace or other steel furnace with less than 1% being less than ¼ inch in size. This offers the mill the added advantage of being able to convey needed calcium and magnesium into the furnace as part of the iron briquette, using standard scrap handling magnets, just as is done for steel scrap, with the same handling costs. Because of the large size of the briquettes and their structural strength they can also be delivered to the steel melt pot, as large chunks, pneumatically or by crane magnet without being lost in the flue gas streams out of the steel furnace.

Tests were conducted in a laboratory scale using a small tube furnace to simulate the conditions in a full scale reduction furnace. In testing Round 1, approximately 33 gm of calcium hydroxide was added to 100 gm KO-61 with low levels of zinc and other non-ferrous metals and was compared to KO-61 processed without calcium hydroxide. The calcium added product consistently had 0.1–0.5% zinc, while under the same conditions, zinc ranged from 4.6–5.8% in the final product when not adding calcium oxide/hydroxide. In Round 2 tests, calcium hydroxide was added at 18 gm, to coke at 15.7 gm and 100 gm KO-61 with a small amount (approximately 10%) of water and formed into a ball. The "green" ball was preheated for 5 minutes at 275° C. and processed at 1030–1100° C. for 15–65 minutes. Zinc levels under the best conditions were in the range of 0.06–0.09%. Best results were obtained at operating temperatures of 1030° C. to 1070° C. and retention times of 30–65 minutes. For one knowledgeable in the art of metallization a much wider range of calcium hydroxide addition is possible as is the variance of amounts of carbon to achieve the desired stoichiometry in the furnace, based on the exact feed composition. The preferred conditions are a furnace retention time of 45 minutes at 1050° C. with 18 to 33 (but a wider range is likely) parts of dried calcium hydroxide, 15.7 parts of low sulfur metallurgical coke, and 100 parts Electric Arc Furnace Flue dust KO-61. It is believed that the calcium serves to increase the reaction activity of the chemical processes occurring in the process.

III. Standard Pilot Plant Operating Procedure-Hydrometallurgical

Prior Art: Leaches performed with chloride solutions have historically been performed with a chloride salt and then the addition of acid or a metal acid salt such as ferric or cupric chloride. These approaches require the addition of a costly additive or they impart unwanted ions to the solution and carry unwanted ions in the pregnant solutions to the next processing step requiring further purification or producing inferior product quality. Those leaches done with calcium chloride solutions like U.S. Pat. No. 5,078,786 (specifically limited to jarosite containing materials) requires a low pH, and leach pressures requiring a pressure vessel. Other processes use sodium chloride with the disadvantage of requiring acid or chlorine, resulting in increased chemical costs and the generation of iron chlorides needing further treatment and disposal.

Leach:

Chemistry: Probable leach reactions for Zn, Cd, Cu and Pb (herein represented by the reference M) are set forth below as equations 3–5. Other elements like Fe, Mg, Ca, Cr and Mn do not generally leach under the stated concentration unless the chloride concentrations are substantially reduced. The reactions are as follows:

$$3CaCl_2 + 2MO + 2H_2O \Leftrightarrow Ca^{++} + 2MCl_3^- + 2Ca(OH)_2 \quad \text{Equation 3}$$

$$CaCl_2 + MCl_2 \Leftrightarrow [Ca^{++} + MCl_4^-] \quad \text{Equation 4}$$

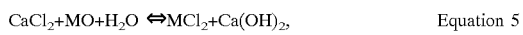
$$CaCl_2 + MO + H_2O \Leftrightarrow MCl_2 + Ca(OH)_2, \quad \text{Equation 5}$$

wherein M=Zn, Cd, Cu and/or Pb, and wherein the metal chloride complex is $MCl_3^-$.

The process is unique and different than alternative processes in that the equilibrium of extremely high calcium chloride concentrations drives the reactions "backwards" forcing the metals into solution as chloride complexes, while the calcium precipitates as calcium hydroxide. By "backwards" applicants mean that the reaction is driven to unexpectedly produce calcium hydroxide and the chloride complex. When fluorides are present in the feed insoluble calcium fluoride is formed. One of the beneficial aspects of the process is that iron is essentially insoluble at these concentrations and is thus not carried to subsequent operations, or if it is, the quantities are sufficiently small to be easily removed and recycled without making large quantities of ferric hydroxide for disposal.

While the leach temperature may be above 80° C., or the crystallization point of the solution, a temperature just below the boiling point is preferred. The preferred reaction pressure is ambient to control capital equipment costs, but the process can take place at more elevated temperatures and pressures.

A. Metals Leach Reaction

1. Add zinc hearth dust to the reactor 20.
   a) Obtain a sample of $CaCl_2$—$H_2O$ solution to be added to reactor 20. (Label: Leach Salt Solution from $CaCl_2$ tank 22).
   b) Measure out 61 L of the $CaCl_2$—$H_2O$ solution and transfer it to reactor 20 (stream 200).
   c) Measure out 2.54 kg zinc hearth dust from storage tank 18. (stream 100). Record the weight.
   d) Add this material to the 61 L of $CaCl_2$—$H_2O$ solution at 90° C. at atmospheric pressure. Record the time and temperature of addition.
2. Latch and tighten the bolts around the cover of reactor 20. This will prevent any water evaporation from the reactor during the leaching process.
3. Heat the leach reactor 20 to a reaction temperature of 120° C. The reaction time at this temperature is approximately ninety minutes at 0 psig.
4. Every 30 minutes, monitor the temperature, and pressure, and note any fluctuations.
5. After 90 minutes at the reaction temperature, remove a 125 ml sample of the slurry.
   a) Record the time and the reactor temperature
   b) Measure the pH, mV, and temperature of the sample in the Lab, conduct Inductively Coupled Plasma Emission Spectrometer (ICP) analysis.

B. Pre-Heat Filter

By heating the filter before use, this step insures that the calcium and metal salts do not crystallize out during filtration.

1. Place a clean filter leach cake cloth into filter 16. Make sure the cloth is centered before closing the filter.
2. Push down on the end labeled "pump" on the hydraulic pump located on the filter table. Run the hydraulic pump until the pressure reading on the pressure gauge is close to the red line which indicates a pressure of 2000 psi. DO NOT pump past the red line.
3. Close the valve located behind the pressure gauge of the hydraulic pump. This will help to prevent leaks through the filter.
4. Place insulation over the filter and tighten the wires around it
5. Place the heat gun at the bottom of the filter, pointing up towards the filter. The heat gun, as well as all of the other pre-heating steps, will help to prevent $CaCl_2$ precipitation in the leach cake and to speed up the rate of filtration.
6. Turn on the hot water pump switch (stream 500).

7. Slowly turn the hot water valve open and allow the water to flow through filter 16 for one minute.
8. Close the water valve and open the air valve to blow out excess water in the filter.
9. Close the air valve.
10. Attach the hose exiting reactor 20 to the hose entering the filter pump.
11. Open the air bleed valve located to the left of the reactor pressure gauge to release any vapor pressure that had built up inside the reactor.
12. Unlatch the reactor door latches and insert the outlet recirculation hose (not shown) of filter 16 into the reactor. Secure the hose with plastic cable latches.
13. Make sure all the valves on the filter are closed.
14. Open the reactor outlet valve located at the bottom of the reactor.
15. Turn on the pump to the filter.
16. Slowly open the valve to the outlet recirculation hose. This allows the hot slurry to circulate from the filter pump line and back into the reactor. The slurry will heat up the pump line as it circulates.
17. Allow the slurry to circulate in the lines for a couple of minutes before proceeding to the Leach Slurry Filtration step.
18. Check the temperature of the solution in $CaCl_2$ leach solution tank (tank 22) to make sure is approximately 90° C. and the specific gravity of the solution is at 1.49. Add water if necessary to adjust the specific gravity to 1.49.
19. Take a $CaCl_2$ Leach Salt Wash solution sample. (Label: Leach Salt Wash (before wash))
    a) Record the time and temperature of the solution.
    b) Measure the pH, mV, and temperature of the sample in the lab.
    c) Conduct an ICP analysis.

C. Leach Slurry Filtration
1. Maintain the solution temperature between 90°–1101° C. while filtering through the Larox filter 16.
2. Close the outlet recirculation valve slightly to decrease the amount of solution that flows back into reactor 20.
3. Slowly open the valve to the filter and allow the slurry pressure to reach a pressure within the range of 60–90 psi.
4. Collect the filtrate in buckets (stream 625).
5. Close the filter outlet recirculation valve.
6. Check the level of solution inside the reactor and allow the pump to continue pumping until the sound of the pump starts to change.
7. Close the reactor outlet discharge valve.
8. Open the valve to the Larox filter diaphragm pump.
9. Open the valve located on the left side of the pressure gauge on the Larox filter diaphragm pump. This allows water to be pumped into the diaphragm and press the solids inside the filter to "squeeze" more fluids out of the cake.
10. Slowly open the filter outlet valve and pump the remaining slurry in the lines into a bucket (stream 650).
11. Turn off the pump.
12. Detach the hose and attach it to the outlet located at the bottom of $CaCl_2$ tank 22.
13. Transfer filtrate to the cementation Tank 24 after filtration and hold at approximately 90° C.+.
14. Determine the filtrate volume.
15. Determine the specific gravity of the filtrate.
16. Remove a 50 ml sample of the filtrate. (Label: Leach Filtrate)
    a) Record the time and reactor temperature.
    b) Measure the pH, mV, and temperature of the sample in the lab.
    c) Conduct an ICP analysis.
    d) Note any observations.
17. Measure and record the volume and the weight of the remaining slurry.
18. Dispose of the remaining slurry properly. (Note: the remaining slurry is disposed of during this pilot plant process because only small quantities are used for measurement purposes. During commercial processing all of the products and wastes of the process are fed back into the system so that all streams are recycled.)

D. "Leach Salt Solution" Wash
This step is designed to remove the entrained pregnant leach solution from the filter cake and has been found to further increase metals recovery.
1. Open the valve located at the bottom of the $CaCl_2$ tank 22.
2. Turn on the pump to filter 16.
3. Close the air valve (hereinafter the yellow lever) to pressurize the Larox filter diaphragm pump.
4. Slowly open the valve to the filter and close the valve to the diaphragm return/relief line (hereinafter the blue lever) on the Larox filter diaphragm pump to relieve the pressure in the diaphragm.
5. Wash the filter cake solids from filter 16 with the $CaCl_2$ solution from tank 22 (total of 13.6 L) solution. (stream 210)
    a) Close the filter outlet valve to stop the flow of filtrate when 3 L of $CaCl_2$ solution has been collected. This will allow the solution to fill the filter and soak the solids to achieve maximum zinc recovery.
    b) Allow the solids to soak for two minutes.
    c) Open the filter outlet valve.
    d) Wash the solids with an additional 10.6 L of $CaCl_2$ solution.
6. Remove 50 ml of spent $CaCl_2$ wash solution (after washing the solids) (Label: Spent Leach Wash Salt)
    a) Record the time and temperature of the wash solution
    b) Measure the pH, mV, and temperature of the sample in the lab.
    c) Conduct an ICP analysis.
7. Open the valve (yellow lever) to the Larox filter diaphragm pump.
8. Open the valve (blue lever) located on the left side of the pressure gauge on the Larox filter diaphragm pump. This allows water to be pumped into the diaphragm and press the solids inside the filter to "squeeze" more fluids out of the cake.
9. Detach the feed hose, stream 200, (hereinafter the green hose) from the filter.
10. Slowly open the outlet valve and pump the remaining solution in the lines into a bucket and transfer it back into the $CaCl_2$ tank 22.
11. Turn off the pump.
12. Determine the total spent $CaCl_2$ wash volume and specific gravity.
13. Add spent wash solution to the leach filtrate in cementation Tank 24 and maintain the temperature in the range of 90–110° C. (stream 650).

E. Water Wash

This step is included to wash out and recover chlorides, recover potassium chloride and sodium chlorides, and increase non-ferrous metal and specific copper recovery. It has been found that as the chloride concentration slowly decreases that the solubility of copper increases. Wash time and duration of the contact directly effect the recovery and can be varied to increase or decrease specific metals recovered based on the various feed materials charged to the leach.

1 For this test, fresh water will be used, but recycled water may also be used.

2. Turn on the water pump to the water tower.

3. Close the valve (yellow lever) on the Larox filter diaphragm pump.

4. Slow open the water valve to the filter and close the valve (blue lever) on the Larox filter diaphragm pump.

5. Use 6.3 L of $H_2O$ to wash the leached cake solids (stream 500) following the $CaCl_2$ wash (stream 210).
    a) Close the filter outlet valve to stop the flow of filtrate when 3 L of wash water has been collected. This will allow the solution to fill the filter and soak the solids to achieve maximum salt recovery.
    b) Allow the solids to soak for two minutes.
    c) Open the filter outlet valve.
    d) Wash the solids with an additional 3.3 L of wash water.

6. Open the valve (yellow lever) to the Larox filter diaphragm pump.

7. Open the valve (blue lever) located on the left side of the pressure gauge on the Larox filter diaphragm pump. This allows water to be pumped into the diaphragm and press the solids inside filter 16 to "squeeze" more fluids out of the cake.

8. Determine the spent wash water volume. Theoretical volume=6.3 L

9. Obtain a 50 ml wash water sample (after washing the solids, Label: Spent Leach Wash Water (after wash)).
    a) Record the time and temperature of the wash water solution sample.
    b) Measure the pH.
    c) Conduct an ICP analysis.

10. Add the spent wash water to cementation Tank 24 (stream 600).

11. Obtain a sample of a combination solution of leach filtrate, leach salt wash, and water wash (solution in the cementation Tank) (stream 675, Label: Leach Blend (filtrate+Salt+$H_2O$ Wash)).
    a) Record the time and temperature of the combined solution.
    b) Measure the pH.
    c) Conduct an ICP analysis.

12. Close the valve (yellow lever) on the Larox filter diaphragm pump.

13. Slow open the air valve to the filter and close the valve (blue lever) on the Larox filter diaphragm pump.

14. Allow the air to flow through filter for 1 minute.

15. Close the air valve to filter.

16. Turn off the heat gun and remove the insulation.

17. Open the filter by pushing the end labeled "release" on the hydraulic pump.

18. Carefully remove the filter cloth and the cake from the filter.

19. Obtain a sample of cake (Label: Leach Cake) (stream 1600).
    a) Record the total weight of the cake.
    b) Record the thickness of the cake.
    c) Conduct an ICP analysis.
    d) Store the solids inside a plastic bag. Label the bag properly.

Cementation Step:

Lead, copper, cadmium, silver, other valuable metals and trace amounts of iron are cemented out in this process. The uniqueness of the process relies on varying the chloride concentration with water dilution concentration, instead of pH control with acid addition, to set up the conditions where the addition of zinc, aluminum, copper, or iron powder or dusts will selectively cement out the desired metal to be recovered. The uniqueness of the process is that at natural pH conditions of 6 pH or higher the desired metals cement out and, unexpectedly, metal oxides or hydroxides are not produced. Thus, the metals made are suitable for metal smelters/refiner/processors, production of elemental metal or other processes seeking reduced (metallized) metals or direct sale.

The process produces a filtrate (pregnant zinc solution), which contains zinc chloride complexes, which is pure and ideally suited for the production of zinc oxychloride and subsequently rubber grade 99% active zinc oxide. The preferred solution contains less than 2 ppm of lead, copper, cadmium, and iron.

The preferred method for processing of the pregnant leach solution from zinc hearth dust or KO61 is to cement all the metals simultaneously with zinc dust and directly sell or process the recovered metals in an additional step to extract cadmium from smelter feed. The process can be performed with a single stage or continuous countercurrent reaction, but a two stage countercurrent process is preferred to increase the efficiency of the zinc dust addition to the preferred utilization of 1.2 times stoichiometric.

The prior art processes require the adjustment of pH below pH 6 through the addition of costly acid and then the addition of a base to facilitate the desired cementation without the formation of unwanted metal hydroxides or oxides. In contrast, the present invention uses a pH of approximately six or greater and does not require an acid or a base to facilitate the desired cementation step conditions.

F. Iron Removal Pretreatment/Post Treatment: This step may be a) omitted, b) performed before the cementation of metals, or c) performed after cementation.

1. Mix the combined solution (pregnant leach filtrate, $CaCl_2$ spent wash and the water spent wash).

2. Add additional water to the solution as required to adjust the preferred specific gravity to 1.43.

3. Sparge the solution gently with air or oxygen at 70–90° C. until saturated and floc forms. Accordingly, the iron is oxidized by the injection of oxygen or air and the iron is then separated.

4. Filter out the iron bearing solids using poly-electrolyte coagulant as required (such as Nalco 9812).

5. Analyze to confirm that the iron content of the filtrate is below 6 ppm.

G. Cementation of Metals from the Pregnant Leach Solution: A two stage counter current reaction is preferred.

Stage I:

Mix the combined solution (pregnant leach filtrate, $CaCl_2$ spent wash, and $H_2O$ spent wash).

1. Add water to the combined leach solution as required to adjust the specific gravity to 1.43.

2. Remove a 50 ml sample of solution (Label: Cementation Solution Start).
3. Combine the mixed solutions with the partially reacted zinc and metal solids settled from Stage II and mix vigorously for 45 minutes at 90° C.
4. The following reactions take place in cementation:
   a) $Zn+[Ca+2MCl_3] \Leftrightarrow M[CaZnCl_3]$
   b) $Zn+MCl_2 \Leftrightarrow M+ZnCl_2$
5. Obtain a sample of solution (Label: Cement, Stage 1@ Time _____ )
   a) Record the time and date.
   b) Measure the pH.
   c) Conduct an ICP analysis.
6. Check with lab personnel to determine the lead level in solution.
   a) If more than ~25% of the lead that came into cementation Stage I is left in solution, add 20 g of zinc dust to the solution and mix for another 30 minutes (level of Pb should be <400 mg/kg).
      (1) Obtain a sample of solution (Label: Cement, Stage 1@ Time _____ )
      (2) Record the time and date.
      (3) Measure the pH.
      (4) Conduct an ICP analysis.
   b) Check with lab personnel to determine the level of Pb remaining in solution (the level of Pb should be <400 mg/kg).
   c) Pump all of the solution and solids in cementation Tank 24 into buckets using the gray pump.
   d) Allow the solids to settle inside the buckets.
   e) Decant the solution back into cementation Tank 24 for Stage II.
   f) Collect the remaining solids into one bucket and decant. The cementation solids are now ready for the heavy metals refining step. (stream 2000).
      (1) Obtain a sample of the solids (Label: cementation Solids).
      (2) Record the total weight of the solids.
      (3) Conduct an ICP analysis.
      (4) Store the solids inside a plastic bag. Label the bag properly.

Stage II

7. Determine specific gravity of the solution from Stage I. Add water as required to set the specific gravity to 1.43 (stream 570).
8. At 90° C., add 80 g Zn dust into cementation Tank 24. Record the weight, time, and temperature of addition.
9. Mix vigorously for 30 minutes.
10. Obtain a sample of solution (Label: cementation Stage 2 @ Time _____ ).
    a) Record the time and date.
    b) Measure the pH.
    c) Conduct an ICP analysis.
11. Check with Lab Personnel to make sure the level in solution of Pb<5 mg/kg, Cd<2 mg/kg, and Cu<1 mg/kg. If any of the heavy metals in solution is higher than the values specified above, add an additional 20 g Zn dust and mix for another 30 minutes before filtering. Repeat as necessary.
12. Filter the solution using a cartridge filter and leave all the solids inside the tank. The solids will be used in Stage I of the next incoming batch (stream 700).
13. Obtain a 50 ml sample of the filtrate (Label: cementation Stage 2 Filtrate)
    a) Record the time and date.
    b) Observe the pH.
    c) Conduct an ICP analysis.

Determine the Solution Volume and Specific Gravity.
Transfer the filtrate into Precipitation Tank 26.
Repeat steps A–F for another run before proceeding to step G to amass to full runs for the next step.

Heavy Metals:

Because some lead smelters may prefer feed without cadmium, the inventive process takes the heavy metals (stream 2000) and reacts them with hydrochloric acid (stream 9200) to selectively leach cadmium. The lead, copper, and silver are filtered or separated out (stream 2150). The cadmium solution (stream 2200) is cemented with zinc dust (stream 9300) after pH adjustment under conditions well known in the industry and separated from the barren solution (stream 2500) by filtration. The barren solution can then be recycled (stream 2500) back into the process. Other extractive and separation processes may also be used.

The heavy metal concentrate (stream 2150) is pelletized and may then be introduced to a molten metal bath and made into ingots (stream 1400). The cadmium concentrate (stream 2350) is pelletized and may then be introduced to a molten metal bath and made into ingots (stream 1500).

Simonkolleite/Zinc Oxychloride Precipitation:

The present invention first produces a high grade Simonkolleite and then purposefully converts it to a high purity zinc oxide. This is accomplished by adding water (stream 540) to dilute the solution chloride concentration sufficiently to begin to reverse the leach reactions. The result is the spontaneous and unexpected precipitation of approximately 35% of the zinc without the addition of a base. In the second phase of this step, a base is added to precipitate the bulk of the remaining zinc in solution. A cold solution temperature is preferred because it produces almost pure Simonkolleite, recovers approximately 95% of the zinc in solution, and makes the determination of the amount of base to be added a direct function of the remaining zinc in solution.

The selection of the base is determined by the economics and the desired end products of the entire process. Burnt lime (calcium oxide slurried to make calcium hydroxide) is preferred because at this time, as it is less costly over all when considering the desired end products, it is preferably used in the reduction furnace, and is a relatively inexpensive raw source material. Alternatively, the inventive process lends itself to the use of sodium/potassium hydroxide because these bases produce salt, which when extracted from the solution, become feed for a chlor-alkali plant or other recycling process which can then produce sodium/potassium hydroxide and hydrochloric acid to be sold or used again in the process.

The Simonkolleite bearing solution can be separated, preferably with a filter, from the high chloride barren solution (stream 550) and may be hot washed at 90° C. with, preferably, a calcium chloride solution (stream 810) to remove potassium chloride and to retain potassium in solution. The Simonkolleite is then water washed (stream 540) to remove residual soluble chlorides to facilitate the quality of the Simonkolleite during the conversion to zinc oxide. The spent wash water (stream 550) is then recycled. Having the lowest possible level of soluble chlorides in the Simonkolleite/zinc oxychlorides after it is reslurried assures the lowest possible level of chlorides in the final zinc oxide product when processed, according to the process disclosed herein.

H. Dilution of Filtrate Solution with water:
  1. This step contains the solutions from two separate runs that have completed the cementation step.

2. If the temperature of the solution is above room temperature, turn on the cooling coil to cool the solution down to room temperature (20–25° C.).
   a) Remove a 50 ml sample (Label: ZnOx Liquid Before (before dilution))
      (1) Record the time and date.
      (2) Measure the pH.
      (3) Conduct an ICP analysis.
      (4) Determine the solution volume and specific gravity at room temperature.
3. Obtain a sample of the solution in Zinc Oxychloride Spent Wash Tank 30 (recycled from prior runs) before using it for dilution. (Label: ZnOx Dilution Water)
   a) Record the time and date.
   b) Measure the pH.
   c) Conduct an ICP analysis.
4. Add water stored in Zinc Oxychloride Spent Wash Tank 30 to Zinc Oxychloride Precipitation Tank 26 until the specific gravity of the Zinc Oxychloride Precipitation Solution is 1.39 at room temperature (stream 560).
5. Mix for 60 minutes.
6. Determine the total solution volume at SG=1.39 and room temperature.
7. Remove a 125 ml sample of solution (Label: ZnOx Liquid After (after dilution))
   a) Record the time and date.
   b) Measure the pH.
   c) Conduct an ICP analysis of the diluted solution.
8. Check with Lab Personnel to determine the level of Zn left in solution.
9. The amount of lime required is calculated by the following formula: Lime (18.9% calcium hydroxide) Solution (g) Required=[Solution Vol. (L) at SG 1.39 X zinc (mg/kg) less 500(mg/kg)] X 0.0053214)

This step produces predominantly Simonkolleite (a zinc oxychloride) and small amounts of zinc oxide, depending on conditions, which is believed to occur according to the following reactions:

$$5Ca^{++}+2ZnCl_3^-+8Ca(OH)_2 \Leftrightarrow Zn_5Cl_2O_4 \cdot 5H_2O+13CaCl_2 \quad \text{Equation 7}$$

$$Ca^{++}+2ZnCl_3^-+2Ca(OH)_2 \Leftrightarrow 2ZnO+3CaCl_2+2H_2 \quad \text{Equation 8}$$

$$ZnCl_2+Ca(OH)_2 \Leftrightarrow ZnO+CaCl_2+H_2O, 2 \quad \text{Equation 9}$$

wherein the Simonkolleite is $Zn_5Cl_2O_4 \cdot 5H_2O$.

I. Zinc Oxychloride Precipitation Step 2
1. Obtain a sample of the lime used in this step (Label: ZnOx Lime)
   a) Record the time and date.
   b) Measure the pH.
   c) Conduct an ICP analysis.
2. Measure and add the amount of Lime calculated in step G to the Zinc Oxychloride Precipitation Tank 26 at room temperature (stream 9100).
   a) Record the total weight of Lime used and the time of addition.
3. Mix the solution vigorously for one hour.
4. Remove a 125 ml sample of the slurry at 45 minutes and at 60 minutes after the lime addition (Label: ZnOx Slurry @ Time _____).
   a) Record the time and date the sample is taken.
   b) Measure the pH.
   c) Conduct an ICP analysis of the slurry.
5. Filter the solution through the Larox filter 28. The solution may be filtered in several batches (stream 750). To filter the ZnOx Slurry in 3 batches divide the total slurry volume in 3 and do step 5–23 for each batch.
   a) Attach the green hose to the outlet located at the bottom of Zinc Oxychloride Precipitation Tank 26.
   b) Place a clean filter zinc oxychloride/ZnO cloth into filter 28. Make sure the cloth is centered before closing the filter.
   c) Push down on the end labeled "pump" on the hydraulic pump located on the filter table. Allow the air to pump until the pressure reading on the pressure gauge is close to the red line. DO NOT pump past the red line.
   d) Close the valve located behind the pressure gauge of the hydraulic pump. This will help to prevent leaks through the filter.
   e) Make sure all valves on the filter are closed
   f) Open the Zinc Oxychloride Precipitation Tank outlet valve.
   g) Turn on the pump.
   h) Collect the filtrate in buckets.
6. Transfer the filtrate to Evaporation Tank 32 (stream 800 or 820).
7. Check the level of solution inside the tank and detach the green hose when the tank is empty.
8. Allow the pump to continue pumping until the sound of the pump starts to change.
9. Open the valve (yellow lever) to the Larox filter diaphragm pump.
10. Open the valve (blue lever) located on the left side of the pressure gauge on the Larox filter diaphragm pump. This allows water to be pumped into the diaphragm and press the solids inside the filter to "squeeze" more fluids out of the cake.
11. Slowly open the outlet valve and pump the remaining slurry in the lines into a bucket.
12. Turn off the pump.
13. Dispose of the slurry properly.
   a) Determine the total filtrate volume.
   b) Obtain a 50 ml sample of filtrate (Label: ZnOx Filtrate).
      (1) Record the time and date.
      (2) Measure the pH.
      (3) Conduct an ICP analysis.
14. Turn on the water pump to the water tower.
15. Close the valve (yellow lever) on the Larox filter diaphragm pump.
16. Slow open the water valve to the filter and close the valve (blue lever) on the Larox filter diaphragm pump.
17. Use 25 L (total) of $H_2O$ to wash the Zinc Oxychloride Cake (stream 540).
   a) Close the filter outlet valve to stop the flow of filtrate when 3 L of wash water has been collected.
   b) Allow the solids to soak for two minutes.
   c) Open the filter outlet valve.
   d) Wash the cake with an additional 5.3 L (for each cake).
18. Open the valve (yellow lever) to the Larox filter diaphragm pump.
19. Open the valve (blue lever) located on the left side of the pressure gauge on the Larox filter diaphragm pump. This allows water to be pumped into the diaphragm and press the solids inside the filter to "squeeze" more fluids out of the cake.

20. Determine the total wash water volume. Theoretical volume=25 L total (the sum of wash water for 3 cakes).
21. Obtain a wash water sample (after washing the solids) (Label: ZnOx Spent Wash Water).
    a) Record the time and temperature of wash water solution.
    b) Measure the pH.
    c) Conduct an ICP analysis.
22. Close the valve (yellow lever) on the Larox filter diaphragm pump.
23. Slowly open the air valve to the filter and close the valve (blue lever) on the Larox filter diaphragm pump.
24. Allow the air to flow through filter for 1 minute.
25. Close the air valve to the filter.
26. Open the filter by pushing the end labeled "release" on the hydraulic pump.
27. Carefully remove the filter cloth and the cake from the filter (stream 1000).
28. Obtain a sample of cake (Label: ZnOx Cake).
    a) Record the total weight of the cake.
    b) Record the thickness of the cake.
    c) Conduct an ICP analysis.
29. Store the solids inside a plastic bag. Label the bag properly.

Evaporator Crystallization:

By the evaporation of water from the filtrate of the Zinc Oxychloride Precipitation the NaCl and KCl crystallize out when the correct concentration of $CaCl_2$ to water is reached for the next leach. By dropping the temperature below 90° C. the $CaCl_2$ concentration can be controlled by crystallizing out excess $CaCl_2$ which builds up in the system due to the entry of chlorides in the feed. A temperature of 80° C. is preferred.

J. Recycle "Leach Salt Solution" Evaporator:
1. Transfer the solution in filter 28 into evaporator 32.
2. Record the volume and specific gravity of the solution transferred.
3. Boil the sample inside the evaporator at 130° C. for 4 hours to evaporate out the water.
4. Cool the remaining mixture down to 90° C. with the evaporator's cooling system before filtering.
5. Check that the specific gravity of the solution inside evaporator 32 is now 1.51, at a temperature of approximately 90° C.
6. Cool the solution further to 80° C.
7. Remove 100 ml of sample (Label: Evap. Slurry).
8. Record the time and temperature.
9. Conduct an ICP analysis of the sample.
10. Filter the rest of the solution using the Larox Filter (stream 850).

K. Pre-Heat Filter
1. Place a clean filter leach cake cloth into filter 16. Make sure the cloth is centered before closing the filter.
2. Push down on the end labeled "pump" on the hydraulic pump located on the filter table. Allow the air to pump until the pressure reading on the pressure gauge is close to the red line. DO NOT pump past the red line.
3. Close the valve located behind the pressure gauge of the hydraulic pump. This will help to prevent leaks through the filter.
4. Place the filter insulation (hereinafter the silver/gray cover) over the filter and tighten the wires around the claps.
5. Place the heat gun at the bottom of the filter, pointing up towards the filter. The heat gun, as well as all of the other pre-heating steps, will help to prevent $CaCl_2$ precipitation in the salt cake and to speed up the rate of filtration.
6. Turn on the water pump switch.
7. Slowly open the water valve and allow the water to flow through the filter for one minute.
8. Close the water valve and open the air valve to blow out excess water in the filter.
9. Close the air valve.
10. Attach the hose exiting reactor 20 to the green hose of the filter pump.
11. Open the air bleed valve (hereinafter the black valve) located to the left of the reactor pressure gauge to release any vapor pressure that had built up inside reactor 20.
12. Unlatch the reactor door latches and insert the outlet hose of the filter into the reactor. Secure the hose with plastic cable latches.
13. Make sure all the valves on the filter are closed.
14. Open the reactor outlet valve located at the bottom of reactor 20.
15. Turn on the pump to the filter.
16. Slowly open the valve to the outlet hose. This allows the hot slurry to circulate from the pump line and back into the reactor. The slurry will heat up the pump line as it circulates.
17. Allow the slurry to circulate in the lines for a couple of minutes before proceeding to the Salt Slurry Filtration step.

L. Salt Slurry Filtration (NaCl/KCl Cake & Recycled $CaCl_2$ Solution).
1. Maintain a solution temperature of 80° C.
2. Close the outlet valve slightly to decrease the amount of solution that flows back into the reactor.
3. Slowly open the valve to the filter and allow the slurry pressure to reach a pressure of between 60–90 psi.
4. Collect the filtrate in buckets (stream 900)
5. Close the filter outlet valve.
6. Check the level of solution inside the reactor and allow the pump to continue pumping until the sound of the pump starts to change.
7. Close the reactor outlet valve.
8. Open the valve (yellow lever) to the Larox filter diaphragm pump.
9. Open the valve (blue lever) located on the left side of the pressure gauge on the Larox filter diaphragm pump. This allows water to be pumped into the diaphragm and press the solids inside the filter to "squeeze" more fluids out of the cake.
10. Slowly open the filter outlet valve and pump the remaining slurry in the lines into a bucket.
11. Turn off the pump.
12. Detach the green hose.
13. Measure and record the volume, specific gravity and the weight of the remaining slurry.
14. Dispose of the remaining slurry properly.
15. Close the valve (yellow lever) on the Larox filter diaphragm pump.
16. Slow open the air valve to the filter and close the valve (blue lever) on the Larox filter diaphragm pump.

17. Allow the air to flow through filter for one minute.
18. Close the air valve to the filter.
19. Open the filter by pushing the end labeled "release" on the hydraulic pump.
20. Carefully remove the filter cloth and the cake from the filter (stream 1700).
21. Obtain a sample of cake (Label: NaCl/KCl Cake).
    a) Record the total weight of the cake.
    b) Record the thickness of the cake.
    c) Conduct an ICP analysis.
22. Store the solids inside a plastic bag. Label the bag properly.
23. Determine the filtrate volume.
24. Determine the specific gravity of the filtrate.
25. Remove a 50 ml sample of the filtrate. (Label: Salt Filtrate).
    a) Record the time and reactor temperature.
    b) Measure the pH, mV, and temperature of the sample in the lab.
    c) Conduct an ICP analysis.
    d) Note any observations.
26. Check with the Lab personnel to ensure that the Ca level in the filtrate is above 170,000 mg/kg before the filtrate is used as leach solution for the next run.
27. Transfer the filtrate into the $CaCl_2$ tank or to storage tank(s) and hold at a temperature of approximately 90° C.+.
28. Adjust the specific gravity of the solution to 1.49 by adding water.

Zinc Oxychloride to Zinc Oxide Conversion:

The prior art in U.S. Pat. No. 1,863,700 teaches that zinc oxide/oxychlorides produced from simple precipitation with calcium hydroxide contain as little as 1% chlorides and 3–5% calcium. The patent teaches that to reduce the calcium that hydrochloric acid must be added to dissolve the calcium. The patent further teaches a process where a zinc product can be produced with 1–2% calcium and 0.8% chlorides at 100° C. Such a product containing 1% chlorides thus mathematically contains 7% Simonkolleite or other oxychlorides based on the chloride stoichiometry. Accordingly the product comprises less than 92% pure zinc oxide, which is unacceptable for use as rubber grade zinc oxide.

The present invention starts with Simonkolleite/zinc oxychloride. The Simonkolleite/zinc oxychloride and most zinc hydroxide present is thermally broken down between 125° C. and 170° C. The reaction goes to completion in the presence of a base as the zinc oxide precipitates under the elevated temperatures. We have learned that the soluble chloride content of the solution in which the Simonkolleite is reslurried must be kept below a certain concentration through use of dilution water so that the reaction with the base will minimize the oxychloride content in the final zinc oxide product. This is especially true when using lime as the base because of the need to minimize excess calcium in the final product. When using sodium or potassium hydroxide, a stoichiometric excess of base may be added (0–30% excess, with 10% being preferred) and thus less dilution water (50% preferred) is required. The final step is to dry the zinc oxide at a sufficient temperature to decompose the remaining unreacted Simonkolleite, zinc hydroxide and zinc hydrates and evaporate the remaining water at a preferred temperature of approximately 200° C. to decompose 1–4% zinc hydrates and produce 99% plus pure zinc oxide.

M. ZnO Conversion:
1) Reslurry the zinc oxychloride cake collected from step H with 10 L of fresh $H_2O$.
2) Add 43 L of $H_2O$ to reactor 60 and heat to 90° C. Fresh water is used in the pilot plant process but in an actual plant, spent ZnO wash water from the previous runs will be used as the re-slurry water (stream 530).
3) Calculate the amount of lime required for the ZnO conversion using the following formula:

Amount of Lime Required (kg)=Dry weight of Zinc Oxychloride Cake(kg)*(0.3919).

4) Add the Zinc Oxychloride Re-slurry Slurry to reactor 60 at a temperature of 90° C. (stream 1100).
5) The chemistry is as follows:

$$Zn_5Cl_2O_4.5H_2O+Ca(OH)_2 \Leftrightarrow 5ZnO+CaCl_{2+6}H_2O \qquad \text{Equation 7}$$

This reaction will only proceed to full completion when the chloride concentration is sufficiently low and sufficient time, temperature and mixing have occurred.

6) Obtain a sample of lime used in this step (Label: ZnO Lime).
    a) Record the time and temperature of the solution.
    b) Measure the pH.
    c) Conduct an ICP analysis.
7) Measure and record the weight. Add the lime slurry to reactor 60 at a temperature of 90° C. (stream 9150).
8) Latch and tighten the bolts around the reactor door.
9) Record the time of addition and the temperature of reactor 60.
10) Allow the reactor to heat to 170° C.
11) Allow the reaction to run for an hour.
12) Filter the slurry with Larox filter 38 (stream 1150).
    a) Open the black air bleed valve located to the left of the reactor pressure gauge to release any vapor pressure that has built up inside the reactor or cool the reactor to 100° C.
    b) Attach the green hose to the outlet located at the bottom of the reactor.
    c) Make sure all the valves on the filter are closed.
    d) Open the reactor outlet valve.
    e) Turn on the pump to the filter.
2. Collect the filtrate in buckets (stream 580)
3. Check the level of solution inside the tank and detach the green hose when the tank is empty.
4. Allow the pump to continue pumping until the sound of the pump starts to change.
5. Open the valve (yellow lever) to the Larox filter diaphragm pump.
6. Open the valve (blue lever) located on the left side of the pressure gauge on the Larox filter diaphragm pump. This allows water to be pumped into the Larox filter diaphragm and press the solids inside the filter to "squeeze" more fluids out of the cake.
7. Slowly open the outlet valve and pump the remaining slurry in the lines into a bucket
8. Turn off the pump.
9. Dispose of the slurry properly.
10. Remove a 50 ml filtrate sample (Label: ZnO Filtrate).
    a) Record the time and date the sample is taken.
    b) Measure the pH, mV and temperature of the sample.
    c) Conduct an ICP analysis.
11. Turn on the water pump to the water tower.
12. Close the valve (yellow lever) on the Larox filter diaphragm pump.

13. Slow open the water valve to the filter and close the valve (blue lever) on the Larox filter diaphragm pump.
14. Use 23.5 L (total) of H2O to wash the ZnO Cake (stream 510).
    a) Close the filter outlet valve to stop the flow when 3 L of wash water have been collected.
    b) Allow the solids to soak for one minute.
    c) Open the filter outlet valve.
    d) Repeat steps a–c when 10 L of wash water has been collected.
    e) Repeat steps a–c when 15 L of wash water has been collected.
15. Open the valve (yellow lever) to the Larox filter diaphragm pump.
16. Open the valve (blue lever) located on the left side of the pressure gauge on the Larox filter diaphragm pump. This allows water to be pumped into the Larox filter diaphragm and press the solids inside the filter to "squeeze" more fluids out of the cake.
17. Determine the wash water volume. Theoretical volume=23.5 L total.
18. Obtain a wash water sample (after washing the solids) (Label: ZnO Cake Wash $H_2O$).
    a) Record the time and temperature of the wash water solution.
    b) Measure the pH.
    c) Conduct an ICP analysis.
19. Place the spent wash water into Spent ZnO Wash Tank (stream 520).
20. Close the valve (yellow lever) on the Larox filter diaphragm pump.
21. Slow open the air valve to the filter and close the valve (blue lever) on the Larox filter diaphragm pump.
22. Allow the air to flow through filter for one minute.
23. Close the air valve to filter.
24. Open the filter by pushing the end labeled "release" on the hydraulic pump.
25. Carefully remove the filter cloth and the cake from the filter (stream 1200).
26. Obtain a sample of cake (Label: ZnO Cake).
    a) Record the total weight of the cake.
    b) Record the thickness of the cake.
    c) Conduct an ICP analysis.
27. Store the solids inside a plastic bag. Label the bag properly.
28. Transfer the solid mixture to the ZnO oven and dry to 200° C. (stream 1300).
29. Analysis:
    a) Conduct an ICP analysis of the dry ZnO mixture.
    b) Analyze the mixture for Chlorides.

Iron/Steel Product Step:
Option 1 (FIG. 1): Preferred Method:

The calcium rich leach cake from the leach reactor filter 16 is directly valuable in iron/steel production due to its calcium content: or it is preferably blended with the iron bearing material, i.e., EAF dust KO-61 to enhance the removal of non-ferrous metals as the iron is reduced making it suitable for steel production feed stock N. Form Briquette
1. Analyze the leach cake and the EAF dust.
2. Mix the EAF dust (100 grams) by adding pulverized coke (15.7 grams) or carbon dust, dried calcium rich leach cake (18.8 grams) and additional lime and magnesium with a small amount of water (10 grams) based on the stoichiometric demand to, produce a suitable "green" ball pellet with the structural strength required, using standard industry practice for direct oxidation reduction of the metal oxides.
3. Vary the chemistry to obtain direct reduced iron or Flux Cake specifications of the steel mill customer and to maintain 95% plus metallization.
4. Pelletize the green ball the material to a size suitable for charge to the furnace to be used (¾ inched diameter or larger is preferred).
5. Pre-heat the ball at 200–400° C., preferably 275° C., for feed directly to a blast furnace or the preferred direct reduced iron furnace.

O. Direct Reduced Iron Furnace
1. Process the Briquette/Pellet at 1000–1100° C., preferably 1050° C., in a reducing atmosphere for 15 to 75 minutes, preferably 45 minutes, according to standard industry practice. The preferred conditions create an iron/calcium material which is over 95% metallized and has had 99% of the zinc and lead removed.
2. The reduction furnace product is briquetted or pelletized under pressure to produce a uniform solid over ¾ inch in diameter; Cool in an oxygen-less atmosphere with non-contact cooling (may be directly water cooled—this is not preferred as it may fracture the briquette).
3. Analyze the resulting product.

P. Flue dust from the Briquetting or Direct Reduction furnace may be recycled to the hydrometallurgical process feed (preferred) or sold to third parties for non-ferrous metal production.

Note: This metal oxide reduction step may be placed at the beginning of the process to produce a zinc rich furnace flue dust suitable as feed for this process (FIGS. 3 and 4) (preferred). When so doing, the calcium rich leach cake produced from the hydrometallurgical portion of the process is fed into the "green" ball pellet feeder.

Referring now to FIG. 2, the process described in FIG. 1 is shown except that caustic is used, instead of lime, for feed to zinc oxide reactor 60. Additionally, a caustic regeneration loop is provided which produces caustic and hydrochloric acid for both inside usage and outside sale. In particular, tank 62 contains caustic. Filter 40 feeds calcium chloride in stream 900 to leach reactor 20, and feeds sodium chloride and potassium chloride in stream 1700 to a salt re-slurry tank 80. Evaporator 32 feeds water in a stream 512 to salt re-slurry tank 80. Tank 80 dissolves the salts and feeds the dissolved salt solution in a stream 1710 to a calcium ion removal system 82. An ion exchange is conducted in tank 82 to remove the calcium ions from solution. Tank 82 then feeds the sodium/potassium solution without the calcium ions in a stream 1720 to a chlor-alkali plant 84. Plant 84 produces caustic which is fed in stream 1730 to caustic tank 62 and produces hydrochloric acid which is fed in a stream 1740 to a hydrochloric tank 86 for outside sale. A portion of the hydrochloric acid may be used to maintain chloride balance in stream 200 or to feed stream 9200 to cadmium leach tank 42. During this process, caustic is reacted with stream 700 in tank 26 to make Simonkolleite and in reactor 60, the Simonkolleite is reacted with the caustic to produce zinc oxide, sodium chloride and water. Accordingly, reactor 26 and reactor 60 produce sodium/potassium chloride, instead of calcium chloride, as in FIG. 1. In this process, calcium chloride at stream 1800 typically is not produced.

Referring to FIG. 3, the process described in FIG. 1 is shown except that the sequence of hearth furnace 14 and electric arc furnace 12 is reversed. Accordingly, hearth furnace 14 feeds metallized iron briquettes in stream 1900 to EAF 12. EAF 12 feeds EAF Red Dust in stream 9900 to dust storage tank 18. K061 is processed in leach reactor 20 and the dregs are dried and sold as magnetite or used to make briquettes in stream 1600 for feed to the reduction hearth furnace 14. Again the presence of calcium hydroxide from the leach will enhance non-ferrous metal recover and metallization of the iron for an improved product 1900. Any non-ferrous dust generated in hearth furnace 14 is added to tank 18. The remainder of the process is the same as that shown in FIG. 1.

Referring to FIG. 4, the process described in FIG. 2 is shown except that the sequence of hearth furnace 14 and electric arc furnace 12 is reversed. Accordingly, hearth furnace 14 feeds metallized iron briquettes in stream 1900 to EAF 12. EAF 12 feeds EAF Red Dust in stream 9900 to dust storage tank 18. K061 is processed in leach reactor 20 and the dregs dried and sold as magnetite or are used to make briquettes in stream 1600 for feed to hearth furnace 14. Because calcium is not generated by the leach process, to obtain the benefits of calcium addition it must be separately added (not shown). The remainder of the process is the same as that shown in FIG. 2.

Figure 5:
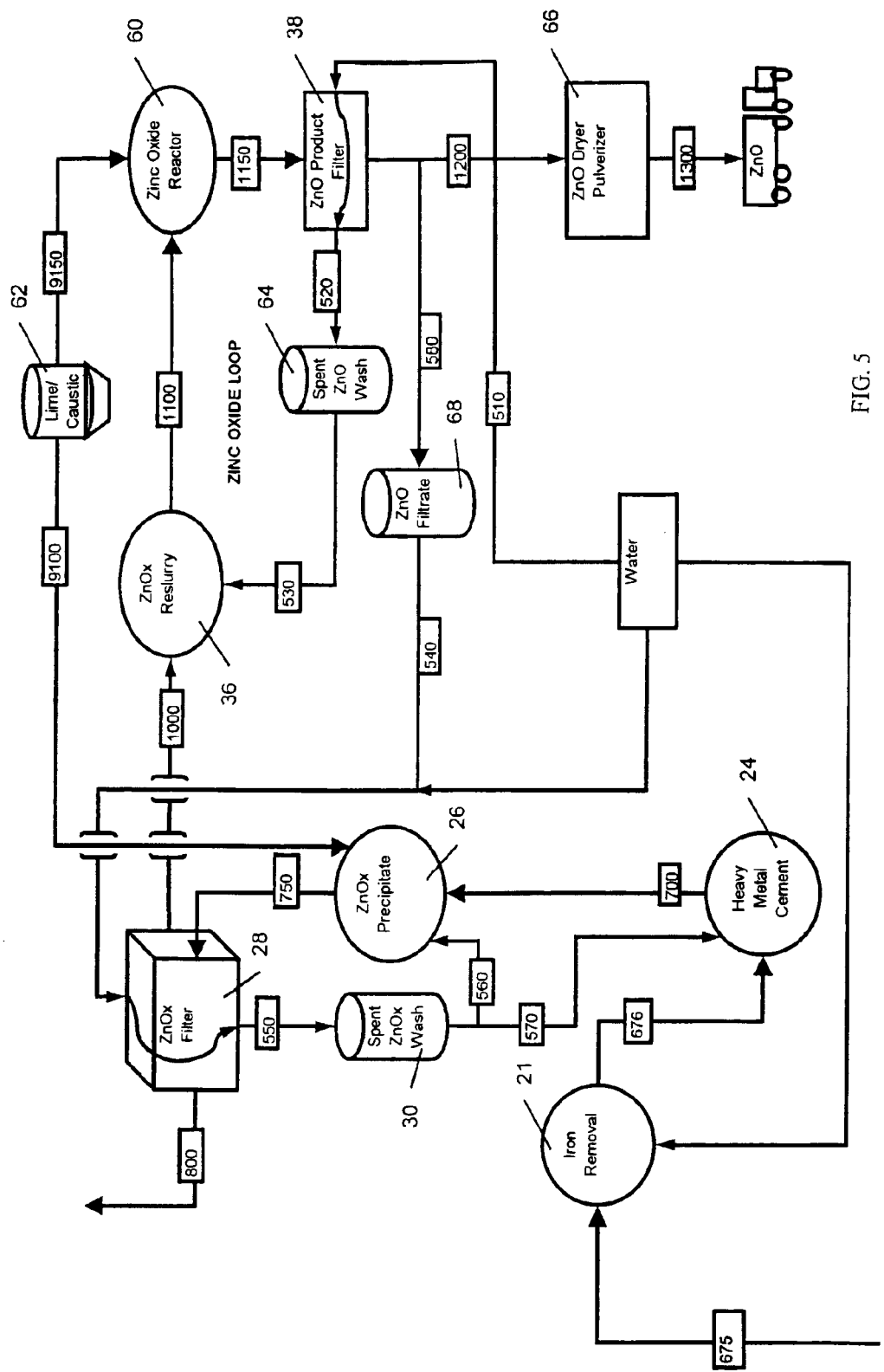
FIG. 5 is a schematic flow diagram of the zinc oxide recovery process utilizing lime for zinc precipitation and EAF dust as the feed stock.

FIG. 5 shows a detailed schematic flow diagram of the Simonkolleite production and zinc oxide production portions of the overall process of FIG. 1.

Figure 6:
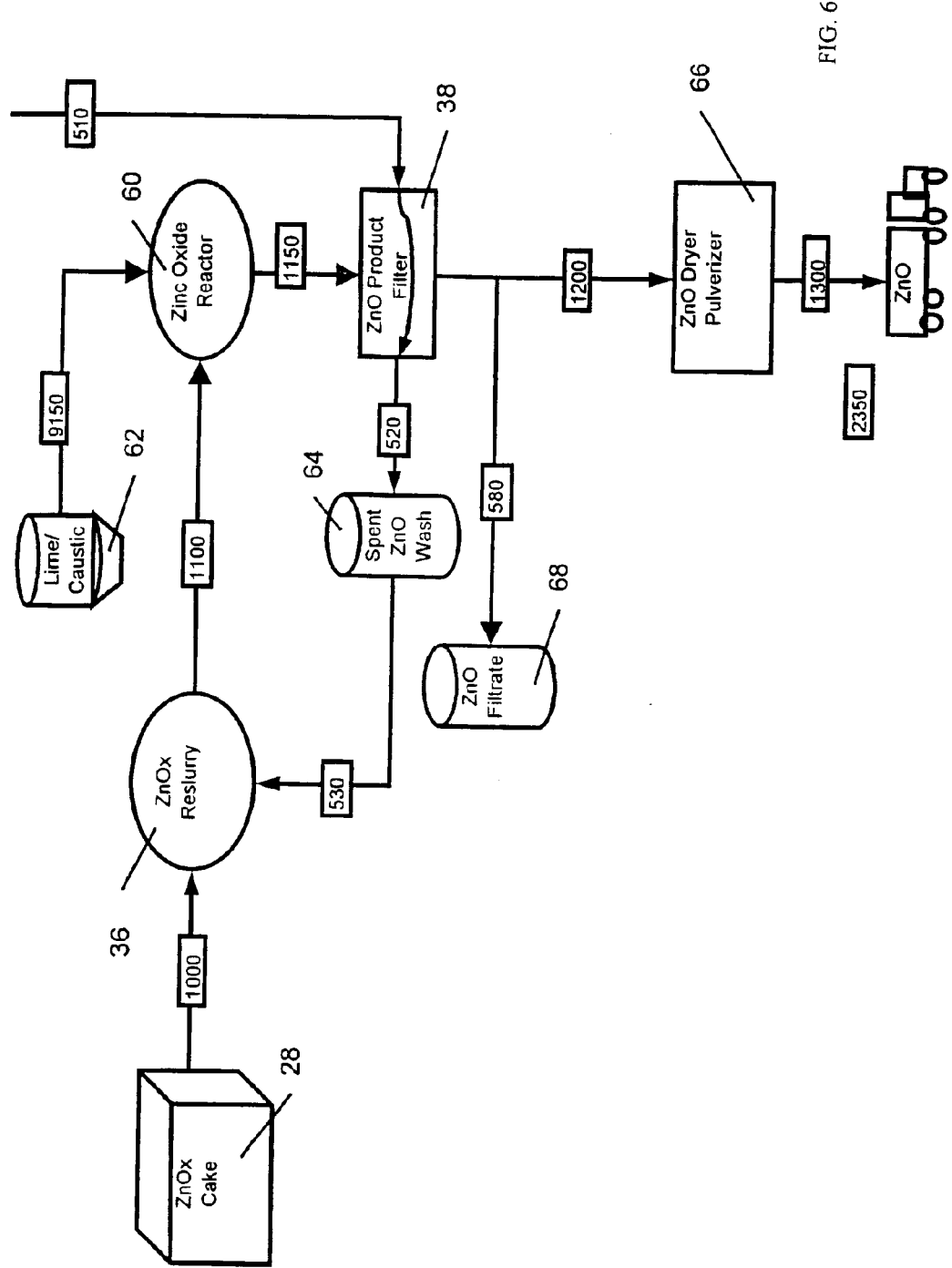
FIG. 6 is detailed schematic flow diagram of the zinc oxide from zinc oxychloride portion of the overall process.

FIG. 6 shows a detailed schematic flow diagram of the zinc oxide from zinc oxychloride portion of the overall process of FIG. 1.

Figure 7:
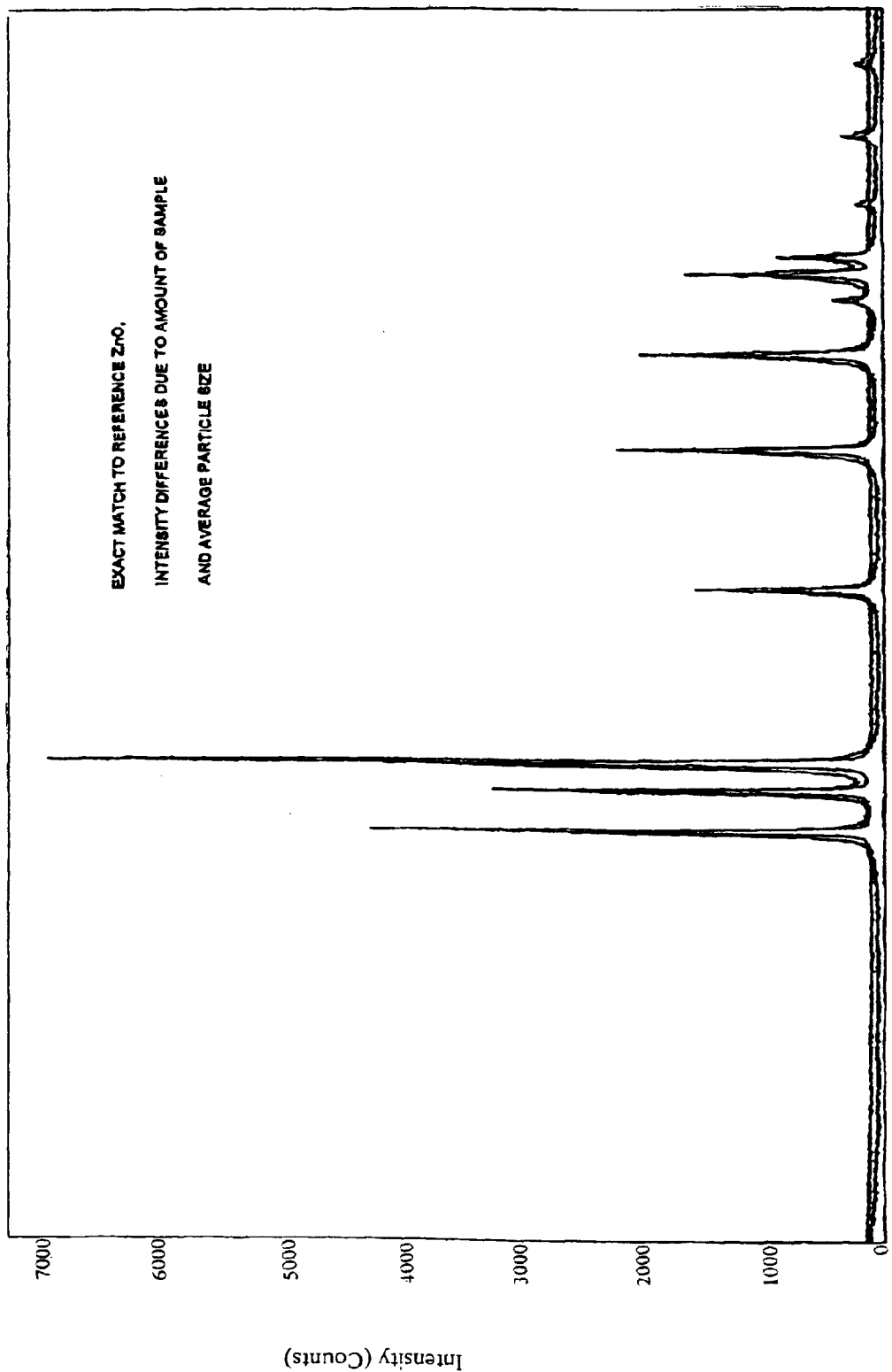
FIG. 7 shows a graph which compares the zinc oxide produced by the present inventive process with zinc oxide prepared by a standard process.

FIG. 7 shows a graph which compares the zinc oxide produced by the present inventive process with zinc oxide prepared by a standard process. According to the graph, the zinc oxide produced by the present invention is an exact compositional match to the zinc oxide produced by the French Process prior art process.

Table 1 shows tests of rubber compounds using zinc oxide produced by the inventive process.

Table 2 shows tests of rubber compounds using zinc oxide produced by the inventive process.

Table 3 shows tests of rubber compounds using zinc oxide produced by the inventive process.

Table 4 shows tests of rubber compounds using zinc oxide produced by the inventive process.

Table 5 shows tests of rubber compounds using zinc oxide produced by the inventive process.

Table 6 shows an elemental chemical analysis of the components of the hearth dust in stream 9950 for several different runs.

Table 7 shows an elemental chemical analysis of the components of the calcium chloride in streams 200 (upper sub-table) and 210 (lower sub-table) for several different runs.

Table 8 shows an elemental chemical analysis of the components of the leach cake in stream 1600 for several different runs.

Table 9 shows an elemental chemical analysis of the components of the heavy cementation in stream 2000 for several different runs.

Table 10 shows an elemental chemical analysis of the components of the zinc chloride complex solution in stream 700 for several different runs.

Table 11 shows an elemental chemical analysis of the components of the lime in stream 9100 for several different runs.

Table 12 shows an elemental chemical analysis of the components of the filter cake material pressed in filter 38 before washing with stream 510, for several different runs.

Table 13 shows an elemental chemical analysis of the components of stream 800 from filter 28 for several different runs.

Table 14 shows an elemental chemical analysis of the components of stream 1700 from filter 40 for several different runs.

Table 15 shows an elemental chemical analysis of the components of stream 580 from filter 38 for several different runs.

Table 16 shows an elemental chemical analysis of the components of stream 1200, the final process product, for several different runs.

Table 17 shows the iron briquetted product analysis for various test conditions vs. that for the KO-61 feed without calcium addition conducted in Round 1 testing. It can be observed that the zinc and lead levels are far lower when calcium is added then when it is not added to the reduction furnace feed.

Table 18 shows the iron/calcium briquette analysis from Round 2 testing, under more optimized conditions where the amount of zinc and lead have been reduced by over 99%.

While the preferred embodiment of the invention has been illustrated and described, it will be appreciated that various changes can be made therein without departing from the spirit and scope of the invention.

TABLE 1

|  | ODR Tmin | ODR Tmax | ODR ts1 | ODR t90 | ODR CRI | MS 15 | Hardness | Tensile stress @ 300% | Tensile stress @ break | Tensile strain @ break |
|---|---|---|---|---|---|---|---|---|---|---|
| NR/ZnO COMPOUND STUDY - AMR |
| NR-CONTROL | 7.1 | 34.7 | 3.26 | 7.24 | 25.12 | 23.42 | 57.9 | 1490 | 4010 | 539% |
| NR-25/150 | 6.7 | 34.5 | 3.16 | 7.08 | 25.51 | 22.00 | 56.7 | 1502 | 4000 | 535% |
| NR-25/150 LOW | 6.7 | 34.0 | 3.21 | 7.03 | 26.18 | 21.58 | 57.0 | 1478 | 4130 | 554% |
| NR-25/150 HIGH | 6.9 | 35.6 | 3.08 | 7.02 | 25.38 | 22.33 | 59.7 | 1631 | 3860 | 514% |
| NR-TEST1 Stearic acid | 6.8 | 34.6 | 3.22 | 7.54 | 23.14 | 22.42 | 57.4 | 1536 | 4130 | 553% |
| NR-TEST2 Poly | 6.6 | 34.2 | 3.21 | 7.31 | 24.39 | 22.42 | 57.1 | 1531 | 4220 | 556% |
| NR-TEST3 TEA | 6.8 | 34.7 | 3.11 | 7.01 | 25.64 | 20.83 | 56.3 | 1437 | 3930 | 535% |
| NR-TEST4 No additive | 6.5 | 34.5 | 3.19 | 7.15 | 25.26 | 22.08 | 57.8 | 1479 | 4010 | 539% |
| NR-w/o ZnO | 6.4 | 16.2 | 3.23 | 11.77 | 11.71 |  |  |  |  |  |
| SBR/ZnO COMPOUND STUDY - AMR |
| SBR-CONTROL | 10.4 | 44.2 | 4.23 | 16.75 | 7.99 | 37.83 | 71.7 | 2359 | 3540 | 411% |
| SBR-25/150 | 10.7 | 44.7 | 4.13 | 16.85 | 7.86 | 37.00 | 73.0 | 2304 | 3330 | 396% |
| SBR-25/150 LOW | 10.4 | 43.5 | 4.24 | 16.53 | 8.14 | 35.17 | 70.6 | 2350 | 3440 | 401% |
| SBR-25/150 HIGH | 10.7 | 45.2 | 4.24 | 16.37 | 8.24 | 39.17 | 73.0 | 2448 | 3530 | 401% |

TABLE 1-continued

|  | ODR Tmin | ODR Tmax | ODR ts1 | ODR t90 | ODR CRI | MS 15 | Hardness | Tensile stress @ 300% | Tensile stress @ break | Tensile strain @ break |
|---|---|---|---|---|---|---|---|---|---|---|
| SBR-TEST1 | 10.4 | 44.4 | 4.02 | 16.54 | 7.99 | 37.25 | 71.8 | 2427 | 3490 | 399% |
| SBR-TEST2 | 10.4 | 43.8 | 3.83 | 15.84 | 8.33 | 37.75 | 72.4 | 2390 | 3430 | 395% |
| SBR-TEST3 | 10.3 | 44.6 | 4.02 | 16.26 | 8.17 | 38.17 | 70.2 | 2414 | 3580 | 406% |
| SBR-TEST4 | 10.3 | 44.1 | 4.12 | 16.64 | 7.99 | 37.25 | 70.6 | 2368 | 3710 | 427% |
| SBR-w/o ZnO | 10.6 | 33.0 | 4.20 | 23.99 | 5.05 |  |  |  |  |  |
| CR/ZnO COMPOUND STUDY - AMR | | | | | | | | | | |
| CR-CONTROL | 6.1 | 44.5 | 1.23 | 3.50 | 44.05 | 4.92 | 67.9 | 1650 | 3690 | 578% |
| CR-25/150 | 5.8 | 44.8 | 1.31 | 3.89 | 38.76 | 5.67 | 67.6 | 1684 | 3860 | 586% |
| CR-25/150 LOW | 5.9 | 43.8 | 1.42 | 3.81 | 41.84 | 6.50 | 65.4 | 1613 | 3780 | 582% |
| CR-25/150 HIGH | 6.7 | 48.7 | 1.32 | 5.89 | 21.89 | 5.00 | 67.6 | 1825 | 3440 | 524% |
| CR-TEST1 | 6.1 | 44.0 | 1.32 | 3.87 | 39.23 | 5.67 | 67.0 | 1668 | 3550 | 591% |
| CR-TEST2 | 6.0 | 44.2 | 1.36 | 3.88 | 40.00 | 6.50 | 67.5 | 1566 | 3760 | 592% |
| CR-TEST3 | 6.1 | 44.3 | 1.31 | 4.18 | 34.84 | 5.33 | 67.6 | 1677 | 3760 | 582% |
| CR-TEST4 | 6.0 | 44.7 | 1.31 | 3.81 | 40.00 | 5.58 | 67.9 | 1709 | 3790 | 583% |
| CR-w/o ZnO | 5.5 | 37.4 | 3.21 | 6.82 | 27.70 |  |  |  |  |  |

TABLE 2

REPLACEMENT TREAD COMPOUND - SYNTHETIC

|  | 3-1 | 3-2 | 3-3 | 3-4 | 3-5 | 3-6 | 3-7 | 3-8 | 3-9 | 3-10 |
|---|---|---|---|---|---|---|---|---|---|---|
| SBR 1712 | 96.0 | 96.0 | 96.0 | 96.0 | 96.0 | 96.0 | 96.0 | 96.0 | 96.0 | 98.0 |
| BUDENE 1207 | 30.0 | 30.0 | 30.0 | 30.0 | 30.0 | 30.0 | 30.0 | 30.0 | 30.0 | 30.0 |
| CARBON BLACK | 65.0 | 65.0 | 65.0 | 65.0 | 65.0 | 65.0 | 65.0 | 65.0 | 65.0 | 65.0 |
| KADOX 911 | 1.0 | 4.0 | 8.0 |  |  |  |  |  |  |  |
| AMR-ZNO |  |  |  | 1.0 | 4.0 | 8.0 |  |  |  |  |
| ACT-ZNO-A |  |  |  |  |  |  | 1.0 | 8.0 |  |  |
| ACT-ZNO-B |  |  |  |  |  |  |  |  | 1.0 | 8.0 |
| STEARIC ACID | 2.0 | 2.0 | 2.0 | 2.0 | 2.0 | 2.0 | 2.0 | 2.0 | 2.0 | 2.0 |
| AROMATIC OIL | 5.0 | 5.0 | 5.0 | 5.0 | 5.0 | 5.0 | 5.0 | 5.0 | 5.0 | 5.0 |
| SPPD | 1.5 | 1.5 | 1.5 | 1.5 | 1.5 | 1.5 | 1.5 | 1.5 | 1.5 | 1.5 |
| MC WAX | 1.0 | 1.0 | 1.0 | 1.0 | 1.0 | 1.0 | 1.0 | 1.0 | 1.0 | 1.0 |
| TMTD | 0.2 | 0.2 | 0.2 | 0.2 | 0.2 | 0.2 | 0.2 | 0.2 | 0.2 | 0.2 |
| OBTS | 1.1 | 1.1 | 1.1 | 1.1 | 1.1 | 1.1 | 1.1 | 1.1 | 1.1 | 1.1 |
| SULFUR | 1.6 | 1.6 | 1.6 | 1.6 | 1.6 | 1.6 | 1.6 | 1.6 | 1.6 | 1.6 |

HEAVY DUTY COMPOUND - NATURAL

|  | 4-1 | 4-2 | 4-3 | 4-4 | 4-5 | 4-6 | 4-7 | 4-8 | 4-9 | 4-10 |
|---|---|---|---|---|---|---|---|---|---|---|
| SMR-10 (NR) | 100.0 | 100.0 | 100.0 | 100.0 | 100.0 | 100.0 | 100.0 | 100.0 | 100.0 | 100.0 |
| SILICA | 15.0 | 15.0 | 15.0 | 15.0 | 15.0 | 15.0 | 15.0 | 15.0 | 15.0 | 15.0 |
| CARBON BLACK | 40.0 | 40.0 | 40.0 | 40.0 | 40.0 | 40.0 | 40.0 | 40.0 | 40.0 | 40.0 |
| KADOX 911 | 1.5 | 5.0 | 10.0 |  |  |  |  |  |  |  |
| AMR-ZNO |  |  |  | 1.5 | 5.0 | 10.0 |  |  |  |  |
| ACT-ZNO-A |  |  |  |  |  |  | 1.5 | 10.0 |  |  |
| ACT-ZNO-B |  |  |  |  |  |  |  |  | 1.5 | 10.0 |
| STEARIC ACID | 1.0 | 1.0 | 1.0 | 1.0 | 1.0 | 1.0 | 1.0 | 1.0 | 1.0 | 1.0 |
| TMQ | 2.0 | 2.0 | 2.0 | 2.0 | 2.0 | 2.0 | 2.0 | 2.0 | 2.0 | 2.0 |
| SPPD | 3.0 | 3.0 | 3.0 | 3.0 | 3.0 | 3.0 | 3.0 | 3.0 | 3.0 | 3.0 |
| MC WAX | 2.0 | 2.0 | 2.0 | 2.0 | 2.0 | 2.0 | 2.0 | 2.0 | 2.0 | 2.0 |
| AROMATIC OIL | 5.0 | 5.0 | 5.0 | 5.0 | 5.0 | 5.0 | 5.0 | 5.0 | 5.0 | 5.0 |
| SULFUR | 0.7 | 0.7 | 0.7 | 0.7 | 0.7 | 0.7 | 0.7 | 0.7 | 0.7 | 0.7 |
| SULFASAN R | 2.0 | 2.0 | 2.0 | 2.0 | 2.0 | 2.0 | 2.0 | 2.0 | 2.0 | 2.0 |
| OBTS | 1.1 | 1.1 | 1.1 | 1.1 | 1.1 | 1.1 | 1.1 | 1.1 | 1.1 | 1.1 |

AIRCRAFT TYPE TREAD COMPOUND

|  | 5-1 | 5-2 | 5-3 | 5-4 | 5-5 | 5-6 | 5-7 | 5-8 | 5-9 | 5-10 |
|---|---|---|---|---|---|---|---|---|---|---|
| SMR-10 (NR) | 100 | 100 | 100 | 100 | 100 | 100 | 100 | 100 | 100 | 100 |
| CARBON BLACK | 50 | 50 | 50 | 50 | 50 | 50 | 50 | 50 | 50 | 50 |
| KADOX 911 | 1.5 | 10 | 20 |  |  |  |  |  |  |  |
| ARM-ZNO |  |  |  | 1.5 | 10 | 20 |  |  |  |  |
| ACT-ZNO-A |  |  |  |  |  |  | 1.5 | 20 |  |  |
| ACT-ZNO-B |  |  |  |  |  |  |  |  | 1.5 | 20 |
| STEARIC ACID | 3 | 3 | 3 | 3 | 3 | 3 | 3 | 3 | 3 | 3 |
| TMQ | 4 | 4 | 4 | 4 | 4 | 4 | 4 | 4 | 4 | 4 |
| SPPD | 2 | 2 | 2 | 2 | 2 | 2 | 2 | 2 | 2 | 2 |
| PINE TAR | 3.5 | 3.5 | 3.5 | 3.5 | 3.5 | 3.5 | 3.5 | 3.5 | 3.5 | 3.5 |
| SULFUR | 2.1 | 2.1 | 2.1 | 2.1 | 2.1 | 2.1 | 2.1 | 2.1 | 2.1 | 2.1 |

TABLE 2-continued

| SULFASAN R | 0.5 | 0.5 | 0.5 | 0.5 | 0.5 | 0.5 | 0.5 | 0.5 | 0.5 | 0.5 |
|---|---|---|---|---|---|---|---|---|---|---|
| OBTS | 1 | 1 | 1 | 1 | 1 | 1 | 1 | 1 | 1 | 1 |

TABLE 3

TEST REPORT SUMMARY
REPLACEMENT TREAD COMPOUND

| | 3-1 | 3-2 | 3-3 | 3-4 | 3-5 | 3-6 | 3-7 | 3-8 | 3-9 | 3-10 |
|---|---|---|---|---|---|---|---|---|---|---|
| ODR @ 320 F. | | | | | | | | | | |
| Tm (in-lbf) | 33.0 | 35.9 | 36.4 | 32.1 | 34.8 | 35.5 | 30.9 | 34.9 | 27.6 | 34.4 |
| ts1 (min.) | 5.27 | 6.11 | 5.99 | 5.19 | 6.11 | 5.88 | 5.18 | 5.01 | 4.19 | 5.36 |
| tc90 (min.) | 10.57 | 13.49 | 13.43 | 10.81 | 13.47 | 13.33 | 10.66 | 12.34 | 8.14 | 11.66 |
| CRI | 18.52 | 13.55 | 13.44 | 17.80 | 13.59 | 13.42 | 18.25 | 13.64 | 25.32 | 15.87 |
| REVERSION (in-lbf/min.) | 0 | 0 | 0 | 0 | 0 | 0 | 0 | 0 | 0 | 0 |
| ODR @ 350 F. | | | | | | | | | | |
| Tm | 29.3 | 32.2 | 33.0 | 28.5 | 31.2 | 33.7 | 30.1 | 32.9 | 26.3 | 32.2 |
| ts1 | 2.7 | 2.7 | 2.6 | 2.5 | 2.8 | 2.7 | 2.6 | 2.4 | 2.3 | 2.6 |
| tc90 | 4.9 | 5.7 | 5.6 | 4.8 | 5.7 | 5.6 | 5.1 | 5.4 | 4.2 | 5.3 |
| CRI | 45.46 | 33.44 | 33.33 | 43.30 | 34.48 | 34.48 | 40.00 | 33.23 | 52.65 | 37.17 |
| REVERSION | 0.06 | 0.04 | 0.04 | 0.05 | 0.04 | 0.04 | 0.06 | 0.04 | 0.08 | 0.04 |
| MOONEY SCORCH | | | | | | | | | | |
| t5 (min.) @ 257 F. | 30.63 | 50.25 | 49.25 | 29.92 | 46.58 | 46.68 | 28.50 | 47.08 | 23.83 | 39.58 |
| TENSILE, ORIG, T95 @ 320 F. | | | | | | | | | | |
| TENSILE STRESS (psi) | 2940 | 2830 | 2840 | 3010 | 2860 | 2710 | 2980 | 2830 | 2790 | 2890 |
| TENSILE @ 300% (psi) | 1157 | 1282 | 1396 | 1138 | 1293 | 1395 | 1016 | 1328 | 775 | 1265 |
| TENSILE STRAIN % | 582% | 525% | 505% | 608% | 546% | 500% | 642% | 505% | 859% | 552% |
| HARDNESS, Shore A | 59.1 | 61.5 | 63.2 | 60.6 | 62.8 | 64.7 | 58 | 61.8 | 56.4 | 83.3 |
| TENSILE, AGED 158 HRS @ 100 C., T95 @ 320 F. | | | | | | | | | | |
| TENSILE STRESS | 2300 | 2280 | 2250 | 2390 | 3100 | 2200 | 2350 | 2160 | 2320 | 2270 |
| TENSILE @ 300% | | | | | | | | | | |
| TENSILE STRAIN | 272% | 260% | 247% | 283% | 245% | 242% | 296% | 233% | 278% | 251% |
| HARDNESS | 72.5 | 71.8 | 73.2 | 70.5 | 74.6 | 72.6 | 72.6 | 73.8 | 70.6 | 75.5 |
| TENSILE, ORIG, 2X T95 @ 320 F. | | | | | | | | | | |
| TENSILE STRESS | 3100 | 2800 | 2970 | 3110 | 2950 | 2960 | 3050 | 2870 | 2850 | 2980 |
| TENSILE @ 300% | 1076 | 1214 | 1427 | 1064 | 1311 | 1360 | 974 | 1411 | 763 | 1248 |
| TENSILE STRAIN | 618% | 532% | 518% | 635% | 538% | 533% | 654% | 507% | 601% | 568% |
| HARDNESS | 59.3 | 62.1 | 62.9 | 59.9 | 62.4 | 62.5 | 58.0 | 60.4 | 56.0 | 62.0 |
| TENSILE, AGED 188 HRS @ 100 C., 2X T95 @ 320 F. | | | | | | | | | | |
| TENSILE STRESS | 2460 | 2370 | 2410 | 2510 | 2360 | 2460 | 2490 | 2420 | 2440 | 2440 |
| TENSILE @ 300% | 2365 | 2327 | | 2297 | 2353 | | 2244 | | 2370 | 2330 |
| TENSILE STRAIN | 312% | 303% | 295% | 324% | 302% | 288% | 329% | 297% | 306% | 314% |
| HARDNESS | 71.0 | 72.1 | 73.5 | 71.5 | 73.4 | 73.4 | 71.5 | 73.2 | 71.0 | 72.5 |
| FLEXOMETER | | | | | | | | | | |
| DELTA T, deg F. | 107 | 83 | 97 | 110 | 95 | 98 | 126 | 83 | 80 | 97 |
| BLOWOUT TIME | | | | | | | | | | |
| E' | | | | | | | | | | |
| E" | | | | | | | | | | |
| TAN DELTA | | | | | | | | | | |

TABLE 4

TEST REPORT SUMMARY
OTR TREAD

| | 4-1 | 4-2 | 4-3 | 4-4 | 4-5 | 4-6 | 4-7 | 4-8 | 4-9 | 4-10 |
|---|---|---|---|---|---|---|---|---|---|---|
| ODR @ 320 F. | | | | | | | | | | |
| Tm (in-lbf) | 42.9 | 44.2 | 43.7 | 43.7 | 43.5 | 43.2 | 42.8 | 45.5 | 41.9 | 45.8 |
| ts1 (min.) | 9.56 | 9.25 | 8.37 | 9.32 | 9.21 | 9.31 | 8.68 | 8.29 | 8.07 | 8.11 |
| tc90 (min.) | 18.81 | 18.57 | 17.22 | 19.42 | 19.09 | 19.12 | 17.58 | 17.29 | 14.98 | 15.99 |

TABLE 4-continued

TEST REPORT SUMMARY
OTR TREAD

|  | 4-1 | 4-2 | 4-3 | 4-4 | 4-5 | 4-6 | 4-7 | 4-8 | 4-9 | 4-10 |
|---|---|---|---|---|---|---|---|---|---|---|
| CRI | 10.81 | 10.73 | 11.30 | 9.00 | 10.12 | 10.20 | 11.24 | 11.11 | 14.48 | 12.69 |
| REVERSION (in-lbf/min.) | 0.00 | 0.00 | 0.00 | 0.00 | 0.00 | 0.00 | 0.00 | 0.00 | 0.30 | 0.00 |
| ODR @ 350 F. | | | | | | | | | | |
| Tm | 38.5 | 38.9 | 39.5 | 39.5 | 39.5 | 40.0 | 39.1 | 41.2 | 37.1 | 41.3 |
| ts1 | 2.1 | 2.2 | 2.1 | 2.2 | 2.1 | 2.1 | 2.2 | 2.1 | 2.0 | 2 |
| tc90 | 4.1 | 4.2 | 3.9 | 4.3 | 4.2 | 4.2 | 4.2 | 4.1 | 3.6 | 3.9 |
| CRI | 50.00 | 50.02 | 55.25 | 47.62 | 47.41 | 47.41 | 50.02 | 50.00 | 62.49 | 52.65 |
| REVERSION | 0.24 | 0.19 | 0.24 | 0.19 | 0.23 | 0.21 | 0.26 | 0.22 | 0.33 | 0.20 |
| MOONEY SCORCH | | | | | | | | | | |
| t5 (min.) @ 280 F. | 17.67 | 16.67 | 15.42 | 15.92 | 16.83 | 17.00 | 15.50 | 15.08 | 13.75 | 13.75 |
| TENSILE, ORIG, T95 @ 300 F. | | | | | | | | | | |
| TENSILE STRESS (psi) | 3709 | 3480 | 3645 | 3572 | 3683 | 3603 | 3477 | 3531 | 3403 | 3356 |
| TENSILE @ 300% (psi) | 1969 | 2087 | 2148 | 2057 | 2125 | 2172 | 2073 | 2158 | 1837 | 2173 |
| TENSILE STRAIN % | 499% | 451% | 466% | 481% | 478% | 457% | 457% | 458% | 482% | 432% |
| HARDNESS, Shore A | 67.5 | 69.7 | 69.8 | 69.5 | 70.3 | 69.3 | 69.0 | 70.5 | 68.6 | 71.3 |
| TENSILE, AGED 168 HRS @ 100 C., T95 @ 300 F. | | | | | | | | | | |
| TENSILE STRESS | 2320 | 2340 | 2430 | 2360 | 2300 | 2400 | 2110 | 2510 | 2170 | 2270 |
| TENSILE @ 300% | 2054 | 2147 | 2183 | 2092 | 2159 | 2150 | 2081 | 2194 | 2021 | 2148 |
| TENSILE STRAIN | 340% | 329% | 335% | 341% | 321% | 336% | 306% | 342% | 324% | 317% |
| HARDNESS | 74.3 | 75.3 | 75.3 | 76.3 | 75.6 | 74.2 | 75.4 | 77.6 | 74.2 | 75.3 |
| TENSILE, ORIG, 2X T95 @ 300 F. | | | | | | | | | | |
| TENSILE STRESS | 3499 | 3352 | 3320 | 3244 | 3341 | 3209 | 3324 | 3279 | 2963 | 3291 |
| TENSILE @ 300% | 1820 | 1998 | 1971 | 2019 | 1914 | 2035 | 2038 | 2278 | 1648 | 2317 |
| TENSILE STRAIN | 496% | 452% | 449% | 439% | 464% | 431% | 440% | 406% | 457% | 400% |
| HARDNESS | 66.4 | 68.3 | 67.3 | 68.3 | 66.2 | 66.8 | 68.4 | 70.7 | 63.8 | 66.3 |
| TENSILE, AGED 168 HRS @ 100 C., 2X T95 @ 300 F. | | | | | | | | | | |
| TENSILE STRESS | 2280 | 2370 | 2190 | 2130 | 2200 | 2270 | 2230 | 2200 | 1640 | 2310 |
| TENSILE @ 300% | 2018 | 2076 | 2101 | 1982 | 2071 | 2054 | 2031 | 2108 |  | 2161 |
| TENSILE STRAIN | 338% | 343% | 315% | 323% | 317% | 332% | 330% | 313% | 266% | 322% |
| HARDNESS | 71.9 | 73.9 | 73.6 | 74.3 | 74.6 | 75.0 | 73.0 | 75.4 | 72.3 | 75.2 |
| FLEXOMETER | | | | | | | | | | |
| DELTA T, deg F., 55/22.5/30 | 60 | 63 | 70 | 72 | 74 | 67 | 65 | 61 | 79 | 72 |
| BLOWOUT TIME | | | | | | | | | | |
| E' | | | | | | | | | | |
| E" | | | | | | | | | | |
| TAN DELTA | | | | | | | | | | |

TABLE 5

TEST REPORT SUMMARY
AIRCRAFT TREAD

|  | 5-1 | 5-2 | 5-3 | 5-4 | 5-5 | 5-6 | 5-7 | 5-8 | 5-9 | 5-10 |
|---|---|---|---|---|---|---|---|---|---|---|
| ODR @ 300 F. | | | | | | | | | | |
| Tm (in-lbf) | 38.1 | 42.1 | 42.2 | 38.1 | 40.2 | 41.8 | 38.4 | 42.3 | 32.4 | 42.3 |
| ts1 (min.) | 5.80 | 5.73 | 5.60 | 5.71 | 5.48 | 5.23 | 5.45 | 4.71 | 4.90 | 5.01 |
| tc90 (min.) | 12.03 | 13.57 | 14.31 | 12.34 | 13.19 | 12.73 | 11.85 | 13.34 | 7.98 | 11.96 |
| CRI | 16.05 | 12.75 | 11.48 | 15.08 | 12.97 | 13.33 | 15.63 | 11.59 | 32.47 | 14.39 |
| REVERSION (in-lbf/min.) | 0.29 | 0.00 | 0.00 | 0.20 | 0.00 | 0.00 | 0.30 | 0.00 | 0.41 | 0.00 |
| ODR @ 350 F. | | | | | | | | | | |
| Tm | 38.3 | 38.1 | 38.0 | 34.6 | 36.9 | 37.9 | 35.4 | 39.3 | 30.4 | 38.2 |
| ts1 | 1.6 | 1.5 | 1.4 | 1.5 | 1.4 | 1.5 | 1.5 | 1.4 | 1.5 | 1.5 |
| tc90 | 3.2 | 3.3 | 3.3 | 3.1 | 3.2 | 3.1 | 3.1 | 3.4 | 2.5 | 3.0 |
| CRI | 62.14 | 55.85 | 52.90 | 62.49 | 55.57 | 62.53 | 62.49 | 50.00 | 100.04 | 66.24 |
| REVERSION | | | | | | | | | | |
| MOONEY SCORCH | | | | | | | | | | |
| t5 (min.) @ 257 F. | 25.75 | 24.83 | 24.17 | 25.17 | 24.08 | 23.58 | 25.25 | 25.42 | 21.42 | 25.92 |

TABLE 5-continued

TEST REPORT SUMMARY AIRCRAFT TREAD

| | 5-1 | 5-2 | 5-3 | 5-4 | 5-5 | 5-6 | 5-7 | 5-8 | 5-9 | 5-10 |
|---|---|---|---|---|---|---|---|---|---|---|
| TENSILE, ORIG, T95 @ 300 F. | | | | | | | | | | |
| TENSILE STRESS (psi) | 3870 | 3660 | 3580 | 3720 | 3670 | 3470 | 3620 | 3540 | 3550 | 3370 |
| TENSILE @ 300% (psi) | 1920 | 2230 | 2292 | 1920 | 2073 | 2210 | 1892 | 2219 | 1391 | 2161 |
| TENSILE STRAIN % | 515% | 462% | 441% | 510% | 486% | 450% | 501% | 450% | 578% | 445% |
| HARDNESS, Shore A | 67.6 | 70.4 | 70.2 | 69.8 | 68.4 | 72.8 | 69.0 | 72.8 | 61.6 | 71.0 |
| TENSILE, AGED 168 HRS @ 100 C., T95 @ 300 F. | | | | | | | | | | |
| TENSILE STRESS | 2020 | 1680 | 1810 | 2100 | 1830 | 1870 | 1860 | 1810 | 1550 | 1690 |
| TENSILE @ 300% | | | | | | | | | | |
| TENSILE STRAIN | 225% | 185% | 199% | 247% | 224% | 205% | 206% | 200% | 193% | 195% |
| HARDNESS | 76.7 | 77.9 | 77.1 | 75.6 | 77.0 | 76.8 | 76.7 | 77.8 | 73.8 | 79.1 |
| TENSILE, ORIG, 2X T95 @ 300 F. | | | | | | | | | | |
| TENSILE STRESS | 3630 | 3450 | 3390 | 3630 | 3410 | 3360 | 3470 | 3420 | 3280 | 3240 |
| TENSILE @ 300% | 1656 | 2333 | 2277 | 1776 | 2160 | 2234 | 1638 | 2279 | 1153 | 2109 |
| TENSILE STRAIN | 538% | 420% | 415% | 519% | 450% | 432% | 519% | 426% | 611% | 435% |
| HARDNESS | 64.0 | 71.0 | 72.0 | 57.0 | 71.0 | 71.0 | 64.0 | 72.0 | 60.0 | 71.0 |
| TENSILE, AGED 168 HRS @ 100 C., 2X T95 @ 300 F. | | | | | | | | | | |
| TENSILE STRESS | 1670 | 1910 | 1870 | 1580 | 1920 | 1900 | 1460 | 1720 | 1280 | 1710 |
| TENSILE @ 300% | | | | | | | | | | |
| TENSILE STRAIN | 180% | 191% | 194% | 180% | 217% | 204% | 161% | 174% | 143% | 187% |
| HARDNESS | 72.8 | 76.9 | 77.0 | 74.6 | 77.4 | 78.3 | 74.3 | 77.4 | 74.0 | 79.6 |
| FLEXOMETER | | | | | | | | | | |
| DELTA T, deg F. | 23 | 26 | 25 | 26 | 30 | 29 | 25 | 31 | 85 | 29 |
| BLOWOUT TIME | | | | | | | | | | |
| E' | | | | | | | | | | |
| E" | | | | | | | | | | |
| TAN DELTA | | | | | | | | | | |

TABLE 6

American Metals Recovery

| Sample | AHD2 #1 | AHD2 #2 | AHD2 #3 | AHD2 #4 | AVG #1–3 | AVG #1–4 |
|---|---|---|---|---|---|---|
| Dilution | 0.5051/1000 | 0.5010/1000 | 0.5151/1000 | 0.5082/1000 | | |
| Sc 361.383 | 4.87 | 4.65 | 4.73 | 4.67 | | |
| Ag 338.289 | 1183 | 1235 | 1135 | 1249 | 1184 | 1200 |
| Al 308.215 | 212 | 206 | 187 | 221 | 202 | 207 |
| As 188.979 | 33.00 | 23.9 | 18.8 | 36.3 | <10 | <10 |
| B 249.772 | 78.51 | 80.91 | 74.87 | 77.10 | 78.09 | 77.85 |
| Ba 230.425 | 14.37 | 14.10 | 14.02 | 15.30 | 14.16 | 14.45 |
| Be 313.107 | <10 | <10 | <10 | <10 | <10 | <10 |
| Ca 317.933 | 1259 | 788 | 802 | 967 | 950 | 954 |
| Cd 214.440 | 2463 | 2384 | 2294 | 2603 | 2374 | 2431 |
| Co 228.616 | <10 | <10 | <10 | <10 | <10 | <10 |
| Cr 283.563 | 68.81 | 67.49 | 65.30 | 73.78 | 67.20 | 68.85 |
| Cu 324.752 | 620.9 | 597 | 597 | 858 | 605 | 618 |
| Fe 238.204 | 8653 | 8249 | 8265 | 9343 | 8389 | 8628 |
| K 766.490 | 16553 | 15967 | 15689 | 17384 | 16070 | 16398 |
| Mg 279.077 | 692 | 678 | 684 | 753 | 685 | 702 |
| Mn 257.610 | 850 | 821 | 815 | 900 | 829 | 847 |
| Na 330.237 | 18920 | 16941 | 16575 | 19394 | 16812 | 17458 |
| Ni 221.648 | <10 | <10 | <10 | <10 | <10 | <10 |
| P 178.221 | 64.0 | 26.9 | 46.33 | 36.38 | 45.75 | 43.40 |
| Pb 220.353 | 69157 | 66813 | 66386 | 73297 | 67445 | 88908 |
| S 180.669 | 5367 | 5416 | 5182 | 5619 | 5322 | 5396 |
| Sb 206.838 | 60.5 | 63.22 | 57.72 | 71.20 | 60.47 | 63.15 |
| Se 196.028 | <10 | <10 | <10 | <10 | <10 | <10 |
| SI 251.611 | 346 | 356 | 433 | 624 | 378 | 440 |
| TI 190.801 | <10 | <10 | <10 | <10 | <10 | <10 |
| V 292.402 | <10 | <10 | <10 | <10 | <10 | <10 |
| Zn 208.200 | 599946 | 579276 | 573631 | 635923 | 584284 | 597194 |

TABLE 7

American Metals Recovery Corp.
Leach Salt Solution and Leach Salt Wash

| | Run #1 | Run #2 | Run #3 | Run #4 | Run #10 | Run #11 | Run #12 | Run #13 |
|---|---|---|---|---|---|---|---|---|
| Leach Salt Soln | | | | | | | | |
| Date | | 071399 | 071399 | 071399 | 071399 | 071399 | 071399 | 071399 |
| I.D. | | R1&2LSR | R3LSR | R4LSR | R10LSR | R11LSR | R11LSR | R12&13LSR |
| Sc 361.383 | | 4.89 | 4.95 | 4.89 | 4.93 | 4.92 | 4.92 | 4.85 |
| Ag 338.289 | | 3.04 | 2.57 | 2.24 | 2.47 | <1 | <1 | 2.39 |
| Al 308.215 | | <1 | <5 | <5 | <1 | <1 | <1 | <1 |
| As 188.979 | | <1 | <5 | <5 | <1 | <1 | <1 | <1 |
| B 249.772 | | 70.36 | 66.80 | 64.38 | 68.92 | 44.67 | 44.67 | 70.76 |
| Ba 230.425 | | <1 | <1 | <1 | <1 | <1 | <1 | <1 |
| Be 313.107 | | <1 | <1 | <1 | <1 | <1 | <1 | <1 |
| Ca 317.933 | | 177887 | 170739 | 174342 | 170644 | 123165 | 123165 | 179271 |
| Cd 214.440 | | <1 | <1 | <1 | <1 | <1 | <1 | <1 |
| Co 228.616 | | <1 | <1 | <1 | <1 | <1 | <1 | <1 |
| Cr 283.563 | | <1 | <1 | <1 | <1 | <1 | <1 | <1 |
| Cu 324.752 | | <1 | <1 | <1 | <1 | <1 | <1 | <1 |
| Fe 238.204 | | <1 | 1.27 | <1 | <1 | <1 | <1 | <1 |
| K 766.490 | | 8179 | 7645 | 7846 | 8086 | 5659 | 5859 | 9112 |
| Mg 279.077 | | 19.21 | 12.50 | 19.19 | 16.45 | 9.26 | 9.26 | <1 |
| Mn 257.610 | | <1 | <1 | <1 | <1 | <1 | <1 | <1 |
| Na 330.237 | | 3133 | 1162 | 2910 | 3066 | 2036 | 2036 | 2515 |
| Ni 221.648 | | <1 | <1 | <1 | <1 | <1 | <1 | <1 |
| P 213.617 | | <1 | <2 | <1 | <1 | <1 | <1 | <1 |
| Pb 220.353 | | <1 | <1 | <1 | <2 | 3.60 | 3.60 | <1 |
| S 180.669 | | | | | | | | |
| Sb 206.836 | | <1 | <1 | <1 | <1 | <1 | <1 | <1 |
| Se 196.026 | | <1 | <1 | <1 | <1 | <1 | <1 | <1 |
| Si 251.611 | | <1 | <1 | <1 | <1 | 8.41 | 8.41 | 5.67 |
| Tl 190.801 | | <1 | <1 | <1 | <1 | <1 | <1 | <1 |
| V 292.402 | | <1 | <1 | <1 | <1 | <1 | <1 | <1 |
| Zn 206.200 | | 126.37 | 29.3 | 20.0 | 124.61 | 499.5 | 499.5 | 1170.1 |
| 1:10, Ca, K, Zn from 1:100 | | | | | | | | |
| Leach Salt Wash | | | | | | | | |
| Date | 071399 | 071399 | | 071399 | 071399 | 071399 | 071399 | 071399 |
| I.D. | R1&2LSR | R1&2LSR | | R4LSR | R10LSR | R11LSR | R12&13LSR | R12&13LSR |
| Sc 361.383 | 4.89 | 4.89 | | 4.89 | 4.93 | 4.92 | 4.85 | 4.85 |
| Ag 338.289 | 3.04 | 3.04 | | 2.24 | 2.24 | <1 | 2.39 | 2.39 |
| Al 308.215 | <1 | <1 | | <5 | <1 | <1 | <1 | <1 |
| As 188.979 | <1 | <1 | | <5 | <1 | <1 | <1 | <1 |
| B 249.772 | 70.36 | 70.36 | | 64.38 | 68.92 | 44.67 | 70.76 | 70.76 |
| Ba 230.425 | <1 | <1 | | <1 | <1 | <1 | <1 | <1 |
| Be 313.107 | <1 | <1 | | <1 | <1 | <1 | <1 | <1 |
| Ca 317.933 | 177887 | 177887 | | 174342 | 170644 | 123165 | 179271 | 179271 |
| Cd 214.440 | <1 | <1 | | <1 | <1 | <1 | <1 | <1 |
| Co 228.616 | <1 | <1 | | <1 | <1 | <1 | <1 | <1 |
| Cr 283.563 | <1 | <1 | | <1 | <1 | <1 | <1 | <1 |
| Cu 324.752 | <1 | <1 | | <1 | <1 | <1 | <1 | <1 |
| Fe 238.204 | <1 | <1 | | <1 | <1 | <1 | <1 | <1 |
| K 766.490 | 8179 | 8179 | | 7846 | 8086 | 5659 | 9112 | 9112 |
| Mg 279.077 | 19.21 | 19.21 | | 19.19 | 16.45 | 9.26 | <1 | <1 |
| Mn 257.610 | <1 | <1 | | <1 | <1 | <1 | <1 | <1 |
| Na 330.237 | 3133 | 3133 | | 2910 | 3066 | 2036 | 2515 | 2515 |
| Ni 221.648 | <1 | <1 | | <1 | <1 | <1 | <1 | <1 |
| P 213.617 | <1 | <1 | | <1 | <1 | <1 | <1 | <1 |
| Pb 220.353 | <1 | <1 | | <1 | <2 | 3.60 | <1 | <1 |
| S 180.669 | | | | | | | | |
| Sb 206.836 | <1 | <1 | | <1 | <1 | <1 | <1 | <1 |
| Se 196.026 | <1 | <1 | | <1 | <1 | <1 | <1 | <1 |
| Si 251.611 | <1 | <1 | | <1 | <1 | 8.41 | 5.87 | 5.87 |
| Tl 190.801 | <1 | <1 | | <1 | <1 | <1 | <1 | <1 |
| V 292.402 | <1 | <1 | | <1 | <1 | <1 | <1 | <1 |
| Zn 206.200 | 126.37 | 126.37 | | 20.0 | 124.61 | 499.5 | 1170.1 | 1170.1 |

TABLE 8

| Leach Cake | Run #1 | Run #2 | Run #3 | Run #4 | Run #6 | Run #6 | Run #7 | Run #8 |
|---|---|---|---|---|---|---|---|---|
| Date | 070699R | 070699R | 070699R | 070699R | 070699R | 070699R | 070699R | 070699R |
| I.D. | R1LC | R2LC | R3LC | R4LC | R5LC | R6LC | R7LC | R8LC |
| Sc 361.383 | 4.94 | 4.99 | 4.95 | 4.96 | 5.01 | 5.04 | 4.98 | 5.00 |

TABLE 8-continued

| | | | | | | | | |
|---|---|---|---|---|---|---|---|---|
| Ag 338.289 | <15 | <15 | 127.94 | <15 | <15 | <15 | <15 | <15 |
| Al 308.215 | 306.68 | 247.71 | 142.37 | 202.83 | 124.98 | 364.51 | 200.21 | 255.49 |
| As 188.979 | <15 | <15 | <15 | <15 | <15 | <15 | 30.36 | <15 |
| B 249.772 | <15 | <15 | <15 | <15 | <15 | 273.31 | 266.08 | 157.38 |
| Ba 230.425 | <15 | <15 | <15 | <15 | <15 | <15 | <15 | <15 |
| Be 313.107 | <15 | <15 | <15 | <15 | <15 | <15 | <15 | <15 |
| Ca 317.933 | 440550 | 386712 | 407398 | 398601 | 429743 | 396474 | 389290 | 442256 |
| Cd 214.440 | 624.22 | 555.06 | 219.99 | 462.98 | 159.45 | 475.49 | 198.36 | 623.61 |
| Co 228.616 | <15 | <15 | <15 | <15 | <15 | <15 | <15 | <15 |
| Cr 283.563 | 102.34 | 79.96 | <50 | <50 | 31.59 | 110.88 | 56.14 | 80.73 |
| Cu 324.752 | 199.11 | 172.79 | 99.41 | 117.32 | 67.82 | 232.54 | 76.78 | 141.68 |
| Fe 238.204 | 13853 | 11686 | 6751 | 9973 | 5783 | 16968 | 8502 | 11910 |
| K 766.490 | <50 | 265.09 | 1337 | 216.91 | 1399 | 306.40 | <15 | <15 |
| M 279.077 | 1171 | 1339 | 965 | 1241 | 656.18 | 2122 | 646.51 | 914 |
| Mn 257.610 | 1253 | 1031 | 596.12 | 877 | 497.86 | 1454 | 743.21 | 1035 |
| Na 330.237 | <50 | <50 | <50 | <50 | <15 | <50 | <50 | <50 |
| Ni 221.648 | <50 | <50 | <50 | <50 | <50 | <50 | <50 | <50 |
| P 213.617 | <50 | <50 | <50 | <50 | <75 | <50 | 82.86 | <50 |
| Pb 220.353 | 639 | 500 | 465.45 | 424 | 688.47 | 701.02 | 621.91 | 630.76 |
| S 180.669 | | | | | | | | |
| Sb 206.836 | <50 | <50 | <50 | <50 | <50 | <50 | <50 | <50 |
| Se 196.026 | <50 | <50 | <50 | <50 | <50 | <50 | <50 | <50 |
| Si 251.611 | 959.64 | 717.25 | 347.27 | 527 | <50 | <50 | 1178.21 | 1193 |
| TI 190.801 | <50 | <50 | <50 | <50 | <50 | <50 | <50 | <50 |
| V 292.402 | <50 | <50 | <50 | <50 | <50 | <50 | <50 | <50 |
| Zn 206.200 | 75414 | 49870 | 17428 | 31931 | 19633 | 63319 | 29289 | 42874 |

| Leach Cake | Run #9 | Run #10 | Run #11 | Run #12 | Run #13 |
|---|---|---|---|---|---|
| Date | 070699R | 070699R | 070699R | 070699R | 070699R |
| I.D. | R9LC | R10LC | R11LC | R12LC | R13LC |
| Sc 361.383 | 5.05 | 5.01 | 5.01 | 4.98 | 5.01 |
| Ag 338.289 | <15 | <15 | <15 | <15 | <15 |
| Al 308.215 | 391.32 | 311.14 | 186.90 | 145.07 | 221.85 |
| As 188.979 | <15 | <15 | <15 | <15 | <15 |
| B 249.772 | 312.58 | <50 | 235.73 | 137.68 | 153.30 |
| Ba 230.425 | <15 | <15 | <15 | <15 | <15 |
| Be 313.107 | <15 | <15 | <15 | <15 | <15 |
| Ca 317.933 | 452411 | 433313 | 420944 | 401001 | 424539 |
| Cd 214.440 | 376.73 | 277.23 | 326.25 | 152.36 | 239.52 |
| Co 228.616 | <15 | <15 | <15 | <15 | <15 |
| Cr 283.563 | 121.49 | <50 | <50 | <50 | 67.56 |
| Cu 324.752 | 257.23 | 110.32 | 123.68 | 97.56 | 162.21 |
| Fe 238.204 | 17407 | 8447 | 8281 | 6266 | 9670 |
| K 766.490 | <15 | 1457 | 737.13 | 1058.43 | 741.77 |
| M 279.077 | 1369 | 1422 | 1048 | 493.15 | 749.50 |
| Mn 257.610 | 1502 | 723.41 | 718.56 | 544.34 | 848.42 |
| Na 330.237 | <50 | <50 | <50 | <50 | <50 |
| Ni 221.648 | <50 | <50 | <50 | <50 | <50 |
| P 213.617 | <50 | <50 | <50 | <50 | <50 |
| Pb 220.353 | 558.28 | 1058 | 663.15 | 698.87 | 821 |
| S 180.669 | | | | | |
| Sb 206.836 | <50 | <50 | <50 | <50 | <50 |
| Se 196.026 | <50 | <50 | <50 | <50 | <50 |
| Si 251.611 | 1565 | 454.25 | 1082 | 686.80 | 832.92 |
| TI 190.801 | <50 | <50 | <50 | <50 | <50 |
| V 292.402 | <50 | <50 | <50 | <50 | <50 |
| Zn 206.200 | 75343 | 25832 | 30420 | 32960 | 51817 |

TABLE 9

American Metals Recovery Corp.
Bulk Cement Stage 1 Solids

| BC Stg 1 solids (uw) | Run #1 | Run #2 | Run #3 | Run #4 | Run #5 | Run #7 | Run #8 | Run #9 |
|---|---|---|---|---|---|---|---|---|
| Date | 070799R | 070799R | 070799R | 070799R | 070799R | 070799R | 070799R | 070799R |
| I.D. | R1BCS1C | R2BCS1C | R3BCS1C | R4BCS1C | R5BCS1C | R7BCS1C | R8BCS1C | R9BCS1C |
| Sc 361.383 | 5.12 | 5.21 | 5.11 | 5.16 | 5.18 | 5.04 | 5.07 | 5.00 |
| Ag 338.289 | 20.91 | 19.16 | 19.48 | 26.19 | 19.59 | 29.87 | 52.21 | 18.47 |
| Al 308.215 | 96.78 | <50 | <50 | 92.2 | 176.7 | 130.3 | 233.1 | 137.89 |
| As 188.979 | <10 | <50 | <10 | <10 | <10 | <10 | <10 | <10 |
| B 249.772 | <50 | 113 | <50 | 551 | 1270 | 941 | 3267 | 1051 |
| Ba 230.425 | <5 | <5 | <5 | <5 | <5 | <5 | <5 | <5 |
| Be 313.107 | <5 | <5 | <5 | <5 | <5 | <5 | <5 | <5 |
| Ca 317.933 | 118499 | 135214 | 151205 | 144550 | 159523 | 195419 | 136590 | 94084 |

TABLE 9-continued

American Metals Recovery Corp.
Bulk Cement Stage 1 Solids

| | | | | | | | | |
|---|---|---|---|---|---|---|---|---|
| Cd 214.440 | 10962 | 18099 | 5015 | 4911 | 23422 | 5224 | 26033 | 7266 |
| Co 228.616 | <5 | <5 | <5 | <5 | <5 | <5 | <5 | <5 |
| Cr 283.563 | <10 | <10 | <10 | <10 | <10 | <10 | <10 | <10 |
| Cu 324.752 | 422 | 3381 | 3266 | 4352 | 3283 | 3008 | 3942 | 8163 |
| Fe 238.204 | 1737 | 1442 | 663 | 1021 | 1042 | 868 | 1862 | 2484 |
| K 766.490 | 5114 | 5447 | 7196 | 6302 | 6967 | 14557 | 23222 | 3932 |
| Mg 279.077 | 364.0 | 313.3 | 239.6 | 360.26 | 509.15 | 249.13 | <50 | 1062.2 |
| Mn 257.610 | 73.8 | 39.9 | 30.6 | 21.10 | 38.97 | 35.58 | 20.67 | 142.37 |
| Na 330.237 | 1059.01 | 1661.43 | 2214.97 | 2548.06 | 4577.18 | 2207.31 | 4526 | 1148.50 |
| Ni 221.648 | <20 | <20 | <20 | <20 | <20 | <20 | <20 | <20 |
| P 213.617 | <100 | <100 | <100 | <100 | <100 | <100 | <100 | <100 |
| Pb 220.353 | 934234 | 463786 | 450437 | 512057 | 462415 | 327273 | 537730 | 595226 |
| S 180.669 | | | | | | | | |
| Sb 206.836 | 73.5 | <50 | <50 | 41.2 | 52.87 | <40 | <70 | 138.6 |
| Se 196.026 | <50 | <50 | <50 | <50 | <50 | <50 | <50 | <50 |
| Si 251.611 | 362 | 325 | 277 | 1017 | 2330 | 2107 | 5325 | 1865 |
| TI 190.801 | 228.3 | 319.9 | 146.1 | 60.18 | 299.21 | 80.4 | 382.1 | 153.4 |
| V 292.402 | <10 | <10 | <10 | <10 | <10 | <10 | <10 | <10 |
| Zn 206.200 | 70098 | 54726 | 35044 | 15228 | 19536 | 24367 | 19956 | 42493 |

| BC Stg 1 solids (uw) | Run #10 | Run #11 | Run #12 |
|---|---|---|---|
| Date | 070799R | 070799R | 070799R |
| I.D. | R6&10BCS1C | R11BCS1C | R12BCS1C |
| Sc 361.383 | 5.03 | 5.02 | 4.98 |
| Ag 338.289 | 30.94 | 29.1 | 13.7 |
| Al 308.215 | 539.4 | 122.2 | 64.7 |
| As 188.979 | <10 | <10 | <10 |
| B 249.772 | 142.6 | 1154 | 469 |
| Ba 230.425 | 43.7 | <5 | <5 |
| Be 313.107 | <5 | <5 | <5 |
| Ca 317.933 | 284250 | 162731 | 120377 |
| Cd 214.440 | 17297 | 6579 | 6121 |
| Co 228.616 | <5 | <5 | <5 |
| Cr 283.563 | <10 | <10 | <10 |
| Cu 324.752 | 3200 | 4240 | 3795 |
| Fe 238.204 | 2045 | 1284 | 1784 |
| K 766.490 | 8525 | 7254 | 5432 |
| Mg 279.077 | 2094.64 | 312.42 | 243.31 |
| Mn 257.610 | 84.48 | 51.92 | 46.70 |
| Na 330.237 | 1954.7 | 3102.8 | 1773 |
| Ni 221.648 | <20 | <20 | <20 |
| P 213.617 | 343.72 | 241.42 | <100 |
| Pb 220.353 | 462444 | 461901 | 448382 |
| S 180.669 | | | |
| Sb 206.836 | 87.01 | 52.8 | 69.4 |
| Se 196.026 | <50 | <50 | <50 |
| Si 251.611 | 694 | 1866 | 955 |
| TI 190.801 | 191.6 | 146.1 | 127.2 |
| V 292.402 | <10 | <10 | <10 |
| Zn 206.200 | 25542 | 28751 | 24758 |

TABLE 10

| BC Stage 2 filtrate | Run #0 | Run #1 | Run #2 | Run #3 | Run #4 | Run #5 | Run #6 | Run #7 |
|---|---|---|---|---|---|---|---|---|
| Date | 070799r | 070799r | 070799r | 070799r | | 070799r | | 070799r |
| I.D. | r0bcs2ff | r1bcs2ff | r2bcs2ff | r3bcs2ff | | r5bcs2ff | | r7bcs2ff |
| Sc 391.383 | 3.56 | 4.53 | 3.46 | 3.38 | | 3.38 | | 3.43 |
| Ag 338.289 | 2.05 | 2.78 | 3.10 | 2.36 | | 2.33 | | 2.46 |
| Al 308.215 | <5 | <5 | <5 | <5 | | <5 | | <5 |
| As 188.979 | <1 | <1 | <1 | <1 | | <1 | | <1 |
| B 240.772 | 55.10 | 60.54 | 62.58 | 62.24 | | 64.46 | | 68.98 |
| Be 230.425 | <1 | <1 | <1 | <1 | | <1 | | 1.12 |
| Be 313.107 | <1 | <1 | <1 | <1 | | <1 | | <1 |
| Ca 317.933 | 142381 | 160572 | 152779 | 162257 | | 157750 | | 156478 |
| Cd 214.440 | 2.67 | <1 | <1 | <1 | | <1 | | <1 |
| Co 228.616 | <1 | <1 | <1 | <1 | | <1 | | <1 |
| Cr 283.563 | <1 | <1 | <1 | <1 | | <1 | | <1 |
| Cu 324.752 | <1 | <1 | <1 | <1 | | <1 | | <1 |
| Fe 238.204 | <1 | <1 | <1 | <1 | | <1 | | <1 |
| K 766.490 | 7408 | 8281 | 7591 | 8170 | | 7703 | | 8443 |
| Mg 279.077 | <5 | 5.73 | 5.22 | 11.39 | | 7.50 | | <5 |

TABLE 10-continued

| | | | | | | |
|---|---|---|---|---|---|---|
| Mn 257.610 | | <1 | 1.71 | <1 | <1 | 1.30 | 1.39 |
| Na 330.237 | | 2107 | 2596 | 2281 | 1694 | 2573 | 2265 |
| Ni 221.648 | | <10 | <10 | <10 | <10 | <10 | <5 |
| P 213.617 | | <5 | 12.29 | <5 | <5 | <5 | <5 |
| Pb 220.353 | | 11.13 | 5.25 | 2.67 | <1 | <1 | <1 |
| S 180.669 | | | | | | | |
| Sb 206.836 | | <10 | <10 | <10 | <10 | <10 | <10 |
| Se 196.026 | | <30 | <30 | <30 | <30 | <30 | <30 |
| Si 251.611 | | 4.75 | 15.62 | 4.99 | 7.87 | 10.51 | 6.56 |
| TI 190.801 | | <15 | <15 | <15 | <15 | <15 | <15 |
| V 202.402 | | <1 | <1 | <1 | <1 | <1 | <1 |
| Zn 206.200 | | 9252 | 11498 | 9700 | 10996 | 9613 | 10655 |
| 1:10, K + Na + Ca + Zn 1:100 | | | | | | | |

| | BC Stage 2 filtrate | Run #8 | Run #9 | Run #10 | Run #11 | Run #12 |
|---|---|---|---|---|---|---|
| | Date | 070799r | 070799r | 070799r | 070799r | 070799r |
| | I.D. | r8bcs2ff | r9bcs2ff | r6&10bcs2ff | r11bcs2ff | r12bcs2ff |
| | Sc 391.383 | 3.43 | 3.40 | 3.45 | 3.44 | 3.48 |
| | Ag 338.289 | 2.54 | 2.40 | 2.32 | 3.42 | 2.22 |
| | Al 308.215 | <1 | <1 | <1 | <1 | 0.01 |
| | As 188.979 | <1 | <1 | <1 | <1 | −2.32 |
| | B 240.772 | 68.31 | 67.35 | 64.29 | 64.09 | 66.67 |
| | Be 230.425 | <1 | <1 | <1 | <1 | 0.99 |
| | Be 313.107 | <1 | <1 | <1 | <1 | 0.00 |
| | Ca 317.933 | 151799 | 159284 | 155562 | 152877 | 138199 |
| | Cd 214.440 | <1 | <1 | <1 | <1 | −0.04 |
| | Co 228.616 | <1 | <1 | <1 | <1 | −0.03 |
| | Cr 283.563 | <1 | <1 | <1 | <1 | 0.12 |
| | Cu 324.752 | <1 | <1 | <1 | <1 | 0.05 |
| | Fe 238.204 | <1 | <1 | <1 | <1 | 0.03 |
| | K 766.490 | 7489 | 8306 | 7570 | 3373 | 7323 |
| | Mg 279.077 | <5 | <5 | <5 | <5 | 0.97 |
| | Mn 257.610 | <1 | 2.18 | 1.37 | <1 | 0.55 |
| | Na 330.237 | 2018 | 1865 | 2856 | 3879 | 1491 |
| | Ni 221.648 | <5 | <5 | <5 | <5 | 0.01 |
| | P 213.617 | <5 | <5 | <5 | <5 | <1.27 |
| | Pb 220.353 | <1 | 9.27 | <1 | <1 | −0.13 |
| | S 180.669 | | | | | |
| | Sb 206.836 | <10 | <10 | <10 | <10 | 0.42 |
| | Se 196.026 | <30 | <30 | <30 | <30 | 1.00 |
| | Si 251.611 | 4.77 | 5.88 | 5.83 | 5.27 | 4.88 |
| | TI 190.801 | <15 | <15 | <15 | <15 | 0.10 |
| | V 202.402 | <1 | <1 | <1 | <1 | 0.02 |
| | Zn 206.200 | 9456 | 10645 | 9178 | 9826 | 8963 |
| | 1:10, K + Na + Ca + Zn 1:100 | | | | | |

TABLE 11

American Metals Recovery Corp.
ZnOx Lime

| ZnOx Lime | Run #0&1 | Run #2&3 | Run #4&5 | Run #7&8 | Run #9&10&6 | Run #11&12 |
|---|---|---|---|---|---|---|
| Date | | before IS | 070699R | 070699R | | |
| I.D. | | | r4&5znoxlime | r7&8znoxlime | | |
| Sc 361.383 | | 4.68 | 4.76 | 4.87 | | |
| Ag 338.289 | | 7.7 | 7.46 | <1 | | |
| Al 308.215 | | 172.4 | 176.89 | 121.02 | | |
| As 188.979 | | | <1 | <1 | | |
| B 249.772 | | <7 | <5 | <5 | | |
| Ba 230.425 | | <1 | <1 | <1 | | |
| Be 313.107 | | <1 | <1 | <1 | | |
| Ca 317.933 | | 168438 | 160204 | 109598 | | |
| Cd 214.440 | | <1 | <1 | <1 | | |
| Co 228.616 | | <1 | <1 | <1 | | |
| Cr 283.563 | | 1.4 | 1.09 | <1 | | |
| Cu 324.752 | | <1 | <1 | <1 | | |
| Fe 238.204 | | 150 | 133.19 | 91.82 | | |
| K 766.490 | | 104.4 | 69.82 | 67.05 | | |
| Mg 279.077 | | 663.5 | 640.45 | 433.55 | | |
| Mn 257.610 | | 118 | 101.59 | 71.65 | | |
| Na 330.237 | | | <5 | <5 | | |
| Ni 221.648 | | <5 | <5 | <5 | | |
| P 213.617 | | — | 17.66 | 13.07 | | |
| Pb 220.353 | | <15 | <5 | <5 | | |

TABLE 11-continued

American Metals Recovery Corp.
ZnOx Lime

| ZnOx Lime | Run #0&1 | Run #2&3 | Run #4&5 | Run #7&8 | Run #9&10&6 | Run #11&12 |
|---|---|---|---|---|---|---|
| S 180.669 | | 1140.3 | | | | |
| Sb 206.836 | | <10 | <10 | <10 | | |
| Se 196.026 | | <30 | <30 | <30 | | |
| Si 251.611 | | 828.3 | 666.41 | 455.81 | | |
| TI 190.801 | | <15 | <15 | <15 | | |
| V 292.402 | | <1 | <1 | <1 | | |
| Zn 206.200 | | 23.3 | 81.43 | 39.72 | | |

TABLE 12

| ZnOx Cake (uw) | Run #0&1 | Run #2&3 | Run #4&5 | Run #7&8 | Run #6&9&10 | Run #11&12 |
|---|---|---|---|---|---|---|
| Date | 072199Y | 072199Y | 072199Y | 072199Y | 072199Y | 072199Y |
| I.D. | R0&1ZnOXC | 2&3ZnOXC | R4&5ZnOXC | R7&8ZnOXC | R6&9&10ZnOXC | R11&12ZnOXC |
| Y 371.029 | 5.05 | 5.17 | 5.07 | 5.07 | 5.06 | 5.04 |
| Ag 338.289 | <50 | <50 | <50 | <50 | <50 | <50 |
| Al 308.215 | 233.7 | 181.8 | 169.2 | 143.6 | 135.8 | 223.8 |
| As 188.979 | <100 | <100 | <100 | <100 | <100 | <100 |
| B 249.772 | 573.7 | 59.6 | 48.5 | 64.8 | 44.8 | 396.2 |
| Ba 230.425 | <15 | <15 | <15 | <15 | <15 | <15 |
| Be 313.107 | <1 | <1 | <1 | <1 | <1 | <1 |
| Ca 317.933 | 10968 | 26450 | 20515 | 58116 | 37861 | 12393 |
| Cd 214.440 | <5 | <5 | <5 | <5 | <5 | <5 |
| Co 228.616 | <15 | <15 | <15 | <15 | <15 | <15 |
| Cr 283.563 | <50 | <50 | <50 | <50 | <50 | <50 |
| Cu 324.752 | <15 | <15 | <15 | <15 | <15 | <15 |
| Fe 238.204 | 178.6 | 172.6 | 193.1 | 136.4 | 129.2 | 182.7 |
| K 766.490 | 517.5 | 1074.2 | 885.3 | 2582.6 | 1631.3 | 277.5 |
| Mg 279.077 | 638.3 | 1084.6 | 926.3 | 864.0 | 776.0 | 808.9 |
| Mn 257.610 | 161.6 | 210.2 | 194.2 | 172.2 | 158.2 | 224.5 |
| Na 330.237 | — | — | — | — | — | — |
| Ni 221.648 | <15 | <15 | <15 | <15 | <15 | <15 |
| P 213.617 | <50 | <50 | <50 | <50 | <50 | <50 |
| Pb 220.353 | 330.4 | 139.8 | <100 | <100 | <100 | <100 |
| S 180.669 | <50 | 378.6 | <50 | 260.4 | 239.4 | <100 |
| Sb 206.836 | <100 | <100 | <100 | <100 | <100 | <100 |
| Se 196.026 | <100 | <100 | <100 | <100 | <100 | <100 |
| Si 251.611 | 1883.0 | 1106.0 | 1002.0 | 853.4 | 784.9 | 1739.6 |
| TI 190.801 | <50 | <50 | <50 | <50 | <50 | <50 |
| V 292.402 | <15 | <15 | <15 | <15 | <15 | <15 |
| Zn 206.200 | 519155 | 624049 | 574763 | 528840 | 463704 | 602939 |
| Cl | | | | | | |
| ZnO 99% | 797057 | 797057 | 797057 | 797057 | 797057 | 797057 |

TABLE 13

American Metals Recovery Corp.
ZnOx Filtrate

| ZnOx Filtrate | Run #0&1 | Run #2&3 | Run #4&5 | Run #7&8 | Run #9&10&6 | Run #11&12 |
|---|---|---|---|---|---|---|
| Date | 070699R | 070699R | 070699R | 070699R | 070699R | 081199 |
| I.D. | r0&1znoxff | r2&3znoxff | r4&5znoxff | r7&8znoxff | r9&10&6znoxff | R11&12znoxff |
| Sc 361.383 | 4.68 | 4.62 | 4.71 | 4.74 | 4.68 | 4.74 |
| Ag 338.289 | 30.78 | <1 | <1 | 5.52 | <1 | <1 |
| Al 308.215 | <5 | <1 | <5 | <5 | <5 | <5 |
| As 188.979 | <1 | <1 | <1 | <1 | <1 | <1 |
| B 249.772 | 43.23 | 55.83 | 44.97 | 42.83 | 46.50 | 50.82 |
| Ba 230.425 | <1 | <1 | <1 | <1 | <1 | <1 |
| Be 313.107 | <1 | <1 | <1 | <1 | <1 | <1 |
| Ca 317.933 | 135983 | 159312 | 138537 | 133089 | 141828 | 128107 |
| Cd 214.440 | 1.19 | 3.69 | 1.66 | <1 | <1 | <1 |
| Co 228.616 | <1 | <1 | <1 | <1 | <1 | <1 |
| Cr 283.563 | <1 | <1 | <1 | <1 | <1 | <1 |
| Cu 324.752 | <1 | <1 | <1 | <1 | <1 | <1 |
| Fe 238.204 | <1 | <1 | <1 | <1 | <1 | <1 |
| K 766.490 | 6865 | 7965 | 6565 | 6578 | 6915 | 7106 |
| Mg 279.077 | <1 | 1.24 | <1 | <1 | <1 | <1 |
| Mn 257.610 | <1 | <1 | <1 | <1 | <1 | <1 |

TABLE 13-continued

American Metals Recovery Corp.
ZnOx Filtrate

| ZnOx Filtrate | Run #0&1 | Run #2&3 | Run #4&5 | Run #7&8 | Run #9&10&6 | Run #11&12 |
|---|---|---|---|---|---|---|
| Na 330.237 | 2314 | 870 | 2456 | 2058 | 2197 | |
| Ni 221.648 | <1 | <1 | <1 | <5 | <5 | <5 |
| P 213.617 | <1 | <1 | <1 | <5 | <5 | <5 |
| Pb 220.353 | 6.07 | <1 | <1 | <1 | 4.51 | <2 |
| S 180.669 | | | | | | |
| Sb 206.836 | <5 | <5 | <5 | <5 | <5 | <5 |
| Se 196.026 | <5 | <5 | <5 | <5 | <5 | 9.45 |
| Si 251.611 | <3 | 3.99 | <1 | <3 | <3 | <3 |
| Tl 190.801 | <15 | <15 | <15 | <5 | <5 | <5 |
| V 292.402 | <1 | <1 | <1 | <1 | <5 | <5 |
| Zn 206.200 | 713 | 9048 | 937 | 843 | 825 | 528 |
| Cl | | | | | | |

TABLE 14

| Salt Cake | Run #0&1 | Run #2&3 | Run #4&5 | Run #7&8 | Run #6&9&10 | Run #11&12 |
|---|---|---|---|---|---|---|
| I.D. | r0&1nacl/kcl | r2&3nacl/kcl | r4&5nacl/kcl | r7&8nacl/kcl | r6&9&10nacl/kcl | |
| Date | 071399 | 071399 | 071399 | 071399 | 071399 | |
| Sc 361.383 | | | | | | |
| Ag 338.289 | 2.71 | <2 | <2 | <2 | <2 | |
| Al 308.215 | 29.08 | 6.07 | 10.99 | 11.90 | 17.57 | |
| As 188.979 | <15 | <15 | <15 | <15 | <15 | |
| B 249.772 | 19.26 | 15.91 | 31.43 | 41.95 | 54.72 | |
| Ba 230.425 | 1.06 | <1 | <1 | <1 | <1 | |
| Be 313.107 | <1 | <1 | <1 | <1 | <1 | |
| Ca 317.933 | 46811 | 36807 | 66948 | 49472 | 164383 | |
| Cd 214.440 | 16.64 | 0.88 | 3.25 | 2.16 | 4.24 | |
| Co 228.616 | <1 | <1 | <1 | <1 | <1 | |
| Cr 283.563 | 7.96 | <2 | <2 | <2 | 8.18 | |
| Cu 324.752 | 5.41 | <1 | <1 | <1 | 2.06 | |
| Fe 238.204 | 861.16 | 47.51 | 49.58 | 18.55 | 199.01 | |
| K 766.490 | 2084 | 1724 | 3220 | 2537 | 2763 | |
| Mg 279.077 | 53.87 | <15 | <15 | <15 | 13.55 | |
| Mn 257.610 | 57.70 | 3.71 | 2.91 | 1.51 | 16.64 | |
| Na 330.237 | 343720 | 313088 | 276826 | 422796 | 117539 | |
| Ni 221.648 | 1.18 | <1 | <1 | <1 | 5.73 | |
| P 213.617 | <20 | <20 | <20 | <20 | <20 | |
| Pb 220.353 | 150.68 | <5 | 5.61 | <5 | 18.32 | |
| S 180.669 | <15 | <15 | <15 | <15 | <15 | |
| Sb 208.836 | <5 | <5 | <5 | <5 | <5 | |
| Se 196.026 | <10 | 9.46 | 10.10 | <10 | 16.37 | |
| Si 251.611 | 41.72 | 22.30 | 15.30 | 15.56 | 54.60 | |
| Tl 190.801 | <10 | <10 | <10 | <10 | <10 | |
| V 292.402 | <2 | <2 | <2 | <2 | <2 | |
| Zn 206.200 | 1192 | 200.30 | 523.29 | 522.07 | 568.94 | |

TABLE 15

American Metals Recovery Corp.
Zinc Oxide Cake Final Filtrate

| ZnO filtrate | Run #0&1 | Run #2&3 | Run #4&5 | Run #7&8 | Run #9&10&6 |
|---|---|---|---|---|---|
| Date | 062899 | 063099 | 081999 | 081999 | 082499 |
| ICP Time Stamp | | | | | 2:27 |
| I.D. | r0&1znoff | r2&3znoff | r4&5znoff | r7&8znoff | r6&9&10znoff |
| Sc 361.383 | | 4.71 | | | |
| Ag 338.289 | <2 | <2 | <2 | <2 | <2 |
| Al 308.215 | <3 | <3 | <3 | <3 | <3 |
| As 188.979 | <15 | <15 | <15 | <15 | <15 |
| B 249.772 | <7 | <7 | 2.17 | 3.22 | 1.19 |
| Ba 230.425 | 1.62 | 1.88 | 1.04 | 1.47 | 1.20 |
| Be 313.107 | <1 | <1 | <1 | <1 | 6633 |
| Ca 317.933 | 4827 | 5929 | 6894 | 6933 | 0.28 |
| Cd 214.440 | <1 | <1 | 0.14 | <1 | <1 |
| Co 228.616 | <1 | <1 | <1 | <1 | <1 |
| Cr 283.563 | <2 | <2 | <2 | <2 | <2 |
| Cu 324.752 | <1 | <1 | <1 | <1 | <1 |

TABLE 15-continued

American Metals Recovery Corp.
Zinc Oxide Cake Final Filtrate

| ZnO filtrate | Run #0&1 | Run #2&3 | Run #4&5 | Run #7&8 | Run #9&10&6 |
|---|---|---|---|---|---|
| Fe 238.204 | <1 | <1 | <1 | <1 | 0.19 |
| K 786.490 | 23.89 | 76.92 | 165.04 | 63.77 | 53.14 |
| Mg 279.077 | <1 | 87.75 | 61.24 | 95.97 | 121.74 |
| MN 257.610 | <1 | 1.91 | 2.01 | <1 | 3.60 |
| Ni 221.648 | <1 | <1 | <1 | <1 | <1 |
| P 213.617 | <20 | <20 | <20 | <20 | <20 |
| Pb 220.353 | <5 | <5 | <5 | <5 | 3.09 |
| S 180.669 | 30.19 | | 20.11 | 28.86 | 63.50 |
| Sb 206.836 | <5 | <5 | <5 | <5 | <5 |
| Se 196.026 | <10 | <10 | 1.82 | 9.12 | 1.04 |
| Si 251.611 | <3 | <3 | <3 | 18.51 | <3 |
| TI 190.801 | <10 | <10 | <10 | <10 | <10 |
| V 292.402 | <2 | <2 | <2 | <2 | <2 |
| Zn 206.200 | 68.58 | 83.68 | 64.53 | 93.57 | 239.32 |
| Cl | | | | | |

TABLE 16

American Metals Recovery
ZnO Runs

7/1/99   ICP file 070199

| Analyte | R2&3ZnOC | R4&5ZnOC | R0&1ZnOC |
|---|---|---|---|
| Ag | 73 | BDL | BDL |
| Al | 333 | 324 | 295 |
| As | BDL | BDL | BDL |
| B | BDL | BDL | 366 |
| Ba | BDL | BDL | BDL |
| Be | BDL | BDL | BDL |
| Ca | 3800 | 1240 | 10200 |
| cd | BDL | BDL | BDL |
| Cl | 2000 | 2500 | 2500 |
| Co | BDL | BDL | BDL |
| Cr | BDL | BDL | BDL |
| Cu | BDL | BDL | BDL |
| Fe | 298 | 379 | 345 |
| K | BDL | BDL | BDL |
| Mg | BDL | BDL | 1310 |
| Mn | 302 | * 275 | 323 |
| Na | not available | not available | not available |
| Ni | BDL | BDL | BDL |
| Pb | BDL | BDL | BDL |
| Sb | BDL | BDL | BDL |
| Se | BDL | BDL | BDL |
| Si | 1370 | 1990 | 1960 |
| TI | BDL | BDL | BDL |
| V | BDL | BDL | BDL |
| Zn | 786000 | 744000 | 765000 |
| ZnO99% | 784000 | 784000 | 777000 |

BDL = Below Detection Limit

TABLE 17

KO-61 and coke addition only 12.3 Kg Carbon to 100 Kg of KO61

| Temperatures C.<br>TTI solids | green ball<br>TTI 1 #1 | 1000<br>TTI 1 #2 | 1050<br>TTI 1 #3 | 1100<br>TTI 1 #4 | 1000<br>TTI 1 #5 | 1050<br>TTI 1 #6 | 1100<br>TTI 1 #7 |
|---|---|---|---|---|---|---|---|
| Ag 338.289 | <3 | 97.60 | 178.65 | 127.24 | 102.59 | 122.21 | 137.34 |
| Al 308.215 | 2675 | 3917 | 4792 | 7245 | 5324 | 7180 | 10345 |
| As 188.979 | <15 | <30 | 102.13 | 68.95 | 77.21 | 67.65 | 86.88 |
| B 249.772 | 736.29 | 1323 | 1529 | 2061 | 1361 | 1890 | 1986 |
| Ba 230.425 | 233.17 | 360.62 | 416.52 | 581.65 | 374.44 | 545.05 | 540 |
| Be 313.107 | <1 | <1 | <1 | <1 | <1 | <1 | <1 |
| Ca 317.933 | 40144 | 51832 | 67102 | 81495 | 55258 | 74269 | 77336 |

TABLE 17-continued

| | | | | | | | |
|---|---|---|---|---|---|---|---|
| Cd 214.440 | 492.06 | 27.00 | 37.00 | 68.97 | 29.97 | 40.36 | 45.68 |
| Co 228.616 | 5.94 | 23.31 | 28.77 | 36.58 | 23.28 | 31.65 | 34.99 |
| Cr 283.583 | 783.36 | 1406 | 1699 | 2072 | 2088 | 2198 | 3530 |
| Cu 324.752 | 2062.48 | 3975 | 4825 | 6280 | 4255 | 5820 | 6008 |
| Fe 238.204 | 82092 | 299906 | 345600 | 472289 | 321522 | 434690 | 456668 |
| K 766.490 | 12646 | 12727 | 15972 | 13022 | 11369 | 11788 | 3203 |
| Mg 279.077 | 5330 | 10847 | 12308 | 16254 | 11466 | 14893 | 16407 |
| Mn 257.610 | 8099 | 21102 | 24057 | 32125 | 22686 | 30159 | 32388 |
| Ni 221.648 | 65.27 | 296.41 | 366.19 | 446.72 | 308.09 | 393.58 | 452.73 |
| P 213.817 | 990.05 | 1150 | 1301 | 1792 | 1127 | 1864 | 1826 |
| Pb 220.353 | 15265 | 16609 | 15087 | 15223 | 15194 | 12253 | 8273 |
| S 180.669 | 9724 | 17979 | 16472 | 14235 | 14860 | 20756 | 19853 |
| Sb 206.836 | 69.26 | 227.63 | 280.54 | 337.66 | 233.61 | 315.93 | 349.74 |
| Se 196.026 | <10 | <10 | <10 | <10 | <10 | <10 | <10 |
| Si 251.611 | 467.12 | 1350.88 | 1429.11 | 2395.00 | 1112.76 | 1005.75 | 639.04 |
| Ti 190.801 | <10 | <10 | <10 | <10 | <10 | <10 | <10 |
| V 292.402 | 51.79 | 61.09 | 74.93 | 91.92 | 61.86 | 82.62 | 95.79 |
| Zn 206.200 | 154115 | 187804 | 131907 | 68801 | 173390 | 48516 | 46099 |
| Cl | 31662 | 47032 | 45463 | 54059 | 53843 | 48749 | 3507 |
| Na | 29778 | 51037 | 46746 | 63232 | 50827 | 61738 | 48003 |
| Carbon | 5.29–7.24 | 3.5–3.55 | 1.33–1.59 | 0.52 | 0.75–0.81 | 1.25–2.03 | 0.20–0.35 |
| undissolved solids (mg/kg) | 372247 | 135530 | 87636 | 99364 | 86286 | 104974 | 66756 |
| % undis solids | 37.22 | 13.55 | 8.76 | 9.94 | 8.63 | 10.50 | 6.68 |

Test Group 1
KO-61, Coke and Calcium Hydroxide form Leach cake

| | 34 Kg Ca(OH)2; 12.3 Kg Carbon to 100 Kg of KO61 | | | | | | |
|---|---|---|---|---|---|---|---|
| Temperatures | green ball | 1000 | 1050 | 1100 | 1000 | 1050 | 1100 |
| TTI solids | TTI 3 #1 | TTI 3 #2 | TTI 3 #3 | TTI 3 #4 | TTI 3 #5 | TTI 3 #6 | TTI 3 #7 |
| Ag 338.289 | 71.62 | 28.81 | 13.00 | 92.48 | 97.64 | 113.61 | 54.36 |
| Al 308.215 | 3712 | 7698 | 10317 | 11053 | 7914 | 9435 | 11338 |
| As 188.979 | <30 | <30 | <30 | <30 | <30 | <30 | <30 |
| B 249.772 | 915.27 | 1235 | 1663 | 1729 | 1439 | 1639 | 1584 |
| Ba 230.425 | 211 | 333 | 443.40 | 471.40 | 381.01 | 427.40 | 416.94 |
| Be 313.107 | <1 | <1 | <1 | <1 | <1 | <1 | <1 |
| Ca 317.933 | 128859 | 186925 | 243870 | 255457 | 214479 | 241665 | 237813 |
| Cd 214.440 | 512.33 | 908.74 | 37.26 | 37.16 | 30.99 | 34.52 | 34.64 |
| Co 228.616 | 13.35 | 24.94 | 27.51 | 28.08 | 23.13 | 26.50 | 26.55 |
| Cr 283.583 | 1707 | 2491 | 3419 | 3612 | 2840 | 3489 | 3290 |
| Cu 324.752 | 2619 | 3672 | 4812 | 5018 | 4353 | 4912 | 4598 |
| Fe 238.204 | 193223 | 280025 | 364257 | 382183 | 322750 | 370845 | 345188 |
| K 766.490 | 9249 | 8988 | 7885 | 2190 | 7334 | 3557 | 670 |
| Mg 279.077 | 7421 | 10613 | 13953 | 14854 | 12035 | 13914 | 13042 |
| Mn 257.610 | 13590 | 19419 | 25603 | 26836 | 22849 | 26373 | 24385 |
| Ni 221.648 | 179.10 | 273.49 | 335.31 | 334.97 | 299.80 | 325.85 | 337.35 |
| P 213.817 | 575 | 827 | 1502 | 1483 | 1322 | 1601 | 1311 |
| Pb 220.353 | 14220 | 12594 | 7268 | 2056 | 7341 | 14030 | 2605 |
| S 180.669 | 9479 | 4935 | 6886 | 10662 | 13740 | 14797 | 16483 |
| Sb 206.836 | 142.95 | 225.88 | 81.10 | 259.50 | 235.74 | 268.46 | 238.60 |
| Se 196.026 | <10 | <10 | <10 | <10 | <10 | <10 | <10 |
| Si 251.611 | 752.27 | 405.74 | 350.64 | 453.06 | 437.34 | 425.62 | 827.80 |
| Ti 190.801 | <10 | <10 | <10 | <10 | <10 | <10 | <10 |
| V 292.402 | 42.56 | 69.01 | 103.01 | 88.14 | 69.97 | 75.32 | 79.88 |
| Zn 206.200 | 178049 | 99891 | 19899 | 2228 | 50962 | 25661 | 1010 |
| Cl | 100743 | 32685 | 20023 | 4465 | 23191 | 10831 | 780 |
| Na | 26662 | 30373 | 30190 | 20961 | 25314 | 27603 | 21676 |
| Carbon | 8.56–8.82 | 1.41–1.58 | 0.37–0.56 | 0.27–0.55 | 1.50–1.74 | 0.58–0.63 | 0.23–0.27 |
| undissolved solids (mg/kg) | 88123 | 47610 | 76667 | 43611 | 40503 | 63488 | 49831 |
| % undis solids | 8.81 | 4.76 | 7.87 | 4.36 | 4.05 | 6.36 | 4.98 |
| sample description | | | | | | | |

TABLE 18

Test Group 2
KO61 plus Ca/Mg Reduction Tests to produce Fluxed sinter briquettes/pellets

| Test # | Preheat Time minutes | Heat Time minutes | Preheat Temp ° C. | Heat Temp ° C. | mg/kg Zn | mg/kg Ca | mg/kg Cd | mg/kg Pb | % Recovery-Normalized Zn | Cd | Pb |
|---|---|---|---|---|---|---|---|---|---|---|---|
| KO61 | | | | | 221,000 | 114,000 | 495 | 17,900 | | | |
| 4 + 4a | 5 | 45 | 275 | 1030 | 3,260 | 228,000 | 32 | 162 | 98.8% | 94.9% | 99.3% |
| 4b + 4c | 5 | 65 | 275 | 1030 | 614 | 214,000 | 30 | 109 | 99.8% | 94.9% | 99.5% |

TABLE 18-continued

| | | | | | | | | | | | |
|---|---|---|---|---|---|---|---|---|---|---|---|
| 5 + 5a | 5 | 15 | 275 | 1050 | 61,500 | 188,000 | 24 | 15,800 | 73.1% | 95.3% | 14.7% |
| 5b + 5c | 5 | 25 | 275 | 1050 | 4420 | 254,000 | 38 | 4530 | 98.6% | 94.5% | 81.9% |
| 5d + 5e | 5 | 35 | 275 | 1050 | 1910 | 229,000 | 30 | 844 | 99.3% | 95.2% | 96.3% |
| 5f + 5g | 5 | 45 | 275 | 1050 | 862 | 226,000 | 31 | 185 | 99.7% | 95.0% | 99.2% |
| 5h + 5i | 5 | 55 | 275 | 1050 | 619 | 227,000 | 33 | 141 | 99.8% | 94.7% | 99.4% |
| 6 + 6a | 5 | 15 | 275 | 1070 | 27,100 | 338,000 | 66 | 17,200 | 93.4% | 92.8% | 48.4% |
| 6b + 6c | 5 | 25 | 275 | 1070 | 2580 | 235,000 | 35 | 2700 | 99.1% | 94.5% | 88.3% |
| 6d + 6e | 5 | 35 | 275 | 1070 | 1890 | 234,000 | 33 | 6480 | 99.3% | 94.8% | 71.9% |
| 6f + 6g | 5 | 45 | 275 | 1070 | 925 | 231,397 | 102 | 3836 | 99.7% | 83.8% | 83.2% |
| 7 + 7a | 5 | 15 | 275 | 1100 | 3230 | 245,549 | 29 | 5942 | 98.9% | 95.7% | 75.4% |
| 7b + 7c | 5 | 20 | 275 | 1100 | 1860 | 229,655 | 31 | 6436 | 99.3% | 95.0% | 71.6% |

Round 2 Mix Volumes

| | K061 | Iron Ore | Leach Cake | CaO | Coke | Coat | Total Weight grams | lbs | grams/test |
|---|---|---|---|---|---|---|---|---|---|
| Test 4–7 | | 100 | | 18.065 | | 15.723 | | | |
| | 10 | 1000 | | 180.65 | | 157.23 | 1337.88 | 2.94334 | 51.4569231 |
| Test S1–S4 | | | 100 | | 5.75 | | 32.79 | | |
| | 5 | | 500 | | 28.75 | | 163.95 | 692.7 | 1.52394 | 49.4785714 |

Note: CaO from store bought calcined lime

The embodiments of the invention in which an exclusive property or privilege is claimed are defined as follows:

1. A method of producing Simonkolleite comprising the steps of:
   providing a high concentration chloride solution including zinc chloride complex; and
   adding water to the high concentration chloride solution to reduce the chloride concentration in the high concentration chloride solution so as to produce a reduced concentration chloride solution having a specific gravity less than 1.45, wherein adding said water results in at least 30% of said zinc chloride complex precipitating out of the reduced concentration chloride solution as Simonkolleite and zinc oxide and/or hydroxide.

2. The method of producing Simonkolleite of claim 1 further comprising the step of:
   adding a base to the reduced concentration chloride solution wherein adding said base results in at least an additional 60% of said zinc chloride complex originally in said high concentration chloride solution, precipitating out of the reduced concentration chloride solution as Simonkolleite.

3. The method of producing Simonkolleite of claim 2 wherein the method takes place at atmospheric pressure.

4. The method of producing Simonkolleite of claim 2 wherein the method takes place at a temperature less than 130 degrees Celsius.

5. The method of producing Simonkolleite of claim 4 wherein the method takes place at a temperature of less than 30 degrees Celsius and precipitates approximately 95% of the zinc chloride complex out of solution.

6. The method of producing Simonkolleite of claim 2 wherein the reduced concentration chloride solution has a pH in a range of 3.5 to 9.0.

7. The method of producing Simonkolleite of claim 2 wherein the reduced concentration chloride solution has a pH in a range of 5.0 to 7.5.

8. The method of producing Simonkolleite of claim 3 wherein at least 90% of said zinc chloride complex precipitates out of the reduced concentration chloride solution as Simonkolleite.

9. The method of producing Simonkolleite of claim 3 wherein said base comprises at least one compound selected from the group consisting of calcium hydroxide, calcium oxide, sodium hydroxide, and potassium hydroxide.

10. The method of producing Simonkolleite of claim 2 wherein the reduced concentration chloride solution contains zinc at a concentration greater than 500 ppm.

11. The method of producing Simonkolleite of claim 2 wherein the reduced concentration chloride solution contains zinc at a concentration greater then 10,000 ppm.

12. The method of producing Simonkolleite of claim 3 wherein the steps of adding the water and adding the base are conducted simultaneously.

13. The method of producing Simonkolleite of claim 2 wherein the method process takes place at a temperature between the crystallization temperature of the reduced concentration chloride solution and the boiling temperature of the reduced concentration chloride solution.

14. The method of producing Simonkolleite of claim 2 wherein the step of adding water to precipitate said zinc chloride is exothermic and the method further comprises the step of cooling the reduced concentration claim 2 chloride solution.

15. The method of producing Simonkolleite of claim 2 wherein said Simonkolleite comprises a portion of a filter cake and further comprising the step of washing the filter cake with a hot solution of calcium chloride in water to remove excess potassium chloride from the filter cake.

16. The method of producing Simonkolleite of claim 15 wherein the hot solution of calcium chloride in water is at a temperature between 70 and 130 degrees Celsius and has a specific gravity between 1.41 and 1.45.

17. The method of producing Simonkolleite of claim 2 wherein said Simonkolleite comprises a portion of a filter cake and further comprising the step of washing the filter cake with hot water to remove excess soluble chlorides.

18. The method of producing Simonkolleite of claim 17 wherein the hot water is at a temperature between 20 and 100 degrees Celsius.

19. A zinc oxide manufacturing process comprising the steps of:
   providing a metals bearing feed stock;
   providing a chloride leach solution with a specific gravity in a range of 1.45 to 1.55;
   reacting the metals bearing feed stock and the chloride leach solution to form a complex solution including a metal chloride complex and calcium hydroxide;
   adding water to the complex solution to reduce a chloride concentration in the complex solution so as to produce a cementation solution having a specific gravity within a range of 1.40 to 1.49;

adding zinc to said cementation solution, wherein said zinc added to said cementation solution is below the metal in the metal chloride complex on the electrochemical replacement series such that the zinc added to the cementation solution will substitute with the metal in the metal chloride complex to form a zinc chloride complex and such that the metal substituted out of the metal chloride complex will cement out of the cementation solution;

adding water to the zinc chloride complex to produce a zinc chloride complex solution having a reduced chloride concentration with a specific gravity within a range of 1.37 to 1.45, wherein adding said water results in at least 30% of said zinc chloride complex precipitating out of the zinc chloride complex solution as Simonkolleite;

adding a base to the zinc chloride complex solution wherein adding said base results in at least an additional 60% of said zinc chloride complex originally in said cementation solution precipitating out of the zinc chloride complex solution as Simonkolleite;

adding water to the Simonkolleite to produce a Simonkolleite slurry; and adding a base to the Simonkolleite slurry to produce zinc oxide having a purity of at least 98% and containing less than 1,000 ppm chlorides.

20. The zinc oxide manufacturing process of claim 19 wherein the step of reacting the metals bearing feed stock and the chloride leach solution takes place at atmospheric pressure, the chloride leach solution includes calcium chloride and a chloride ion concentration greater than 10 molar, the temperature is above 65 degrees Celsius, and the pH of the complex solution is maintained above 3.5 and below 9.0.

21. The zinc oxide manufacturing process of claim 19 wherein, in the step of reacting the metals bearing feed stock and the chloride leach solution, the metal in the metal chloride complex comprises one or more metals selected from the group consisting of zinc, lead, cadmium, silver, copper, tin, nickel, and a metal in the electrochemical series above zinc.

22. The zinc oxide manufacturing process of claim 19 wherein the process utilizes water to maintain the specific gravity of the chloride leach solution in a range of 1.45 to 1.55.

23. The zinc oxide manufacturing process of claim 19 wherein the cementation solution has a pH in a range of 5.0 to 8.0, and the step is conducted at atmospheric pressure and at a temperature greater than 65 degrees Celsius.

24. The zinc oxide manufacturing process of claim 19 wherein the steps of adding water and a base to the zinc chloride complex solution takes place at atmospheric pressure and at a temperature of approximately 25 degrees Celsius, wherein the reduced chloride concentration solution has a pH in the range of 3.5 to 9.0, and wherein said base comprises at least one compound selected from the group consisting of: calcium hydroxide, calcium oxide, sodium hydroxide, and potassium hydroxide.

25. The zinc oxide manufacturing process of claim 19 wherein said Simonkolleite comprises a portion of a filter cake and further comprising the step of washing the filter cake with a hot solution of calcium chloride in water to remove excess potassium chloride from the filter cake.

26. The zinc oxide manufacturing process of claim 25 wherein the hot solution of calcium chloride in water is at a temperature between 65 and 130 degrees Celsius and has a specific gravity between 1.41 and 1.45.

27. The zinc oxide manufacturing process of claim 19 wherein the step of go adding a base to the zinc chloride complex solution takes place at a temperature in a range of 140 to 200 degrees Celsius, in a pH range of 6.9 to 7.4, and at atmospheric pressure.

* * * * *

UNITED STATES PATENT AND TRADEMARK OFFICE
CERTIFICATE OF CORRECTION

PATENT NO.    : 6,863,873 B1
DATED         : March 8, 2005
INVENTOR(S)   : L.P. Hoboy et al.

It is certified that error appears in the above-identified patent and that said Letters Patent is hereby corrected as shown below:

Column 61,
Line 50, "claim 4" should read -- claim 2 --

Column 62,
Line 29, "greater then" should read -- greater than --
Line 33, "method process" should read -- method --
Line 39, "chloride is exothermic" should read -- chloride complex is exothermic --
Line 40, after "concentration" delete "claim 2"

Column 64,
Line 33, after "step of" delete "go"

Signed and Sealed this

Seventh Day of June, 2005

JON W. DUDAS
*Director of the United States Patent and Trademark Office*